US012172180B2

(12) United States Patent
Kinne et al.

(10) Patent No.: US 12,172,180 B2
(45) Date of Patent: Dec. 24, 2024

(54) FLUID SPRAYER

(71) Applicant: Graco Minnesota Inc., Minneapolis, MN (US)

(72) Inventors: Robert W. Kinne, Andover, MN (US); Christopher C. Hines, Andover, MN (US); Diane L. Olson, Elk River, MN (US); Andrew J. Ericson, Andover, MN (US); Sophia E. Drayna, Otsego, MN (US); Pamela J. Muetzel, Maple Lake, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 0 days.

(21) Appl. No.: 18/676,025

(22) Filed: May 28, 2024

(65) Prior Publication Data

US 2024/0316577 A1 Sep. 26, 2024

Related U.S. Application Data

(63) Continuation of application No. PCT/US2023/014798, filed on Mar. 8, 2023.

(60) Provisional application No. 63/438,144, filed on Jan. 10, 2023, provisional application No. 63/433,337, filed on Dec. 16, 2022, provisional application No. 63/426,593, filed on Nov. 18, 2022, provisional application No. 63/318,330, filed on Mar. 9, 2022.

(51) Int. Cl.

| | |
|---|---|
| ***B05B 9/01*** | (2006.01) |
| ***B05B 1/30*** | (2006.01) |
| ***B05B 12/00*** | (2018.01) |
| *B05B 9/08* | (2006.01) |

(52) U.S. Cl.
CPC ................ *B05B 9/01* (2013.01); *B05B 1/302* (2013.01); *B05B 12/002* (2013.01); *B05B* *9/0861* (2013.01)

(58) Field of Classification Search
CPC ....... B05B 9/01; B05B 9/0861; B05B 12/002; B05B 1/302
USPC ...... 239/525, 526, 583, 585.1, 585.4, 585.5, 239/302, 690, 697, 698, 708
See application file for complete search history.

(56) References Cited

U.S. PATENT DOCUMENTS

| | | | |
|---|---|---|---|
| 3,212,715 | A | 10/1965 | Cocks |
| 4,801,088 | A | 1/1989 | Baker |
| 5,014,884 | A | 5/1991 | Wunsch |
| 5,020,725 | A | 6/1991 | Waldrum |
| 5,126,642 | A | 6/1992 | Shahrodi |
| 5,156,340 | A | 10/1992 | Lopes |
| 5,318,208 | A | 6/1994 | Van |

(Continued)

FOREIGN PATENT DOCUMENTS

| | | | |
|---|---|---|---|
| BE | 1026348 | B1 | 1/2020 |
| CN | 102460947 | A | 5/2012 |

(Continued)

OTHER PUBLICATIONS

International Search Report and Written Opinion for PCT Application No. PCT/US2023/014798, Dated Jul. 6, 2023, pp. 18.

*Primary Examiner* — Steven J Ganey
(74) *Attorney, Agent, or Firm* — Kinney & Lange, P. A.

(57) ABSTRACT

A fluid sprayer includes a spray gun that is configured to output a spray of fluid for application on a substrate. A trigger of the spray gun is operatively connected to a controller to control actuation of a pump that drives the spray fluid to the spray gun. A solenoid is connected to a (Continued)

spray valve of the spray gun to actuate the spray valve open to cause spraying by the fluid sprayer.

20 Claims, 39 Drawing Sheets

(56) References Cited

U.S. PATENT DOCUMENTS

| | | | |
|---|---|---|---|
| 6,259,220 | B1 | 7/2001 | Hays et al. |
| 6,595,437 | B1 | 7/2003 | Lawson et al. |
| 7,012,393 | B2 | 3/2006 | De et al. |
| 7,021,571 | B1 | 4/2006 | Lawson et al. |
| 7,178,704 | B2 | 2/2007 | Saidman |
| 7,330,004 | B2 | 2/2008 | Dejonge et al. |
| 7,498,755 | B2 | 3/2009 | Julicher et al. |
| 8,573,511 | B2 | 11/2013 | Sandahl |
| 8,740,111 | B2 | 6/2014 | Munn et al. |
| 10,926,275 | B1 | 2/2021 | Kinne et al. |
| 11,052,418 | B2 | 7/2021 | Olson et al. |
| 2004/0007631 | A1 | 1/2004 | Williams et al. |
| 2005/0082389 | A1 | 4/2005 | Sanchez et al. |
| 2006/0013709 | A1 | 1/2006 | Hudson et al. |
| 2006/0060670 | A1 | 3/2006 | Hartley |
| 2007/0007918 | A1 | 1/2007 | Watts et al. |
| 2007/0020108 | A1 | 1/2007 | Walls |
| 2007/0258174 | A1 | 11/2007 | Yamamoto et al. |
| 2008/0217437 | A1 | 9/2008 | Vanden et al. |
| 2008/0258663 | A1 | 10/2008 | Walls |
| 2008/0296410 | A1 | 12/2008 | Carey et al. |
| 2010/0322795 | A1 | 12/2010 | Jones et al. |
| 2011/0240758 | A1 | 10/2011 | Robens et al. |
| 2012/0261494 | A1 | 10/2012 | Krayer et al. |
| 2012/0298771 | A1 | 11/2012 | Johnson et al. |
| 2013/0206867 | A1 | 8/2013 | Hines et al. |
| 2013/0277455 | A1 | 10/2013 | Thompson et al. |
| 2014/0340008 | A1 | 11/2014 | Reynolds et al. |
| 2015/0022129 | A1 | 1/2015 | Lu et al. |
| 2015/0209497 | A1 | 7/2015 | Aalders et al. |
| 2015/0222205 | A1 | 8/2015 | Suda |
| 2015/0229254 | A1 | 8/2015 | Hernandez et al. |
| 2016/0072415 | A1 | 3/2016 | Wallimann et al. |
| 2016/0087560 | A1 | 3/2016 | Miller |
| 2017/0297045 | A1 | 10/2017 | Anderson |
| 2019/0283061 | A1 | 9/2019 | Qiao |
| 2020/0238315 | A1 | 7/2020 | Jurmu et al. |
| 2020/0331008 | A1 | 10/2020 | Leslie et al. |
| 2021/0005374 | A1 | 1/2021 | Schulze et al. |

FOREIGN PATENT DOCUMENTS

| | | | |
|---|---|---|---|
| CN | 103752442 | A | 4/2014 |
| CN | 108816556 | B | 3/2020 |
| CN | 111604311 | B | 3/2021 |
| CN | 113578571 | A | 11/2021 |
| JP | 2003144985 | A | 5/2003 |
| JP | 4549425 | B1 | 7/2010 |
| JP | 5584088 | B2 | 7/2014 |
| WO | 9703761 | A1 | 2/1997 |
| WO | 2010047800 | A2 | 4/2010 |
| WO | 2014046371 | A1 | 3/2014 |
| WO | 2018140753 | A1 | 8/2018 |

FLUID SPRAYER

CROSS-REFERENCE TO RELATED APPLICATION(S)

This application is a continuation PCT International Application No. PCT/US2023/014798 filed Mar. 8, 2023 for "FLUID SPRAYER", which in turn claims the priority to U.S. Provisional Application No. 63/318,330 filed Mar. 9, 2022 and entitled "FLUID SPRAYER," and claims priority to U.S. Provisional Application No. 63/426,593 filed Nov. 18, 2022 and entitled "FLUID SPRAYER," and claims priority to U.S. Provisional Application No. 63/433,337 filed Dec. 16, 2022 and entitled "FLUID SPRAYER," and claims priority to U.S. Provisional Application No. 63/438,144 filed Jan. 10, 2023 and entitled "FLUID SPRAYER," the disclosures of which are hereby incorporated by reference in their entireties.

BACKGROUND

This disclosure relates generally to fluid sprayers. More specifically, this disclosure relates to airless fluid sprayers.

Fluid sprayers include pumps that pressure spray fluid and drive the spray fluid to a nozzle for outputting the spray fluid as an atomized fluid spray. Fluid sprayers include spray guns that can be held and manipulated by the user. The spray gun includes an internal valve that controls flow of the pressurized fluid to the nozzle. A trigger controls actuation of the valve between open and closed states. Typically, the trigger is mechanically connected to the valve such that the user is required to physically displace the valve from the closed state to the open state. Displacing the valve to the open state requires the user to overcome the hydraulic pressure of the spray fluid, which can lead to user fatigue and inefficient spray operations.

SUMMARY

According to an aspect of the disclosure, a spray gun for spraying a liquid includes a gun body including a handle for gripping and supporting the spray gun; a spray valve within the gun body, the spray valve configured to close to stop flow of the liquid in a closed state and to open to permit flow of the liquid past the spray valve in an open state; a nozzle configured to atomize the liquid into a spray pattern; a solenoid; and an actuator configured to be depressed to cause the solenoid to move the spray valve from the closed state to the open state, and the actuator configured to be released to return the spray valve to the closed state.

According to an additional or alternative aspect of the disclosure, a fluid spray system for spraying a liquid includes a spray gun, a pump module, and a hose that conveys the liquid output by the pump to the spray gun. The spray gun includes a gun body having a handle for gripping and supporting the spray gun; a spray valve supported by the gun body, the spray valve configured to close to stop the flow of the liquid in a closed state and to open to permit flow of the liquid past the spray valve in an open state; a nozzle configured to atomize the liquid into a spray pattern; and an actuator which one or both of causes opening and closing of the spray valve. The pump module is remote from the spray gun, the pump module includes an electric motor; and a pump that is driven by the electric motor.

According to another additional or alternative aspect of the disclosure, a fluid spray system includes a pump module and a spray gun. The pump module includes an electric motor; and a pump connected to the electric motor to be driven by the electric motor. The spray gun is fluidly connected to the pump to receive spray fluid from the pump, the spray gun includes a gun body including a gun handle; a trigger; a spray valve actuatable between a closed state and an open state; and a solenoid connected to the spray valve and configured to actuate the spray valve from the closed state to the open state. A controller is operatively connected to the electric motor to control activation of the electric motor and operatively connected to the solenoid to control activation of the solenoid, the controller configured to receive a spray signal from the fluid sprayer indicating actuation of the trigger; direct power to the electric motor based on the spray signal to cause the electric motor to drive the pump to pump the spray fluid; and direct power to the solenoid based on the spray signal to cause the solenoid to actuate the spray valve to the open state.

According to yet another additional or alternative aspect of the disclosure, a fluid spray system includes a pump module, a spray gun, a solenoid, and a controller. The pump module includes an electric motor; and a pump connected to the electric motor to be driven by the electric motor to pump a spray fluid. The spray gun fluidly connected to the pump to receive the spray fluid from the pump, the spray gun includes a gun body; a gun handle projecting from the gun body; a trigger; and a spray valve actuatable between a closed state and an open state. The solenoid is connected to the spray valve to actuate the spray valve from the closed state to the open state. The controller is operatively connected to the electric motor to control activation of the electric motor and operatively connected to the solenoid to control activation of the solenoid, the controller configured to receive a spray signal indicating actuation of the trigger; direct power to the electric motor based on the spray signal to cause the electric motor to drive the pump; direct power to the solenoid based on the spray signal to cause the solenoid to actuate the spray valve to the open state; and sequence powering of the electric motor and the solenoid such that a delay period occurs between one of the electric motor and the solenoid being powered and the other one of the electric motor and the solenoid being powered.

According to yet another additional or alternative aspect of the disclosure a method of spraying with a fluid spray system having a pump module and a handheld spray gun includes generating a spray signal based on actuation of a trigger of the handheld spray gun and providing the spray signal to a controller of the spray system; activating, by the controller and based on the spray signal, an electric motor of the pump module to cause the electric motor to drive a pump to cause pumping by the pump such that the pump pumps spray fluid from a reservoir to the handheld fluid sprayer; and activating, by the controller and based on the spray signal, a solenoid to cause the solenoid to actuate a spray valve of the handheld spray gun from a closed state to an open state, the spray fluid able to flow past the spray valve and to a nozzle of the handheld fluid sprayer for spraying from the handheld spray gun with the spray valve in the open state.

According to yet another additional or alternative aspect of the disclosure, a fluid spray system includes a pump module, a spray gun fluidly connected to the pump by a conduit to receive the spray fluid from the pump, and a solenoid. The pump module includes an electric motor; and a pump connected to the electric motor to be driven by the electric motor to pump spray fluid. The spray gun includes a gun body having a gun handle projecting from the gun body; and a trigger; a spray valve actuatable between a closed state, in which the spray valve prevents the spray fluid from flowing to a nozzle, and an open state, in which the spray fluid can flow to the nozzle. The solenoid is connected to the spray valve and configured to actuate the spray valve from the closed state to the open state. A first controller is operatively connected to the solenoid to control activation of the solenoid, the gun controller configured to direct power to the solenoid based on receipt of a spray signal indicating actuation of the trigger to cause the solenoid to actuate the spray valve to the open state; and depower the solenoid based on release of the trigger to cause the spray valve to return to the closed state.

According to yet another additional or alternative aspect of the disclosure, a handheld fluid spray gun includes a gun body including a projecting gun handle; a trigger supported by the gun body; a nozzle configured to generate an atomized spray of spray fluid; a spray valve actuatable between an open state, in which the spray fluid can flow to the nozzle, and a closed state, in which the spray fluid is prevented from flowing to the nozzle by the spray valve; and a solenoid connected to the spray valve and configured to actuate the spray valve from the closed state to the open state.

According to yet another additional or alternative aspect of the disclosure a handheld fluid spray gun includes a gun body having a gun handle; a trigger supported by the gun body; a nozzle configured to generate an atomized spray of spray fluid; a spray valve actuatable between an open state, in which the spray fluid can flow to the nozzle, and a closed state, in which the spray fluid is prevented from flowing to the nozzle; a solenoid; and a spring. The spray valve is formed at an interface between a seat and a needle assembly movable along an axis relative to the seat, the needle assembly engaged with the seat with the spray valve in the closed state and disengaged from the seat with the spray valve in the open state. The solenoid is connected to the needle assembly and configured to displace the needle assembly along the axis to actuate the spray valve from the closed state to the open state, the solenoid including a stator; and a plunger connected to the needle assembly, the plunger configured to be displaced by electromagnetic fields generated by the stator. The spring interfaces with the needle assembly and configured to displace the needle assembly to actuate the spray valve from the open state to the closed state, the spring displacing the plunger via the needle assembly.

According to yet another additional or alternative aspect of the disclosure, a handheld fluid spray gun includes a gun body having a gun handle; a trigger supported by the gun body; a nozzle configured to generate an atomized spray of spray fluid; a spray valve actuatable between an open state, in which the spray fluid can flow to the nozzle, and a closed state, in which the spray fluid is prevented from flowing to the nozzle; a solenoid; and a spring. The solenoid includes a stator; and a plunger connected to the spray valve to actuate the spray valve from the closed state to the open state, wherein the plunger is configured to be shifted in a first direction along an axis by electromagnetic fields generated by the stator. The spring is configured to actuate the spray valve from the open state to the closed state and to shift the plunger in a second direction along the axis, the second direction opposite the first direction.

According to yet another additional or alternative aspect of the disclosure, a handheld fluid spray gun includes a gun body having a gun handle; a trigger supported by the gun body; a nozzle configured to generate an atomized spray of spray fluid; a spray valve actuatable between an open state, in which the spray fluid can flow to the nozzle, and a closed state, in which the spray fluid is prevented from flowing to the nozzle, the spray valve disposed within a fluid housing supported by the gun body, the fluid housing defining a wet chamber upstream of the nozzle and through which the spray fluid flows; and a solenoid connected to the spray valve and configured to actuate the spray valve from the closed state to the open state, the solenoid disposed within a solenoid housing. The solenoid housing is mounted to the fluid housing at a housing interface, the solenoid housing disposed around the fluid housing at the housing interface.

According to yet another additional or alternative aspect of the disclosure, a handheld fluid spray gun includes a gun body having a gun handle; a trigger supported by the gun body; a nozzle configured to generate an atomized spray of spray fluid; an assembly housing supported by the gun body, the assembly housing formed at least partially from a thermally conductive material, the assembly housing defining a wet chamber through which the spray fluid flows; a spray valve disposed within the assembly housing, the spray valve actuatable between an open state, in which spray fluid can flow from the wet chamber to the nozzle, and a closed state, in which the spray fluid is prevented from flowing to the nozzle; and a solenoid connected to the spray valve and configured to actuate the spray valve from the closed state to the open state, a stator of the solenoid mounted to the assembly housing. A thermal pathway is formed from the stator to the wet chamber by the thermally conductive material of the assembly housing.

According to yet another additional or alternative aspect of the disclosure, a handheld fluid spray gun includes a gun body having a gun handle; a trigger supported by the gun body; a nozzle configured to generate an atomized spray of spray fluid; a spray valve actuatable between an open state, in which the spray fluid can flow to the nozzle, and a closed state, in which the spray fluid is prevented from flowing to the nozzle, the spray valve disposed within a fluid housing supported by the gun body, the fluid housing defining a wet chamber through which fluid flows to the nozzle; and a solenoid connected to the spray valve and configured to actuate the spray valve from the closed state to the open state, the solenoid disposed within a solenoid housing mounted to the fluid housing. The fluid housing is formed from a first thermally conductive material and the solenoid housing is formed from a second thermally conductive material such that a thermal pathway from the solenoid to the spray fluid through the solenoid housing and the fluid housing.

According to yet another additional or alternative aspect of the disclosure, a handheld fluid spray gun includes a gun body having a gun handle; a trigger supported by the gun body; a nozzle configured to generate an atomized spray of spray fluid; a spray valve actuatable between an open state, in which the spray fluid can flow to the nozzle, and a closed state, in which the spray fluid is prevented from flowing to the nozzle, the spray valve disposed within a fluid housing supported by the gun body, the fluid housing defining a wet chamber through which the spray fluid flows to the nozzle; and a solenoid. The spray valve formed at an interface between a seat supported by the fluid housing; and a needle assembly configured to move along an axis, the needle assembly engaged with the seat with the spray valve in the closed state and disengaged from the seat with the spray valve in the open state. The solenoid connected to the needle assembly and configured to displace the needle assembly to actuate the spray valve from the closed state to the open state, the solenoid disposed within a solenoid housing mounted to the fluid housing. The fluid housing and the solenoid housing are thermally conductive such that a first thermal path is formed from the solenoid to the spray fluid via the solenoid housing and the fluid housing for cooling of the solenoid.

According to yet another additional or alternative aspect of the disclosure, a handheld fluid spray gun includes a gun body having a gun handle; a trigger supported by the gun body; a nozzle configured to generate an atomized fluid spray; a spray valve actuatable between an open state, in which the spray fluid can flow to the nozzle, and a closed state, in which the spray fluid is prevented from flowing to the nozzle, the spray valve disposed within a fluid housing; and a solenoid connected to the spray valve and configured to actuate the spray valve from the closed state to the open state, the solenoid disposed within a solenoid housing. The solenoid includes a stator configured to generate an electromagnetic field; and a plunger reactive to the electromagnetic field to be displaced along an axis by the electromagnetic field. An axial gap is formed between the plunger and the stator, the axial gap setting a distance that the spray valve can shift between the closed state and the open state, the axial gap open with the spray valve in the closed state and the axial gap closed with the spray valve in the open state. The solenoid housing is mounted to the fluid housing at a housing interface, the housing interface setting a size of the axial gap.

According to yet another additional or alternative aspect of the disclosure, a method of setting an opening distance of a spray valve of a handheld fluid spray gun includes aligning a first assembly component with a second assembly component on an axis, wherein the first assembly component includes a stator of a solenoid mounted to a solenoid housing and the second assembly component includes a fluid housing, a needle assembly of the spray valve extending from within a wet chamber within the fluid housing to outside of the wet chamber, and a plunger of the solenoid connected to the needle assembly and disposed outside of the wet chamber; and engaging a housing interface between the solenoid housing and the fluid housing such that the plunger at least partially extends into the stator, an axial length of the housing interface setting the distance that the needle assembly can displace to open the spray valve.

According to yet another additional or alternative aspect of the disclosure, a handheld fluid spray gun includes a gun body; a gun handle projecting from the gun body; a trigger supported by the gun body; a nozzle configured to generate an atomized spray of spray fluid; an assembly housing supported by the gun body; a spray valve actuatable between an open state, in which the spray fluid can flow to the nozzle, and a closed state, in which the spray fluid is prevented from flowing to the nozzle, the spray valve disposed within a wet chamber formed within the assembly housing; and a solenoid connected to the spray valve and configured to actuate the spray valve from the closed state to the open state, the solenoid disposed within a dry chamber formed within the assembly housing, the dry chamber fluidly isolated from the wet chamber.

According to yet another additional or alternative aspect of the disclosure, a handheld fluid spray gun includes a gun body having a gun handle; a trigger supported by the gun body; a nozzle configured to generate an atomized spray of spray fluid; a spray valve actuatable between an open state, in which the spray fluid can flow to the nozzle, and a closed state, in which the spray fluid is prevented from flowing to the nozzle; and a solenoid connected to the spray valve and configured to actuate the spray valve from the closed state to the open state. The solenoid includes a stator configured to generate an electromagnetic field; and a plunger reactive to the electromagnetic field to be displaced along an axis by the electromagnetic field. An electromagnetic force acting on the plunger is greater with the spray valve in the closed state than with the spray valve in the open state.

According to yet another additional or alternative aspect of the disclosure, a handheld fluid spray gun includes a gun body having a gun handle; a trigger supported by the gun body; a nozzle configured to generate an atomized fluid spray; a spray valve actuatable between an open state, in which the fluid can flow to the nozzle, and a closed state, in which the fluid is prevented from flowing to the nozzle; and a solenoid connected to the spray valve and configured to actuate the spray valve from the closed state to the open state, wherein an electromagnetic force acting on a plunger of the solenoid is greatest with the spray valve in the open state.

According to yet another additional or alternative aspect of the disclosure, a spray system includes a handheld fluid spray gun, a solenoid, and a controller. The handheld fluid spray gun includes a gun body having a gun handle; a trigger supported by the gun body; a nozzle configured to generate an atomized spray of spray fluid; and a spray valve actuatable between an open state, in which the spray fluid can flow to the nozzle, and a closed state, in which the spray fluid is prevented from flowing to the nozzle. The solenoid is connected to the spray valve and is configured to actuate the spray valve from the closed state to the open state. The controller is connected to the solenoid to control activation of the solenoid, the controller configured to provide a first power level to the solenoid to cause the solenoid to actuate the spray valve from the closed state to the open state and configured to provide a second power level different from the first power level to the solenoid to cause the solenoid to hold the spray valve in the open state.

According to yet another additional or alternative aspect of the disclosure, a spray system includes a pump module, a handheld fluid spray gun, and a controller. The pump module includes an electric motor; and a pump connected to the electric motor to be driven by the electric motor to pump a spray fluid. The handheld fluid spray gun includes a gun body having a gun handle; a trigger supported by the gun body; a nozzle configured to generate an atomized spray of spray fluid; a spray valve actuatable between an open state, in which the spray fluid can flow to the nozzle, and a closed state, in which the spray fluid is prevented from flowing to the nozzle. The controller is operatively connected to the trigger to receive a spray signal from the trigger, the controller configured to activate the motor based on reception of the spray signal to cause pumping by the pump. The trigger is not mechanically connected to the spray valve such that the trigger does not directly mechanically actuate the spray valve to the open state.

According to yet another additional or alternative aspect of the disclosure, a handheld fluid spray gun includes a gun body having a gun handle; a trigger supported by the gun body; a nozzle configured to generate an atomized spray of spray fluid; a spray valve actuatable between an open state, in which the spray fluid can flow to the nozzle, and a closed state, in which the spray fluid is prevented from flowing to the nozzle; and a solenoid connected to the spray valve and configured to actuate the spray valve from the closed state to the open state. The solenoid includes a stator configured to generate an electromagnetic field; and a plunger reactive to the electromagnetic field to be displaced along an axis by the electromagnetic field, the plunger connected to a needle assembly of the spray valve to actuate the needle assembly of the spray valve along an axis. The plunger includes a plunger shaft at least partially disposed within the stator; a plunger shoulder from which the plunger shaft extends, the plunger shoulder at least partially disposed within the, the plunger shoulder having a larger diameter than the plunger shaft; and a plunger flange extending radially outward from the plunger shoulder, the plunger shoulder extending axially between the plunger flange and the plunger shaft.

According to yet another additional or alternative aspect of the disclosure, a pump module configured to pump spray fluid to a handheld spray gun for spraying by the handheld spray gun includes a module housing; an electric motor disposed within the module housing; a pump supported by the module housing, the pump connected to the electric motor to be driven by the electric motor to pump the spray fluid; and a fluid reservoir supported by the module housing. The fluid reservoir includes a basin connected to a pump body of the pump; and a tube pot mountable to the basin and extending along a reservoir axis, the tube pot configured to store a supply of the spray fluid.

According to yet another additional or alternative aspect of the disclosure, a configured to pump spray fluid to a handheld spray gun for spraying by the handheld spray gun includes a module housing; an electric motor disposed within the module housing; a pump supported by the module housing, the pump connected to the electric motor to be driven by the electric motor to pump the spray fluid; and a fluid reservoir supported by the module housing. The fluid reservoir includes a basin connected to a pump body of the pump, the basin including a mount slot formed in a wall of the basin; and a tube pot mountable to the basin and extending along a reservoir axis, the tube pot including a projection extending outward from an exterior of the tube pot, the tube pot configured to store a supply of the spray fluid. The projection interfaces with the mount slot during mounting and dismounting of the tube pot from the basin, the mount slot angled such that the mount slot displaces the tube pot axially as the tube pot is rotated on the reservoir axis during mounting and dismounting of the tube pot from the basin.

According to yet another additional or alternative aspect of the disclosure a pump module configured to pump spray fluid to a handheld spray gun for spraying by the handheld spray gun includes a module housing; an electric motor disposed within the module housing; a pump supported by the module housing, the pump connected to the electric motor to be driven by the electric motor; and a fluid reservoir supported by the module housing. The fluid reservoir includes a basin connected to a pump body of the pump; and a tube pot mountable to the basin and extending along a reservoir axis, the tube pot configured to store a supply of the spray fluid. The tube pot is configured to mount to the basin by the tube pot both rotating on the reservoir axis and shifting axially along the reservoir axis.

According to yet another additional or alternative aspect of the disclosure, a pump module configured to pump spray fluid to a handheld spray gun for spraying by the handheld spray gun includes a module housing; an electric motor disposed within the module housing; a pump supported by the module housing, the pump connected to the electric motor to be driven by the electric motor; and a fluid reservoir supported by the module housing, the fluid reservoir including a tube pot configured to store a supply of the spray fluid, the tube pot including an inlet opening at a first axial end of the tube pot and an outlet opening at a second axial end of the tube pot.

According to yet another additional or alternative aspect of the disclosure, a pump module configured to pump spray fluid to a handheld spray gun for spraying by the handheld spray gun includes a module housing; an electric motor disposed within the module housing; a pump supported by the module housing, the pump connected to the electric motor to be driven by the electric motor; and a fluid reservoir supported by the module housing. The fluid reservoir includes a basin connected to a pump body of the pump, the basin including a basin rim disposed about an installation opening of the basin; and a tube pot mountable to the basin and extending along a reservoir axis, the tube pot projecting out of the basin through the installation opening, the tube pot configured to store a supply of the spray fluid.

According to yet another additional or alternative aspect of the disclosure, a spray system includes a pump module and a handheld spray gun. The pump module includes a module housing; a module mount formed on the module housing; an electric motor disposed within the module housing; and a pump supported by the module housing and connected to the electric motor to be driven by the electric motor. The handheld spray gun fluidly connected to the pump to receive spray fluid from the pump, the handheld spray gun includes a gun body having a gun handle; a gun mount formed on the gun body; and a trigger configured to control spraying of the spray fluid by the handheld spray gun. The gun mount is configured to interface with the module mount to support the handheld spray gun on the pump module.

According to yet another additional or alternative aspect of the disclosure, a spray gun that connects with a conduit that supplies spray fluid via a fluid hose having a hose fitting and has a wire connector for a plurality of wires one or more of which supply electrical energy, the spray gun includes a gun body including a handle; a trigger supported by the gun body; a nozzle configured to emit an atomized spray of the spray fluid; a spray valve that controls flow of the spray fluid to the nozzle; a solenoid configured to actuate the spray valve. The handle includes a door that covers, and when removed exposes, an internal fluid fitting and an internal electrical connector, the internal fluid fitting connectable to the fluid hose and the internal electrical connector connectable to the plurality of wires.

According to yet another additional or alternative aspect of the disclosure, a method of servicing a spray gun, the spray gun configured to receive spray fluid and electrical power from a conduit, includes actuating a door forming a portion of a handle of the spray gun from a closed state to an open state to open a cavity within the handle; inserting a portion of the conduit into the cavity through an opening that is uncovered with the door in the open state; forming a first interface between a fluid fitting of the spray gun and a hose fitting of the conduit within the cavity, the first interface exposed by the door being in the open state and enclosed with the door in the closed state; and forming a second interface between an electrical connector of the spray gun and a wire connector of the conduit within the cavity, the second interface exposed with the door being in the open state and enclosed with the door being in the closed state.

According to yet another additional or alternative aspect of the disclosure, a sprayer includes a pump module; a spray gun; and a conduit which extends between the pump module and the spray gun. A first static wick is exposed on the spray gun and a second static wick is exposed on the pump module, the first static wick and the second static wick configured to dissipate static electricity.

According to yet another additional or alternative aspect of the disclosure, a sprayer includes a pump module; a fluid reservoir connected to the pump module; a lid that seals an inlet opening of the fluid reservoir. The lid and the pump module have mating features that permit the lid to be mounted on the pump module when not sealing the inlet opening of the fluid reservoir.

According to yet another additional or alternative aspect of the disclosure, a method of using a sprayer includes removing the lid from the fluid reservoir to expose the inlet opening; mounting the lid on the pump module; and remounting the lid on the fluid reservoir.

According to yet another additional or alternative aspect of the disclosure a sprayer includes a pump module; a fluid reservoir supported by the pump module; a spray gun; a conduit extending between the pump module and the spray gun, the conduit fluidly connecting the pump module and the spray gun; a strap configured to attach to a user; and a clip that attaches the pump module to, and detaches the pump module from, the strap, wherein the clip comprises a kick-out which orientates the fluid reservoir upright with the pump module mounted on the clip.

According to yet another additional or alternative aspect of the disclosure, a pump module for a fluid sprayer includes a pump, the pump comprising a pump housing and at least one piston rod, the piston rod extending such that the piston rod is partially within the pump housing and partially outside of the pump housing; a pump case which contains at least part of the pump; and a module housing that contains both of the pump and the pump case.

According to yet another additional or alternative aspect of the disclosure, a spray system includes a pump module, a spray gun, a transducer, and a controller. The pump module includes an electric motor; and a pump connected to the electric motor to be driven by the electric motor to pump spray fluid. The spray gun is fluidly connected to the pump by a conduit to receive the spray fluid from the pump, the spray gun includes a gun body having a gun handle; a trigger; and a spray valve actuatable between a closed state, in which the spray valve prevents the spray fluid from flowing to a nozzle, and an open state, in which the spray fluid can flow to the nozzle. The transducer is configured to generate parameter information regarding a parameter of the spray fluid at a location downstream of the pump. The controller is operatively connected to the electric motor to control activation of the electric motor and to direct power to the electric motor based on at least one of a spray signal generated by the trigger and the parameter information.

According to yet another additional or alternative aspect of the disclosure, a spray gun that connects with a conduit that supplies spray fluid via a fluid hose having a hose fitting and has a wire connector for a plurality of wires one or more of which supply electrical energy includes a gun body including a handle; a trigger supported by the gun body; a nozzle configured to emit an atomized spray of the spray fluid; a spray valve that controls flow of the spray fluid to the nozzle; and a solenoid configured to actuate the spray valve. The handle includes a door that covers, and when removed exposes, an internal fluid fitting and an internal electrical connector, the internal fluid fitting connectable to the fluid hose and the internal electrical connector connectable to the plurality of wires.

According to yet another additional or alternative aspect of the disclosure, a method of servicing a spray gun configured to receive spray fluid and electrical power from a conduit includes actuating a door forming a portion of a handle of the spray gun from a closed state to an open state to open a cavity within the handle; inserting a portion of the conduit into the cavity through an opening that is uncovered with the door in the open state; forming a first interface between a fluid fitting of the spray gun and a hose fitting of the conduit within the cavity, the first interface exposed by the door being in the open state and enclosed with the door in the closed state; and forming a second interface between an electrical connector of the spray gun and a wire connector of the conduit within the cavity, the second interface exposed with the door being in the open state and enclosed with the door being in the closed state.

According to yet another additional or alternative aspect of the disclosure, a sprayer includes a pump module; a spray gun; and a conduit which extends between the pump module and the spray gun. A first static wick is exposed on the spray gun and a second static wick is exposed on the pump module, the first static wick and the second static wick configured to dissipate static electricity.

According to yet another additional or alternative aspect of the disclosure, a sprayer includes a pump module; a fluid reservoir connected to the pump module; a lid that seals an inlet opening of the fluid reservoir. The lid and the pump module have mating features that permit the lid to be mounted on the pump module when not sealing the inlet opening of the fluid reservoir.

According to yet another additional or alternative aspect of the disclosure, a fluid sprayer includes a pump module; a fluid reservoir supported by the pump module; a spray gun; a conduit extending between the pump module and the spray gun, the conduit fluidly connecting the pump module and the spray gun; a strap configured to attach to a user; and a clip that attaches the pump module to, and detaches the pump module from, the strap, wherein the clip comprises a kick-out which orientates the fluid reservoir upright with the pump module mounted on the clip.

According to yet another additional or alternative aspect of the disclosure, a pump module for a fluid sprayer includes a pump, the pump comprising a pump housing and at least one piston rod, the piston rod extending such that the piston rod is partially within the pump housing and partially outside of the pump housing; a pump case which contains at least part of the pump; and a module housing that contains both of the pump and the pump case.

According to yet another additional or alternative aspect of the disclosure, a fluid spraying assembly includes a spray gun configured to receive pressurized spray fluid through a conduit; and a power source electrically connected to the spray gun by an electrical cord extending between the power source and the spray gun, wherein the power source is configured to mount to the conduit.

According to yet another additional or alternative aspect of the disclosure, a fluid spraying system includes a pump module configured to pump spray fluid from a fluid reservoir, the pump module including a pump and an electric motor configured to drive the pump; a spray gun fluidly connected to the pump module to receive the spray fluid from the pump module, the spray gun including a spray valve and a solenoid configured to actuate the spray valve from a closed state to an open state; a first power source electrically connected to the electric motor to power the electric motor; and a second power source electrically connected to the solenoid to power the solenoid.

According to yet another additional or alternative aspect of the disclosure, a sprayer for spraying a fluid includes an electric motor configured to start to output a rotational motion and stop to cease outputting the rotational motion; a drive which receives the rotational motion from the electric motor and converts the rotational motion to a linear reciprocating motion; a pump having a fluid displacer, the pump receiving the linear reciprocating motion to linearly reciprocate the fluid displacer to pump the fluid; a fluid hose which receives the fluid from the pump; a spray gun having a trigger that outputs a first signal based on actuation of the trigger, the spray gun configured to receive the fluid output by the pump via the fluid hose and to spray the fluid based on actuation of the trigger; a transducer configured to output a second signal based on a sensed parameter of the fluid output by the pump; and a controller configured to power the electric motor to operate the pump, the controller configured to start powering the electric motor to operate the pump based on the first to occur of either the first signal indicating actuation of the trigger or the second signal indicating a first change in the parameter.

BRIEF DESCRIPTION OF THE DRAWINGS

FIG. 6C is a cross-sectional view of the pump module taken along line C-C in

FIG. 6A.

DETAILED DESCRIPTION

Figure 1:
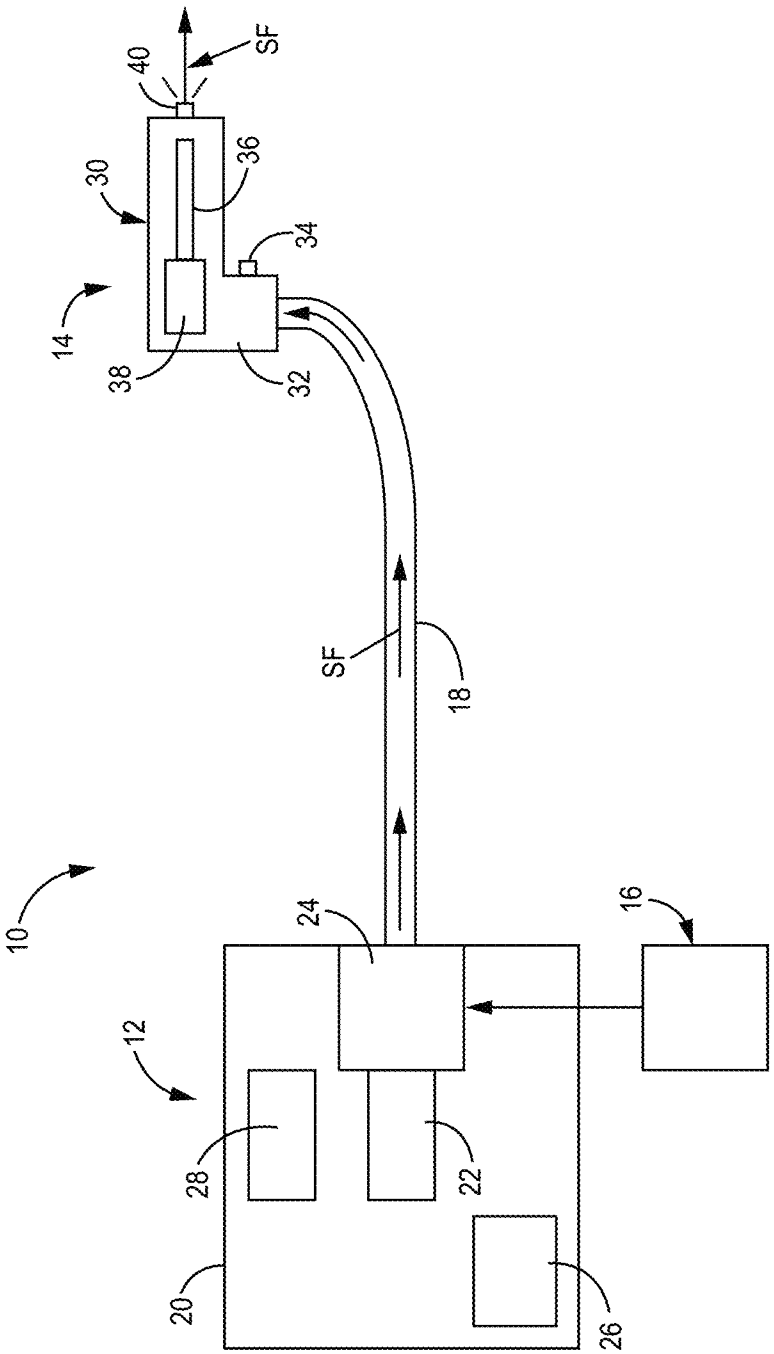
FIG. 1 is a schematic block diagram of a fluid sprayer.

The present disclosure relates to fluid sprayers. Fluid sprayers according to the disclosure include a pump that pressurizes a spray fluid, such as paint, varnishes, lacquer, finishes, and other coatings, among other options, and drives the spray fluid through a conduit, such as a hose, to an applicator, such as a spray gun. The spray gun includes a spray valve that is actuatable between a closed state and an open state to control emission of spray fluid from the spray gun. A trigger of the spray gun is mechanically disconnected from the spray valve such that the spray gun does not mechanically displace the spray valve.

The spray gun can include a solenoid operatively connected to the spray valve to actuate the spray valve from the closed state to the open state. The spray gun includes a trigger that is operatively connected to the solenoid to cause actuation of the solenoid to cause actuation of the spray valve. Actuating the trigger can cause activation of the motor that drives the pump and cause the solenoid to actuate to the open state for spraying. Releasing the trigger can cause depowering of the motor and closure of the solenoid to stop spraying.

The spray gun can include a solenoid, a spray valve, and a nozzle disposed coaxially along a spray axis. The spray valve can include a needle assembly that is movable along the spray axis relative to a seat. The needle assembly can be disposed coaxially with an armature of the solenoid such that the needle assembly and armature shift coaxially.

The spray gun can include a spring that is configured to urge the spray valve to a closed state. The spring can be disposed in a flowpath of the spray fluid through the fluid sprayer such that the spring is exposed to the spray fluid. The spring can displace an armature of the solenoid to reset the solenoid by the spring displacing a movable valving component of the spray valve that is connected to the armature. The spring can be the only spring that acts on the spray valve and the solenoid.

The spray gun can include a fluid housing through which the spray fluid is routed and a solenoid housing that contains the solenoid. The solenoid housing can be mounted to the valve housing such that a portion of the solenoid housing extends around a portion of the valve housing. Some examples of the disclosure include a fluid housing and a solenoid housing formed from thermally conductive materials such that a thermal pathway is formed from the solenoid to the spray fluid through the solenoid housing and the fluid housing for cooling of the solenoid.

The spray valve of the spray gun is configured to open a certain distance to provide quality sprays of the spray fluid. An axial gap between an armature of the solenoid and a stator of the solenoid can set the distance that the spray valve can open. The size of the axial gap can be set by a degree of overlap between the fluid housing and the solenoid housing.

The solenoid can be configured such that a greatest relative electromagnetic force is exerted on the armature of the solenoid when the spray valve is fully open. The electromagnetic force acting on the armature can thus be at a relatively weakest level when the spray valve is in the closed state. Such a configuration saves power when the solenoid is holding the spray valve open because the hold power can be set to a lower level than the power required to cause the solenoid to pick the spray valve open from the closed state.

The disclosure further relates to control of the solenoid of the spray gun and/or the motor of the pump module. Operation of the solenoid and the motor can be sequenced such that a delay period is provided between activation of the solenoid and activation of the motor. The motor can be configured to start prior to the solenoid opening to build pressure in the fluid circuit. The solenoid can be depowered to close the spray valve while the motor is at least partially powered or while the motor is depowered but a rotor of the motor continues to coast to drive the pump to build pressure in the fluid circuit for subsequent spray operations.

The controller can be configured to dynamically alter powering of the motor and the solenoid. The controller can change the sequence of motor and solenoid activation and/or change the delay period between motor and solenoid activation based on user input and/or sensed factors of the spray system, such as measured deadband and/or parameters of the spray fluid (e.g., flow, pressure, viscosity, etc.).

The controller can be configured to regulate a power level provided to the solenoid based on an operating state of the solenoid, such as whether the solenoid is picking the spray valve open or holding the spray valve open. According to some aspects of the disclosure, the controller can provide a first power level to the solenoid when initially activating the solenoid to cause the spray valve to shift to the open state and can provide a second power level that is different from the first power level to the solenoid to cause the solenoid to hold the spray valve in the open state.

The controller can be configured to regulate the power level provided to the solenoid based on voltage control, in which a first voltage level is provided to the solenoid to cause the solenoid to actuate the spray valve to the open state and a second voltage level is provided to the solenoid to cause the solenoid to hold the spray valve in the open state.

The controller can be configured to regulate the power level provided to the solenoid based on current control, in which a first current level is provided to the solenoid to cause the solenoid to actuate the spray valve to the open state and a second current level is provided to the solenoid to cause the solenoid to hold the spray valve in the open state.

The disclosure further relates to pump modules for fluid sprayers. The pump module includes an electric motor and a pump that is connected to the electric motor to be driven by the electric motor. The pump module can include a fluid reservoir supported by the pump module. The pump module is fluidly connected to the spray gun to provide the spray fluid to the spray gun for spraying through a nozzle of the spray gun. The fluid reservoir can include a tube pot that includes openings at both axial ends, one for receiving spray fluid into the tube pot and the other for outputting spray fluid from the tube pot to the pump.

The tube pot can mount to a basin that is itself mounted to a pump body of the pump such that the tube pot is supported relative to the pump but is not directly mounted to the pump. The basin can be wider than the tube pot such that the tube pot extends into the basin to seat within the basin. The tube pot can mount to the basin at a tab-in-slot interface that provides mechanical advantage for removal of the tube pot from the basin.

The spray gun can be mounted to the pump module in multiple orientations such that the spray gun is supported by the pump module. The user can then carry both the spray gun and the pump module by carrying the pump module with the spray gun mounted to the pump module. The pump module can be worn by a user during operation to move about a job site with the user. The spray gun can be mountable to either lateral side of the pump module to accommodate wearing of the pump module on either side of the user. The spray gun can be mounted on either lateral side in forward or backwards orientations to accommodate preferences of the user.

The disclosure further relates to independent control of the electric motor and the solenoid. The spray gun can include a controller responsive to signals from the trigger that controls activation of the solenoid for actuating the spray valve to the open state. The pump module can include another controller that controls operation of the electric motor to control pumping by the pump. The controllers can be communicatively connected, by wired or wireless communications, according to some aspects of the disclosure such that the pump module controller controls operation of the motor based on signals from the trigger. The controllers can be communicatively disconnected according to some aspects of the disclosure such that the pump module controller controls operation of the motor based on sensed parameters of the system, such as changes in fluid pressure or fluid flow.

Components can be considered to radially overlap when those components are disposed at common axial locations along an axis. A radial line extending orthogonally from axis will extend through each of the radially overlapping components. Components can be considered to axially overlap when those components are disposed at common radial and circumferential locations relative to the axis. An axial line parallel to the axis will extend through the axially overlapping components. Components can be considered to circumferentially overlap when aligned about the axis, such that a circle centered on the axis passes through the circumferentially overlapping components.

FIG. 1 is a schematic block diagram of fluid sprayer 10. Fluid sprayer 10 includes pump module 12, spray gun 14, reservoir 16, and conduit 18. Pump module 12 includes module housing 20, motor 22, pump 24, power source 26, and controller 28. Spray gun 14 includes gun body 30 having gun handle 32, trigger 34, spray valve 36, solenoid 38, and nozzle 40.

Fluid sprayer 10 is configured to generate pressurized sprays of fluid for application on a substrate, such as a surface. The fluid sprayer 10 can also be referred to as a spray system. Pump module 12 is configured to pressurize spray fluid, typically a liquid, from reservoir 16 and drive the spray fluid downstream to spray gun 14 through conduit 18. Conduit 18 extends between and fluidly connects pump module 12 and spray gun 14. Pump 24 of pump module 12 is fluidly connected to reservoir 16 to receive the spray fluid from reservoir 16. Pump 24 is fluidly connected to spray gun 14 to pump the spray fluid to spray gun 14 and through nozzle 40 for spraying, as shown by arrows SF in FIG. 1. In some examples, reservoir 16 can be mounted to or otherwise be integrated with pump module 12, as discussed in more detail below. In some examples, reservoir 16 can be separate from pump module 12. For example, reservoir 16 can be formed as a bucket or other container that stores a supply of spray fluid. In such an example, a portion of the pump 24, such as a suction tube, can extend into the reservoir 16 to draw the spray fluid from the reservoir 16.

Module housing 20 can at least partially enclose and can support other components of pump module 12. For examples, electrical components of pump module 12 (e.g., controller 28 and motor 22) can be disposed within module housing 20. Pump 24 can be disposed at least partially within and/or can be supported by module housing 20. In some examples, module housing 20 can be formed as a clamshell housing.

Motor 22 is operatively connected to pump 24 to power pumping by pump 24. For example, motor 22 can be connected to a fluid displacer of pump 24 (e.g., one or more diaphragms, one or more pistons, etc.) to cause reciprocation of the fluid displacer. Motor 22 can be of any desired configuration suitable for causing displacement of the fluid displacer. For example, motor 22 can be an electric motor (direct current (brushed or brushless) or alternating current, among other options). In some examples, motor 22 can be connected to pump 24 by a drive (e.g., wobble drive, crank, eccentric, scotch yoke, etc.) that converts the rotational output of motor 22 to a reciprocating linear input provided to the fluid displacer of pump 24 to cause reciprocation of the fluid displacer.

Spray gun 14 is configured to receive the pressurized fluid output by pump 24 through conduit 18 and spray gun 14 is configured to output an atomized spray of the spray fluid. Pump module 12 and spray gun 14 are disposed remote from each other. Gun body 30 can at least partially enclose and/or support other components of spray gun 14. For example, gun body 30 can be formed as a clamshell housing that at least partially, or fully, encloses other components of spray gun 14. Gun handle 32 can be formed as a portion of gun body 30. Gun handle 32 projects relative to a main housing portion of gun body 30. Gun handle 32 is configured to be held in the hand of a user such that spray gun 14 can be considered to form a handheld spray gun. For example, the user can grasp gun handle 32 with a single hand to aim spray gun 14 and control spraying by spray gun 14.

Trigger 34 is configured to be manipulated by the user to cause emission of spray fluid by spray gun 14. Trigger 34 can be considered to form at least a part of an actuator of spray gun 14. For example, trigger 34 can be configured to toggle a switch to generate a signal provided to controller 28. The switch can be communicatively connected to controller 28 to provide the signal to controller 28 indicating actuation of trigger 34. In such an example, the trigger 34 and switch can be considered to form the actuator.

In the example shown, trigger 34 is located next to or is part of the gun handle 32. Actuation of trigger 34 causes the spray gun 14 to emit the fluid through nozzle 40. In the example shown, trigger 34 is a button which can be depressed, but it is understood that the trigger 34 can take different forms. For example, trigger 34 can be formed as a lever arm that is pulled by fingers of the user. Trigger 34 is mounted on the spray gun 14. In this way, the trigger 34 can be separate from the pump module 12 as the conduit 18 extends away from the pump module 12 to spray gun 14 that includes trigger 34.

Trigger 34 is communicatively connected to controller 28 to provide signals to the controller 28. For example, trigger 34 can be communicatively connected to controller 28 via a wired or wireless connection. In some examples, the wired connection can be formed by one or more wires that extend along conduit 18 between spray gun 14 and pump module 12. In some examples, the wired connection can include wires that extend from solenoid 38 and trigger 34 to pump module 12. Conduit 18 can include an outer sheath that encloses the wires for the wired connection, in examples including a wired connection. Conduit includes a fluid conveying hose that conveys the spray fluid from the pump module 12 to the spray gun 14 under pressure. As such, some examples include a conduit 18 that conveys communication signals, power signals, and spray fluid between pump module 12 and spray gun 14.

Nozzle 40 is formed as an orifice of spray gun 14 that is configured to emit the spray fluid. Nozzle 40 can be configured to emit the liquid spray fluid in a spray pattern. Nozzle 40 can be shaped to form the spray pattern emitted by spray gun 14. For example, nozzle 40 can be configured to generate a spray fan. A fluid flow path is formed through spray gun 14 between the conduit 18 that inputs spray fluid to the spray gun 14 and nozzle 40 that outputs spray fluid from the spray gun 14.

Spray valve 36 is disposed within spray gun 14. Spray valve 36 is disposed upstream of nozzle 40. Spray valve 36 is configured to control flow of the spray fluid to nozzle 40 for emission from spray gun 14. Spray valve 36 is actuatable between a closed state, in which spray valve 36 prevents the spray fluid from flowing to nozzle 40, and an open state, in which the spray fluid can flow through spray valve 36 to nozzle 40 for emission from the spray gun 14.

Solenoid 38 is operatively connected to spray valve 36 to control actuation of the spray valve 36 between the closed state and the open state. For example, an armature of the solenoid 38 can be connected to a movable valving component of the spray valve 36 (e.g., the armature can be connected to a needle, among other valving component options) such that movement of the armature causes movement of valving component of the spray valve 36. In some examples, solenoid 38 is connected to spray valve 36 to actuate spray valve 36 from the closed state to the open state. In some examples, solenoid 38 is a single-acting solenoid and a spring returns the spray valve 36 to the closed state from the open state. In some examples, solenoid 38 is a double-acting solenoid configured to drive the spray valve 36 from the closed state to the open state and from the open state to the closed state. Solenoid 38 can be supported by gun body 30, through it is understood that not all examples are so limited.

Power source 26 is configured to provide electric power to electric powered components of fluid sprayer 10 (e.g., controller 28, motor 22, and solenoid 38). Power source 26 can be formed as an electric battery (e.g., rechargeable lithium ion based, among other options). The electric battery can be removable. In some examples, power source 26 can be formed as a power cord configured to plug into an electrical socket. Power source 26 can be of any desired configuration for providing electrical power to electric powered components of fluid sprayer 10. In some examples, fluid sprayer 10 can include multiple, discrete power sources 26. For example, a first power source 26 can be associated with pump module 12 to provide electrical power to components of pump module 12 (e.g., controller 28 and/or motor 22) and a second power source 26 can be associated with spray gun 14 to provide electrical power to components of spray gun 14 (e.g., solenoid 38 and, in some examples, a controller of the spray gun 14). In some examples, the first power source 26 can be one of a battery and a power cord and the second power source 26 can be one of a battery and a power cord.

Controller 28 is operatively connected to other components of fluid sprayer 10 to control operation of the other components of fluid sprayer 10. Controller 28 is operatively connected to motor 22, electrically and/or communicatively, to control operation of motor 22. Controller 28 can be operatively connected to trigger 34, electrically and/or communicatively, to receive control signals from trigger 34. For example, trigger 34 can be configured to provide spray signals to controller 28. In some examples, a first spray signal from trigger 34 can cause controller 28 to activate motor 22 to cause pumping by pump 24 and a second spray signal from trigger 34, or cessation of the first spray signal, can cause controller 28 to deactivate motor 22 to stop pumping by pump 24. Controller 28 can be operatively connected to solenoid 38, electrically and/or communicatively, to control activation of solenoid 38 and thereby control actuation of spray valve 36 between states. The first spray signal from trigger 34 can cause controller 28 to activate solenoid 38 to cause actuation of spray valve 36 to the open state and the second spray signal from trigger 34, or cessation of the first spray signal, can cause controller 28 to deactivate solenoid 38 to allow a spring to actuate spray valve 36 to the closed state (e.g., in a single-acting solenoid example) or can cause controller 28 to alter the power provided to solenoid 38 to cause solenoid 38 to actuate spray valve 36 to the closed state (e.g., in a double-acting solenoid example).

Controller 28 is configured to store software, implement functionality, and/or process instructions. Controller 28 is configured to perform any of the functions discussed herein, including receiving an output from any sensor referenced herein, detecting any condition or event referenced herein, and controlling operation of any components referenced herein. Controller 28 can be of any suitable configuration for controlling operation of components of fluid sprayer 10 (e.g., motor 22 and/or solenoid 38), receiving signals from components of fluid sprayer 10 (e.g., trigger 34), gathering data, processing data, etc. Controller 28 can include hardware, firmware, and/or stored software, and controller 28 can be entirely or partially mounted on one or more boards. Controller 28 can be of any type suitable for operating in accordance with the techniques described herein. The controller 28 can be one or more circuits for receiving (e.g., from an input, sensor, power source, etc.), conditioning, and/or sending signals (e.g., outputs, commands, power signals). Controller 28 may be one or more distinct circuits. Controller 28 may be one or more distinct boards. Controller 28 may contain digital logic circuit, such chip(s) containing program instructions, for carrying out any of the functions described herein. While controller 28 is illustrated as a single unit, it is understood that controller 28 can be formed as multiple discrete controllers. For example, a first controller 28 can be operatively associated with components of pump module 12 and a separate second controller 28 can be operatively associated with components of spray gun 14. The first and second controllers 28 can be communicatively connected, by wired or wireless communications. In some examples, controller 28 can be implemented as a plurality of discrete circuitry subassemblies.

In some examples, controller 28 includes and/or is operatively coupled to a display device and/or user interface elements (e.g., buttons, dials, graphical control elements presented at a touch-sensitive display, or other user interface elements) to enable user interaction with controller 28, such as for initialization, monitoring, and/or control of the system.

During operation, the user applies spray fluid to a substrate via spray gun 14. The user can support spray gun 14 and manipulate the orientation of the spray output by grasping gun handle 32. In some examples, the user can grasp gun handle 32 and operate spray gun 14 with a single hand of the user. The user initiates spraying by actuating trigger 34, such as by depressing trigger 34 with a finger. Trigger 34 can generate a spray signal and send the spray signal to controller 28. Controller 28 causes activation of motor 22 and motor 22 drives pump 24 to cause pumping by pump 24. Pump 24 draws the spray fluid from reservoir 16 and drives the spray fluid downstream from pump module 12 to spray gun 14 through conduit 18.

Solenoid 38 is activated by controller 28 in response to actuation of the trigger 34 and causes spray valve 36 to shift from the closed state to the open state, opening a flowpath to nozzle 40. For example, controller 28 can provide an activation signal to solenoid 38 to power a coil of a stator of the solenoid 38 to shift the armature of the solenoid 38, the armature actuating the spray valve 36 to the open state. The activation signal can be electric power from the power source 26 provided to the coil of the stator of the solenoid 38. The spray valve 36 shifting to the open state allows the pressurized spray fluid to flow to nozzle 40 to be output from spray gun 14 as the atomized fluid spray.

Controller 28 can be configured to provide different power levels (e.g., different voltage or current levels) to solenoid 38 depending on the operating state of solenoid 38. For example, controller 28 can provide a first power level to solenoid 38 to cause solenoid 38 to initially actuate the spray valve 36 from the closed state and can provide a second power level to solenoid 38 to cause solenoid 38 to hold spray valve 36 in the open state. The pull strength of the solenoid 38 is based on the distance of the armature from the coil. The pull strength increases as the armature is closer to the coil because the electromagnetic fields are stronger and decreases as the armature is further from the coil because the electromagnetic fields are weaker. In some examples, such as in high pressure spraying applications (e.g., greater than about 20.68 megapascal (MPa) (about 3000 pounds per square inch (psi)) to about 51.71 MPa (about 7500 psi)), solenoid 38 can be configured such that the armature distance is at a relatively shortest length with the spray valve 36 in the closed state and at a relatively greatest length with the spray valve 36 in the open state. In such an example, the solenoid 38 will thus have the greatest driving force on the armature when initially picking the spray valve 36 from the closed state. Having the relatively strongest pull strength to pick the spray valve 36 open from the closed state assists in overcoming the high hydraulic pressures that are acting on the spray valve 36 to maintain the spray valve 36 in the closed state. Such a configuration allows for a smaller and less expensive solenoid 38 in high pressure spray applications. It is understood, however, that not all examples are so limited.

The user releases trigger 34 to stop fluid spraying from spray gun 14. Release of the trigger 34 can, in some examples, generate a second spray signal that is provided to controller 28 to cause the controller 28 to depower motor 22, such as by stopping provision of electric driving power to the motor 22 or reducing the power to an idle level such that the rotor of the motor 22 is not rotatably driven. In other examples, controller 28 can be configured to depower motor 22 based on the spray signal no longer being received from spray gun 14. For example, the spray signal can be generated and provided to controller 28 throughout the period when the trigger 34 is actuated to cause spraying and release of the trigger 34 can cause the spray signal to no longer be generated or provided to controller 28.

The user releasing trigger 34 also causes spray valve 36 to close, shutting off the fluid pathway to nozzle 40. Spray valve 36 shifting to the closed state stops the emission of spray fluid from spray gun 14. For example, detriggering the trigger 34 can cause the solenoid 38 to be transitioned to a non-spray state. The controller 28 is configured to stop transmission of power to the coil of solenoid 38 or cause only a low level of power insufficient to shift the armature or maintain the armature in the displaced position to be provided to the coil with solenoid 38 in the non-spray state. The solenoid 38 being depowered allows the spray valve 36 to shift to the closed state. For example, a spring can displace the spray valve 36 to the closed state from the open state. In some examples, solenoid 38 can be configured as a double-acting solenoid 38 is which solenoid 38 is actively powered to actuate spray valve 36 both from the closed state to the open state and from the open state to the closed state. In such an example, powering a first coil of the solenoid 38 causes the solenoid 38 to shift the spray valve 36 to the open state and powering a second coil of the solenoid 38 causes the solenoid 38 to shift the spray valve 36 to the closed state. In such an example, controller 28 provides power to solenoid 38 with solenoid 38 in the non-spray state to cause the solenoid 38 to drive the spray valve 36 to the closed state. Solenoid 38 includes at least one coil and can include more than one coil.

Fluid sprayer 10 provides significant advantages. A user can trigger the spray gun 14 hundreds or thousands of times a day to apply spray fluid. Spray gun 14 includes trigger 34 that generates electrical signals to cause actuation of spray valve 36. The user is not required to physically overcome the fluid pressure that is acting on spray valve 36 to cause the spray valve 36 to actuate to the open state. Instead, electrical power is supplied to solenoid 38 based on the user actuating trigger 34 and the solenoid 38 actuates the spray valve 36 to the open state. Such a configuration significantly reduces the physical exertion required by the user to operate spray gun 14, thereby reducing fatigue and providing for more efficient spraying.

Figure 2:
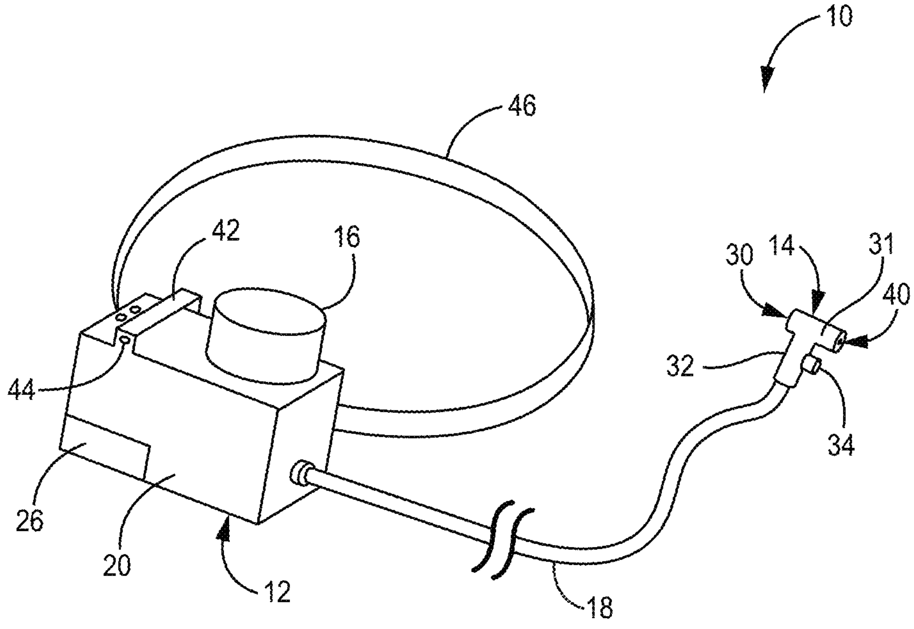
FIG. 2 is a simplified diagram of a fluid sprayer.

FIG. 2 is a simplified diagram of a fluid sprayer 10. Fluid sprayer 10 includes pump module 12, spray gun 14, power source 26, and conduit 18. Reservoir 16, module housing 20, module handle 42, and mount 44 of pump module 12 are shown. Gun body 30, trigger 34, and nozzle 40 of spray gun 14 are shown. Gun housing 31 and gun handle 32 of gun body 30 are shown.

Pump module 12 includes a pump that is powered by a motor to pump spray fluid from pump module 12 to spray gun 14 through conduit 18. Conduit 18 extends between and is connected to pump module 12 and spray gun 14. Conduit 18 fluidly connects pump module 12 and spray gun 14. In some examples, conduit 18 electrically connects pump module 12 and spray gun 14.

In the example shown, fluid sprayer 10 is a handheld sprayer in that fluid sprayer 10 can be fully supported by being carried by a person while spraying. Some components of the fluid sprayer 10 can be supported by the user's body. Fluid sprayer 10 includes spray gun 14 that includes gun handle 32 for gripping by a hand of the user such that the fluid sprayer 10 can be operated by one hand of the user. Gun body 30 supports other components of spray gun 14. Gun housing 31 is configured to house various components of spray gun 14. Gun handle 32 can be considered to form a portion of gun body 30. Gun handle 32 projects from gun housing 31 in the example shown. Gun handle 32 can be formed integrally with gun housing 31 or separate from gun housing 31. In some examples, portions of gun handle 32 can be formed monolithically with portions of gun housing 31.

The fluid sprayer 10 includes pump module 12 that can be supported by the user during spraying such that the pump module 12 is mobile and carried with the user. Module housing 20 can contain components of pump module 12 and support components of pump module 12. Module housing 20 can be formed form a polymer, among other options. In some examples, module housing 20 can be formed as a clamshell housing.

In the example shown, pump module 12 is configured to be supported by the user during operation such that pump module 12 is carried by the user. The example shown includes pump module 12 attached to a strap 46 for holding the pump module 12 to the user. In this case, the strap 46 is a belt which can be worn around the waist of the user, however other options are possible, such as a shoulder strap or backpack, amongst other options. In each instance, the pump module 12 that pressurizes the spray fluid can be supported by the user to move with the user without occupying the hands of the user, while the spray gun 14 that emits the fluid spray can be supported, operated, and manipulated by a single hand of the user.

The fluid sprayer 10 includes a power source 26. In this embodiment, the power source 26 is a removable electric battery (e.g., rechargeable lithium ion based), although in various other versions the power source 26 can be an electrical cord for plugging into an electrical outlet, such as a wall outlet.

Fluid sprayer 10 includes a fluid reservoir 16. The fluid reservoir 16 can contain the fluid to be sprayed. In the example shown, fluid reservoir 16 is fully supported on the pump module 12. The fluid reservoir 16 is mounted on the top of the pump module 12 in this embodiment. It is understood, however, that in various other embodiments the fluid reservoir 16 can be to the side of and/or below the pump module 12 or be integrated entirely within the module housing 20 of the pump module 12.

Fluid sprayer 10 includes a conduit 18 that extends from pump module 12 to spray gun 14. Conduit 18 is flexible and includes a hose for routing the spray fluid under pressure. As further discussed herein, the conduit 18 can have one or more wires integrated into conduit 18 to transmit electrical signals (including power and/or communication) between the pump module 12 and the spray gun 14. The wires can be disposed between an outer sheath of the conduit 18 and the fluid conveying hose of the conduit 18.

Fluid sprayer 10 includes a trigger 34. In the example shown, trigger 34 is configured as a component of the spray gun 14. Trigger 34 is located next to or is part of the gun handle 32 in the example shown. Actuation of the trigger 34 causes the fluid sprayer 10 to emit a fluid spray from nozzle 40 of spray gun 14. In the example shown, trigger 34 is configured as a button which can be depressed, but the trigger 34 can take different forms. The trigger 34 is mounted on the spray gun 14 in the example shown. In this way, the trigger 34 can be separate from the pump module 12 as the conduit 18 extends away from the pump module 12 to the spray gun 14.

The trigger 34 can be electrically connected to a controller 28 within the pump module 12, such as via a wired or wireless connection. The trigger 34 can be considered to form an electrical switch. Actuation of the trigger 34 can generate a spray signal that is provided to the controller 28 to cause the controller 28 to activate the motor and cause pumping by the pump of pump module 12 and can cause the spray valve within spray gun 14 to shift to the open state to cause the fluid sprayer 10 to spray fluid from nozzle 40.

In the example shown, the pump module 12 includes module handle 42 for supporting the body of the pump module 12 by hand. The module handle 42 shown includes two support legs and a grip portion extending between the two support legs. The two support legs extend vertically upward from the main body portion of module housing 20. In the example shown, the module handle 42 extends from the same side of module housing 20 as reservoir 16, though it is understood that not all examples are so limited. Module handle 42 can be formed from the same material as module housing 20. Module handle 42 can be considered to form a portion of the module housing 20.

In the example shown, pump module 12 includes at least one mount 44. The mount 44 can also be referred to as a module mount or a pump mount. In the example shown, mount 44 is formed on module handle 42; however, it is understood that the mount 44 may be located elsewhere on the pump module 12. The mount 44 can include a receiver for receiving part of the spray gun 14, for securing the spray gun 14 to the pump module 12. As such, a user can connect the spray gun 14 to the pump module 12 at mount 44 and then carry pump both pump module 12 and spray gun 14 by carrying the pump module 12, such as via module handle 42, with the spray gun 14 connected at mount 44. In some examples, a snap fit connection may be established between the spray gun 14 and the pump module 12 for connecting the spray gun 14 to the mount 44, such as by engagement of tabs and recesses of respective housings of the spray gun 14 and the pump module 12. In some examples, slot-and-tab engagement can be used for a connection that is established and separated by relative sliding between spray gun 14 and pump module 12. In some examples, mount 44 can be formed as a recess configured to receive a portion of spray gun 14 for mounting spray gun 14 to pump module 12.

In some examples, pump module 12 can include a mount 44 located on both lateral sides of the pump module 12 so that the spray gun 14 can be mounted on either lateral side of the pump module 12 depending on which side of the user's body the pump module 12 is mounted. Thus, the spray gun 14 can be mounted on either lateral side of the pump module 12.

In some examples, complementary mounting can be located on both lateral sides of the spray gun 14 to connect with both lateral sides of the pump module 12. In some examples, spray gun 14 can include a single complementary mount that can be connected to either of the mounts 44 of pump module 12. When the spray gun 14 is mounted on either lateral side of the pump module 12, the spray gun 14 can point in any of two directions, such as forward or backward relative to the pump module 12.

For example, when the pump module 12 is worn on the right side of the user, such as on the right hip of the user, the spray gun 14 can be mounted such that gun handle 32 can be pointed either forwards (e.g., towards the front end of pump module 12 that conduit 18 extends from) or backwards (e.g., away from the front end of pump module 12 that conduit 18 extends from) depending on the preference of the user. Likewise, when the spray gun 14 is worn on the left side of the user, such as on the left hip of the user, the spray gun 14 can be mounted such that the gun handle 32 can be pointed either forwards or backwards depending on the preference of the user. In some examples, this is accomplished by having complementary mounts 44 on both lateral sides of the spray gun 14 which selectively connect with mountings on both lateral sides of the pump module 12. In some examples, this is accomplished by a single mount on spray gun 14 that can selectively connect with mountings on both lateral sides of pump module 12 but with spray gun 14 oriented in either direction, forwards or backwards.

Figure 3:
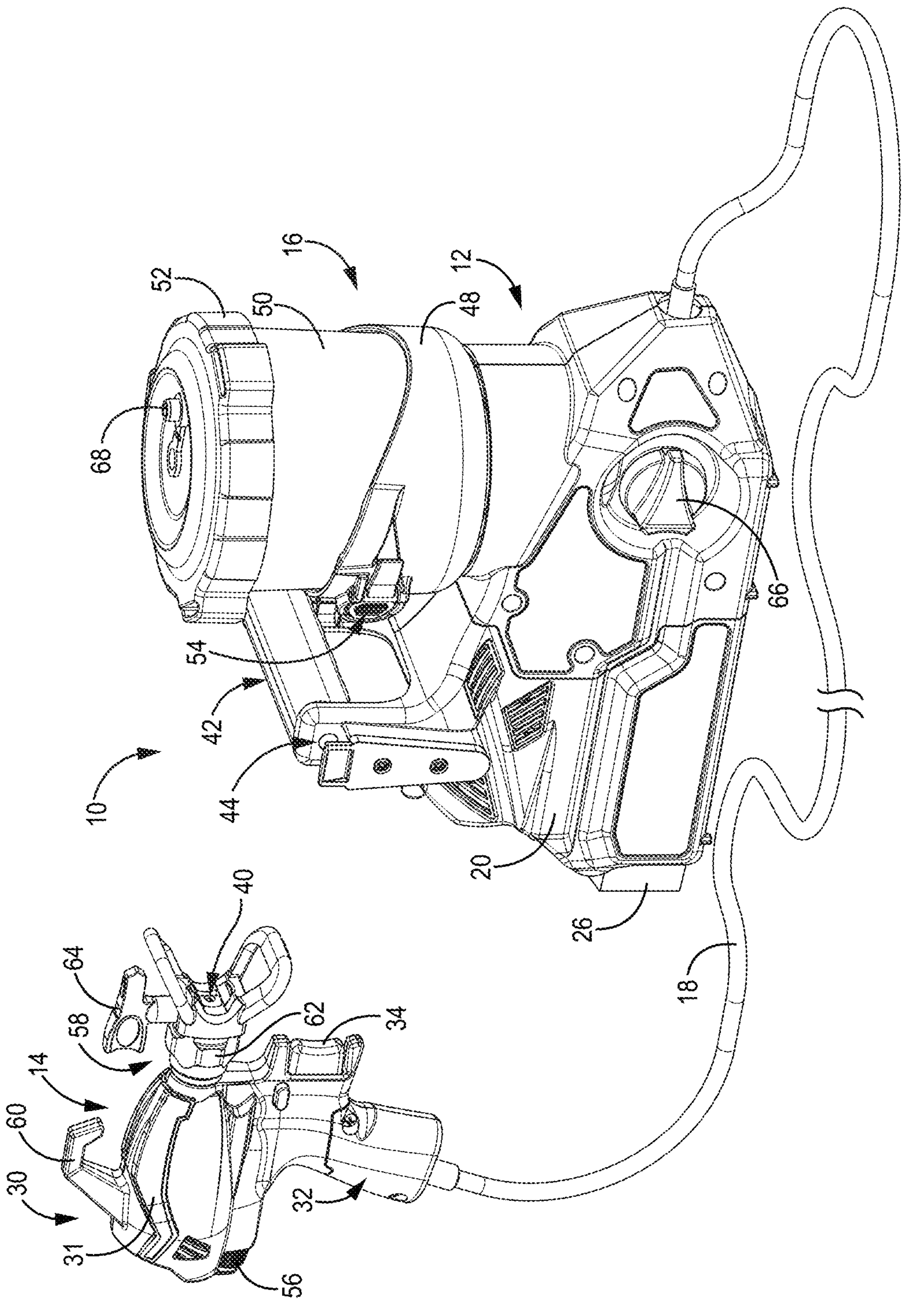
FIG. 3 is an isometric view of a fluid sprayer.

FIG. 3 is an isometric view of fluid sprayer 10. Fluid sprayer 10 includes pump module 12, spray gun 14, power source 26, and conduit 18. Reservoir 16, module housing 20, module handle 42, and mount 44 of pump module 12 are shown. Reservoir 16 includes basin 48, tube pot 50, lid 52, and pot lock 54. Gun body 30 having gun housing 31 and gun handle 32, trigger 34, nozzle 40, spray setting input 56, tip assembly 58, and gun mount 60 of spray gun 14 are shown. Tip assembly 58 includes tip housing 62 and spray tip 64.

Pump module 12 houses and supports various components of fluid sprayer 10. In the example shown, pump module 12 is configured to house and support components that pressurize the spray fluid and drive the spray fluid downstream through conduit 18 for spraying by spray gun 14. More specifically, module housing 20 can support and enclose various components of pump module 12. In some examples, module housing 20 can be formed from halves (e.g., clamshell), amongst other components. Some components of the pump module 12 may be contained within the module housing 20 and other components of pump module 12 may be mounted on the exterior the module housing 20 or be separate from the module housing 20. Some components of pump module 12 can be partially disposed within module housing 20 and partially disposed outside of module housing 20.

Pump module 12 includes valve knob 66. Valve knob 66 can connect with a prime valve internal to pump module 12. Valve knob 66 can actuate the prime valve between a prime state, in which spray fluid can circulate from the pump back to reservoir 16 for priming of the pump, and a spray state, in which the spray fluid is routed to conduit 18 and thus to spray gun 14 for spraying. Valve knob 66 can be rotated or otherwise manipulated between different orientations to actuate the prime valve between the prime and spray states.

Module handle 42 projects outward relative to a main body portion of module housing 20. Module handle 42 is configured for grasping by a hand of the user such that the user can carry and manipulate the pump module 12 with a single hand. In the example shown, module handle 42 extends from a top side of pump module 12.

Mount 44 is formed on pump module 12. In the example shown, pump module 12 includes a mount 44 disposed on each lateral side of pump module 12. More specifically, mounts 44 are disposed on each lateral side of module handle 42. Mount 44 forms a receiver that is configured to interface with a portion of spray gun 14 to support spray gun 14 on pump module 12. In the example shown, a mount 44 is formed on each lateral side of pump module 12, though it is understood that not all examples are so limited. A user can mount the spray gun 14 on pump module 12 at mount 44 and then carry pump module 12, spray gun 14, and conduit 18 by grasping module handle 42.

Reservoir 16 is supported by module housing 20. Basin 48 projects from module housing 20. In the example shown, a portion of basin 48 extends into module housing 20 to interface with the pump body of the pump of pump module 12 at a location within module housing 20, as discussed in more detail below. Tube pot 50 interfaces with and is supported by basin 48. Tube pot 50 is configured to store a supply of the spray fluid that is drawn from tube pot 50 by the pump. In the example shown, tube pot 50 extends into basin 48 such that basin 48 at least partially surrounds portions of tube pot 50. Any spray fluid that may spill from tube pot 50 will flow into the gap formed between basin 48 and tube pot 50 and will be contained within basin 48. Such a configuration prevents the spray fluid from flowing to electrical or other fluid-sensitive components of pump module 12.

Pot lock 54 is configured to interface with a portion of tube pot 50 to lock tube pot 50 on basin 48. In the example shown, pot lock 54 is formed as a levered catch that is configured to interface with a portion of tube pot 50 to secure tube pot 50 on basin 48. In some examples, the pot lock 54 can include a spring configured to engage the pot lock 54 with tube pot 50 to maintain tube pot 50 on basin 48. The user can depress the lever of pot lock 54 to overcome the pot lock spring and unlatch tube pot 50 from basin 48 for removal of tube pot 50 from basin 48. It is understood, however, that pot lock 54 can be of any desired configuration suitable for securing tube pot 50 relative to basin 48.

Lid 52 is mountable to tube pot 50. Lid 52 is configured to enclose the spray fluid within tube pot 50. Lid 52 can be removably mounted on tube pot 50. Lid 52 can be removed to allow filling of reservoir 16 with spray fluid and remounted to tube pot 50 to prevent spilling of the spray fluid.

In the example shown, storage valve 68 is formed on lid 52. Storage valve 68 is actuatable between an open reservoir state (shown), in which the interior of reservoir 16 is open to atmosphere through storage valve 68, and a closed reservoir state, in which the interior of reservoir 16 is not open to atmosphere. In the example shown, storage valve 68 is formed as a plug that can be inserted into or removed from an aperture through lid 52. Storage valve 68 can be placed in the open reservoir state during spraying to prevent formation of a vacuum within reservoir 16. Storage valve 68 can be placed in the closed reservoir state to seal the reservoir 16 and prevent curing of the spray fluid within reservoir 16 and to prevent spillage of spray fluid from reservoir 16 during storage and transport. With storage valve 68 in the closed reservoir state, the user can store pump module 12 with spray fluid still within reservoir 16 and the reservoir 16 is sealed from atmosphere to prevent curing of the spray fluid. The user can resume spraying by opening storage valve 68.

Spray gun 14 is fluidly connected to pump module 12 by conduit 18. Conduit 18 can extend between a fitting on the pump module 12, which can be internal to the module housing 20, and a fitting on spray gun 14, which can be internal to gun body 30. The fittings can include fluid connections for routing pumped spray fluid from pump module 12 to conduit 18 and from conduit 18 to spray gun 14. The fluid connections can be threaded interfaces, among other options. The fittings can also facilitate multiple electrical connections between pump module 12 and conduit 18 and between spray gun 14 and conduit 18. For example, the fittings can be configured to include conductive contacts that can be aligned to form the electrical connections.

Gun body 30 can support and enclose other components of spray gun 14. Gun body 30 can be formed from a polymer, among other options. Gun body 30 can be formed as a clamshell housing, among other options. Gun handle 32 projects from gun housing 31 portion of gun body 30. Gun handle 32 is configured to be held by a single hand of the user such that the user can aim spray gun 14 and cause fluid sprayer 10 to emit spray fluid with the single handle grasping gun handle 32. Gun handle 32 can be considered to form a portion of gun body 30. In some examples, gun handle 32 is formed separately from gun housing 31 and connected to gun housing 31. In some examples, all or portions of gun handle 32 can be integrally formed with gun housing 31, such as by molding. Trigger 34 extends from gun handle 32. Trigger 34 is configured to be actuated by the user to control spraying by fluid sprayer 10.

Tip assembly 58 is mounted to spray gun 14, such as mounted to gun body 30 or to a housing projecting from gun body 30, as discussed in more detail below. Tip assembly 58 can be removably connected to spray gun 14, such as by a threaded interface among other options. More specifically, tip housing 62 of tip assembly 58 is configured to mount to spray gun 14. Spray tip 64 is supported by tip housing 62. The nozzle 40 of spray gun 14 is formed as a portion of spray tip 64. In the example shown, a barrel of spray tip 64 extends into a bore formed within tip housing 62. The nozzle 40 is supported by the barrel.

In the example shown, spray tip 64 is rotatable between a spray state and a de-clog state. For example, spray tip 64 can be rotated 180-degrees between the spray state and the de-clog state. In the spray state, the spray orifice of nozzle 40 is oriented outwards from spray gun 14 to emit the spray fluid as an atomized fluid spray. In the de-clog state, the spray orifice of nozzle 40 is oriented into spray gun 14 such that the spray orifice receives the spray fluid from spray gun 14 and the spray fluid is emitted from an opposite opening in spray tip 64. With spray tip in the de-clog state any clogs can be blown out of spray tip 64 without having to remove and manually clean spray tip 64, facilitating quick maintenance and return to spray operations.

Gun mount 60 is formed on gun body 30. Gun mount 60 can also be referred to as a gun mating part. In the example shown, gun mount 60 is formed as a hook that projects from a top side of gun body 30. It is understood, however, that gun mount 60 can be of any desired configuration suitable for mounting spray gun 14 on pump module 12. In the example shown, gun mount 60 extends from an opposite side of gun body 30 from gun handle 32. Gun mount 60 projects from an opposite side of gun housing 31 from gun handle 32. The gun mount 60 is configured to extend into either one of the mounts 44 of pump module 12 to mount spray gun 14 to pump module 12. Gun mount 60 can be interfaced with either mount 44 on either lateral side of pump module 12 with gun handle 32 oriented either forwards or backwards, as discussed in more detail with regard to FIGS. 9A-9F. As such, spray gun 14 can be mounted to pump module 12 in four distinct orientations in the example shown. The spray gun 14 can be mounted on a first lateral side of pump module 12 with gun handle 32 oriented either forward (towards the front end of pump module 12 that conduit 18 extends from) or backwards (towards the rear end of pump module 12 at which power source 26 is mounted) and can be mounted on a second lateral side of pump module 12 with the gun handle oriented either forward or backwards.

Spray setting input 56 is formed as a component of spray gun 14 in the example shown. Spray setting input 56 is configured to provide a spray setting signal to controller 28 to control a parameter of the spray fluid pumped to spray gun 14 by pump module 12. For example, spray setting input 56 can be configured to generate a spray setting signal indicating a desired speed of the motor of pump module 12, indicating a desired pressure of the spray fluid, etc. Spray setting input 56 can be a potentiometer dial, a digital input, slider, one or more buttons, or other type of input. In the example shown, spray setting input 56 is a dial that is partially exposed on a rear side of spray gun 14. Generally, the user can turn the spray setting input 56 to a higher level for greater pressure and a lower level for lower pressure. The flow of spray fluid, and in particular the pattern of the atomized spray fan, is dependent on the fluid pressure. Spray setting input 56 can be operatively connected, electrically and/or communicatively, with the controller 28 disposed at pump module 12, such as by a wired connection extending along conduit 18. Controller 28 can control operation of motor 22 based on a spray setting signal received from spray setting input 56.

In the example shown, spray setting input 56 is disposed at spray gun 14 that is disposed at an opposite end of conduit 18 from pump module 12. The controller 28 that controls operation of motor 22 is disposed at pump module 12 in the example shown. The spray setting input 56 regulates operation of motor 22 that is disposed at an opposite end of conduit 18 from spray gun 14 where the spray setting input 56 is located.

In some examples, spray setting input 56 is communicatively connected to controller 28 via a wired connection. The wired connection can be formed by wires that extend between the spray setting input 56 and the controller 28 along conduit 18. For example, the wires that transmit the spray setting signal can extend within an outer sheath of the conduit 18 at a location between the fluid conveying hose of the conduit 18 and the outer sheath. In some examples, spray setting input 56 can be wirelessly connected to the controller 28 to provide the spray setting input to the controller 28 via wireless communications.

Power source 26 is configured to power electric components of fluid sprayer 10. In the example shown, power source 26 is supported by module housing 20. Power source 26 is formed as a removable battery in the example shown, though it is understood that power source 26 can be formed as a cord configured to plug into a socket, such as a wall socket.

Figure 4:
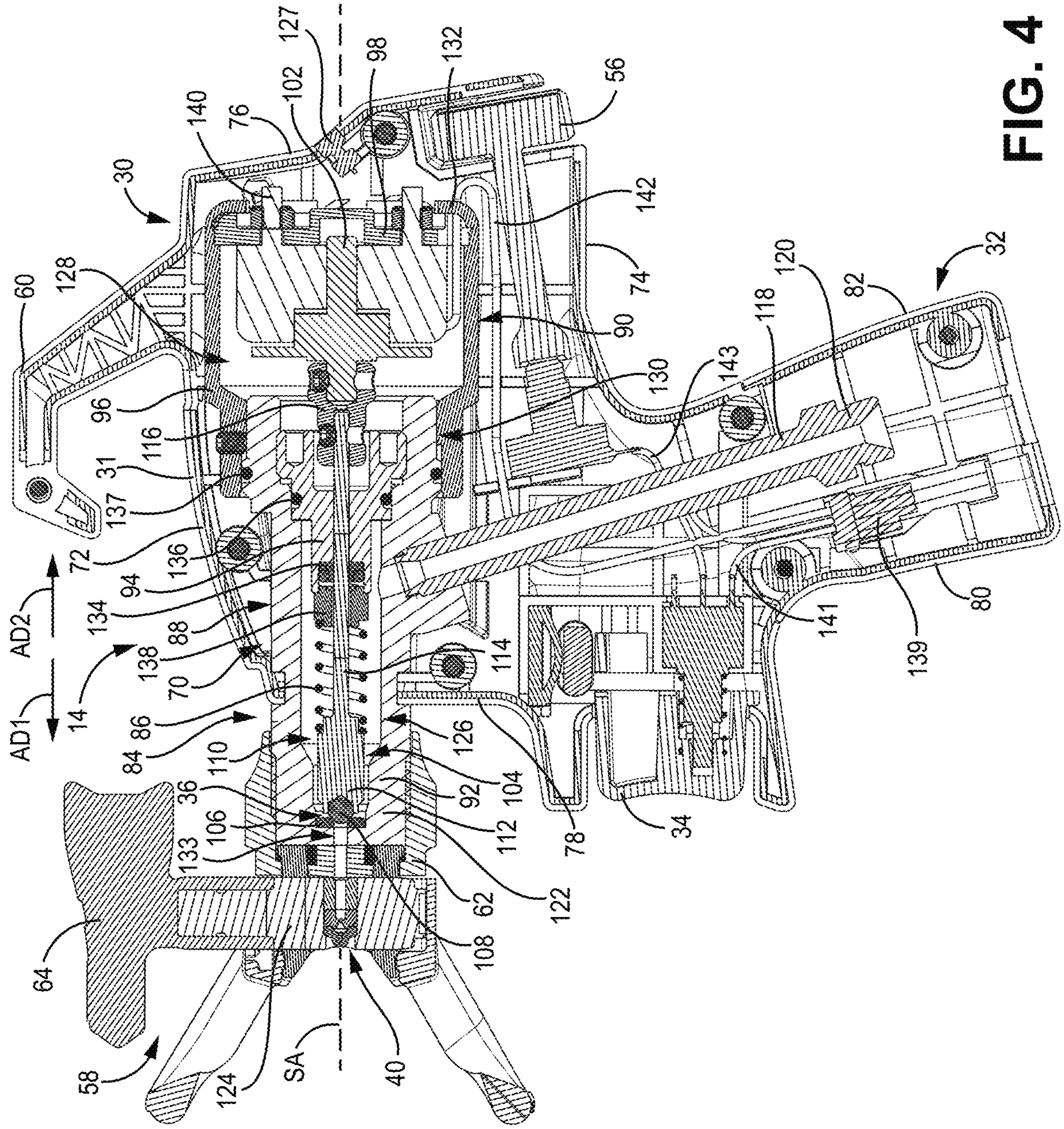
FIG. 4 is a cross-sectional view of a spray gun.

FIG. 4 is a cross-sectional view of spray gun 14. Gun body 30 including gun housing 31 and gun handle 32, trigger 34, spray setting input 56, tip assembly 58, gun mount 60, and spray control assembly 70 of spray gun 14 are shown. Gun housing 30 includes gun top side 72, gun bottom side 74, gun rear side 76, and gun front side 78. Gun handle 32 includes handle front side 80 and handle rear side 82. Tip assembly 58 includes tip housing 62 and spray tip 64, which spray tip 64 includes nozzle 40.

Spray control assembly 70 includes spray valve 36, solenoid 38, assembly housing 84, spring 86, needle assembly 104 and seat 106. Assembly housing 84 includes fluid housing 88 and solenoid housing 90. Fluid housing 88 includes valve housing 92 and seal housing 94. Solenoid housing 90 includes housing body 96 and plate 98. Solenoid 38 includes stator 100 and plunger 102. Spray valve 36 is formed at an interface between Needle assembly 104 includes ball 108 and needle 110. Needle 110 includes needle head 112 and needle shaft 114.

Spray gun 14 is configured to generate an atomized spray of spray fluid for application on a substrate. Gun body 30 supports other components of spray gun 14. Gun mount 60 projects from gun top side 72 in the example shown. Gun handle 32 projects from gun bottom side 74 in the example shown. Gun front side 78 is oriented in first axial direction AD1 along spray axis SA and gun rear side 76 is oriented in second axial direction AD2 along spray axis SA. In the example shown, gun front side 78 is open such that components of spray gun 14 can project through gun front side 78.

Gun handle 32 projects from gun bottom side 74. Gun handle 32 can extend both radially and axially relative to spray axis SA from the interface between gun housing 31 and gun handle 32 and to the distal end of gun handle 32. Handle front side 80 is oriented in first axial direction AD1. Handle rear side 82 is oriented in second axial direction AD2.

Trigger 34 projects outward relative to gun handle 32 and is configured to be actuated by one or more fingers of the user to cause spraying by spray gun 14. In the example shown, trigger 34 extends in first axial direction AD1 from handle front side 80 of gun handle 32. During operation, the user can grasp gun handle 32 with either the left or right hand of the user such that a finger of the user engages with trigger 34 to actuate trigger 34 and such that other fingers of the user wrap around handle front side 80. Handle front side 80 is disposed vertically below trigger 34. Handle front side 80 is disposed radially outward of trigger 34 relative to spray axis SA.

Spray setting input 56 is supported by gun body 30. Spray setting input 56 is exposed on gun rear side 76. Spray setting input 56 can be configured to generate a spray setting signal indicating a desired speed of the motor of pump module 12, indicating a desired pressure of the spray fluid, etc. Spray setting wire 143 extends from spray setting input 56 to electrical connector 139. Spray setting wire 143 can transmit spray setting signals from spray setting input 56 for communication to controller 28.

Spray control assembly 70 is at least partially disposed within gun body 30. In the example shown, spray control assembly 70 is at least partially disposed within gun housing 31. Spray control assembly 70 is configured to control emission of spray fluid from spray gun 14.

Assembly housing 84 is at least partially disposed within gun body 30. In the example shown, assembly housing 84 is at least partially disposed within gun housing 31. In the example shown, assembly housing 84 does not extend into gun handle 32. In the example shown, assembly housing 84 projects outwards from gun front side 78 of gun body 30 in first axial direction AD1. No portion of assembly housing 84 extends through gun rear side 76 in the example shown.

Supply tube 118 extends from assembly housing 84. Supply tube 118 extends from the interface with assembly housing 84 and into gun handle 32. Gun fitting 120 is formed at an opposite end of supply tube 118 from the end of supply tube 118 connected to assembly housing 84. Gun fitting 120 is configured to interface with a fitting of conduit 18 to fluidly and mechanically connect supply tube 118 with the fluid conveying hose of conduit 18. Gun fitting 120 can also be referred to as a fluid fitting. While supply tube 118 is shown as formed separately from and removable from assembly housing 84, it is understood that not all examples are so limited. Supply tube 118 defines a portion of the fluid circuit between the pump 24 and the nozzle 40.

Mount end 122 of assembly housing 84 is disposed outside of the interior of gun body 30 in the example shown. Mount end 122 is configured to interface with a portion of tip assembly 58 to support tip assembly 58 relative to gun body 30. For example, mount end 122 can include threading formed on the exterior of mount end 122 configured to interface with interior threading on a component of tip assembly 58. In the example shown, tip housing 62 is mounted to assembly housing 84 by interfaced threading formed therebetween.

Tip assembly 58 includes nozzle 40 that is configured to atomize the spray fluid into a fluid spray. Tip housing 62 forms a support body of tip assembly 58. Tip housing 62 is mounted to spray gun 14 at assembly housing 84. Spray tip 64 is supported by tip housing 62. A barrel 124 of spray tip 64 is disposed within a bore of tip housing 62. Nozzle 40 is disposed at least partially within barrel 124 and is supported by barrel 124. Barrel 124 is rotatable within tip housing 62 such that the outlet orifice of nozzle 40 can be oriented in first axial direction AD1 with spray tip 64 in a spray state, and the outlet orifice of nozzle 40 can be oriented in second axial direction AD2 with spray tip 64 in a de-clog state.

Fluid housing 88 and solenoid housing 90 are connected together to form assembly housing 84. While assembly housing 84 is shown as formed by multiple housing parts connected together, it is understood that not all examples are so limited. For example, fluid housing 88 and solenoid housing 90 could be formed as a monolithic structure in some examples. In the example shown, fluid housing 88 is connected to and supported by gun body 30. More specifically, fluid housing 88 is connected to gun housing 31. In the example shown, solenoid housing 90 is cantilevered from fluid housing 88.

Fluid housing 88 contains wet chamber 126 and spray valve 36, amongst other components shown. Fluid housing 88 defines wet chamber 126 of assembly housing 84. Wet chamber 126 is a portion of assembly housing 84 through which the spray fluid can flow during spraying. The wet chamber 126 forms a portion of the fluid path through spray gun 14. Fluid housing 88 is configured to hold hydraulic pressure within the wet chamber 126 without rupturing, such as pressures of at least about 3.44 megapascal (MPa) (about 500 pounds per square inch (psi)) and up to about 20.68 MPa (about 3000 psi) or more, in various embodiments.

Solenoid housing 90 contains dry chamber 128 and solenoid 38, amongst other components shown. Solenoid housing 90 at least partially defines dry chamber 128 of assembly housing 84. Dry chamber 128 is a portion of assembly housing 84 that is isolated from the spray fluid and through which the spray fluid does not flow. Dry chamber 128 can be formed as a sealed chamber. In some examples, dry chamber 128 can be hermetically sealed. In the example shown, solenoid 38 is mounted directly to solenoid housing 90.

The solenoid housing 90 is fixed to the valve housing 92 at housing interface 130. The interface can be pin, set screw, clamp, crimp, weld, press-fit, threading, or other manner of attachment. In the example shown, housing body 96 of solenoid housing 90 is connected to fluid housing 88 at housing interface 130. In the example shown, housing body 96 is connected to valve housing 92 of fluid housing 88. Solenoid housing 90 can be connected to fluid housing 88 in any desired manner. In the example shown, solenoid housing 90 is connected to fluid housing 88 by interfaced threading. An axial position of solenoid housing 90 is fixed relative to fluid housing 88 by a set screw that extends through housing body 96 to engage valve housing 92, in the example shown. In the example shown, housing body 96 includes internal threading configured to interface with exterior threading formed on the exterior of valve housing 92. Solenoid housing 90 extends around a portion of fluid housing 88 at the housing interface 130 in the example shown. As such, a portion of solenoid housing 90 can be considered to radially encompass a portion of fluid housing 88.

A portion of solenoid housing 90 radially overlaps with a portion of fluid housing 88. In the example shown, housing body 96 extends around a portion of valve housing 92 such that at least a portion of fluid housing 88 is disposed radially within solenoid housing 90. The radial overlap between solenoid housing 90 and fluid housing 88 secures housing body 96 to fluid housing 88.

It is noted that the housing interface 130 includes overlap such that the position of the solenoid housing 90 can be adjusted relative to the valve housing 92, as compared to an abutment interface with no such adjustment. As shown, the solenoid housing 90 is radially wider than the valve housing 92 at housing interface 130. This allows for a larger circumferential housing interface 130 which helps supports the load generated by the solenoid 38 when activated.

Housing seal 137 is disposed between fluid housing 88 and solenoid housing 90 and is configured to seal dry chamber 128. Housing seal 137 is disposed radially between valve housing 92 and housing body 96 in the example shown. Housing seal 137 can be of any desired configuration suitable for sealing dry chamber 128. For example, housing seal 137 can be an elastomer seal. In some examples, housing seal 137 is an O-ring seal.

A position of solenoid housing 90 can be locked relative to fluid housing 88 to fix a position of solenoid 38 relative to spray valve 36, as discussed in more detail below. In the example shown, a position of solenoid housing 90 is locked relative to fluid housing 88 by a set screw extending through housing body 96 and interfacing with the exterior surface of valve housing 92.

Plate 98 is connected to housing body 96 to enclose the dry chamber 128 within solenoid housing 90. Plate 98 can be press-fit, threaded, welded, or crimped to connect with the housing body 96, amongst other manners of connection. In the example shown, tabs 132 project from housing body 96. As shown, tabs 132 are configured to be bent radially inward to axially overlap with plate 98 and prevent movement of plate 98 in second axial direction AD2.

Spray valve 36 is disposed within fluid housing 88. Spray valve 36 is actuatable between an open state, in which spray fluid can flow from wet chamber 126, through outlet orifice 133 of assembly housing 84, and to and through nozzle 40 for atomization into the fluid spray, and a closed state, in which the spray fluid is prevented from flowing out of wet chamber 126 and to nozzle 40. Spray fluid is configured to exit from assembly housing 84 through outlet orifice 133. Needle assembly 104 is engaged with seat 106 with spray valve 36 in the closed state. Needle assembly 104 is disengaged from seat 106 with spray valve 36 in the open state.

Seat 106 is disposed within fluid housing 88. Seat 106 can directly interface with fluid housing 88, in some examples. Seat 106 can be formed from carbide, among other options. For example, seat 106 can be formed from tungsten carbide, among other options.

Needle assembly 104 is configured to shift axially along spray axis SA as the spray valve 36 is actuated between the open and closed states. The needle assembly 104 is configured to be pulled away from seat 106 of spray valve 36 by the solenoid 36.

In the example shown, ball 108 of needle assembly 104 is configured to interface with seat 106 with spray valve 36 in the closed state to cut off fluid flow through spray valve 36. Ball 108 is disposed at an axial end of needle assembly 104. Ball 108 is disposed at the end of needle assembly 104 opposite solenoid 38. Ball 108 is mounted on needle 110 in the example shown. Ball 108 can be formed from carbide, among other options. For example, ball 108 can be formed from tungsten carbide, among other options.

Needle 110 extends in second axial direction AD2 from ball 108. Needle 110 is elongate along spray axis SA. Needle head 112 is disposed at an axial end of needle 110. Needle head 112 extends in second axial direction AD2 from ball 108. Needle shaft 114 extends axially from needle head 112. Needle shaft 114 extends in second axial direction AD2 from needle head 112. In the example shown, needle shaft 114 extends through needle seal 134 between wet chamber 126 and dry chamber 128. Needle seal 134 fluidly separates wet chamber 126 and dry chamber 128. Needle assembly 104 contacts needle seal 134 to seal against needle seal 134. Needle assembly 104 thus extends from within the wet chamber 126 to within the dry chamber 128. Needle seal 134 surrounds a part of the needle assembly 104 such that a first part of the needle assembly 134 is exposed to the spray liquid and a second part of the needle assembly 134 is not exposed to the liquid, the needle seal 134 located between the first part and the second part of the needle assembly 134.

Needle 110 is configured to slide relative to needle seal 134. Needle assembly 104 is partially disposed within the wet chamber 126 and partially disposed within the dry chamber 128. Needle assembly 104 is slidable relative to needle seal 134. The solenoid 36 is configured to pull the needle assembly 104 partway through the needle seal 134.

Needle seal 134 is disposed within and supported by seal housing 94. Seal housing 94 is mounted to valve housing 92 and supports needle seal 134. In the example shown, seal housing 94 extends into valve housing 92 such that at least a portion of seal housing 94 is disposed within valve housing 92. The seal housing 94 is a cylindrical piece that extends into a bore within the valve housing 92, in the example shown. Seal housing 94 can be connected to valve housing 92 via a threaded interface, among other options. The housing interface 130 can radially overlap with the interface between seal housing 94 and valve housing 92. Such a configuration provides for a compact arrangement of spray gun 14.

Needle 110 interfaces with needle seal 134 to prevent spray fluid in the wet chamber 126 from traveling rearward in second axial direction AD2 past the needle seal 134. Needle seal 134 fluidly separates the wet chamber 126 and the dry chamber 128 to inhibit migration of any spray fluid into the dry chamber 128. In some examples, needle seal 134 is configured as a wiper seal that wipes spray fluid from needle 110 as needle 110 transitions in second axial direction AD2, thereby preventing spray fluid from being carried into the dry chamber 128 by needle 110.

Fluid seal 136 is disposed between valve housing 92 and seal housing 94 and is configured to prevent spray fluid from flowing from wet chamber 126 to dry chamber 128 through the interface between valve housing 92 and seal housing 94. Fluid seal 136 is disposed radially between valve housing 92 and seal housing 94 in the example shown. Fluid seal 136 can be of any desired configuration suitable for preventing fluid flow between valve housing 92 and seal housing 94. For example, fluid seal 136 can be an elastomer seal. In some examples, fluid seal 136 is an O-ring seal.

Spring brace 138 is mounted to seal housing 94, in the example shown. Spring brace 138 can be mounted to seal housing 94 in any desired manner, such as by interfaced threading, among other options. In the example shown, spring brace 138 at least partially defines a chamber that needle seal 134 is disposed within. Spring brace 138 is mounted to seal housing 94 at an end of the bore that needle seal 134 is disposed within. Spring brace 138 can inhibit movement of needle seal 134 in first axial direction AD1. Spring brace 138 provides a surface against which spring 86 can interface to define a limit of spring 86 in second axial direction AD2.

Spring 86 is at least partially disposed within gun body 30. The spring 86 is disposed partially within gun body 30 and partially outside of gun body 30, in the example shown. Spring 86 is partially within and partially outside of gun housing 31 in the example shown. Spring 86 does not extend into and is not disposed within gun handle 32 in the example shown.

Spring 86 is disposed within fluid housing 88. More specifically, spring 86 is disposed within valve housing 92 of fluid housing 88. In the example shown, spring 86 is disposed within wet chamber 126 such that spring 86 is exposed to the spray fluid. Spring 86 interfaces with needle assembly 104 to bias needle assembly 104 in first axial direction AD1. In the example shown, spring 86 interfaces with needle 110 of needle assembly 104. In the example shown, spring 86 interfaces with a surface of needle head 112, which surface is oriented in second axial direction AD2.

Coupler 116 is connected to needle 110. Coupler 116 is disposed at an opposite axial end of needle 110 from ball 108. The seal housing 94 includes a cavity into which coupler 116 extends. It is understood, however, that in various examples the coupler 116 may not extend into a cavity of seal housing 94 and/or seal housing 94 may not include a cavity oriented in second axial direction AD2. Coupler 116 is mounted to needle 110 such that coupler 116 and needle 110 move together along spray axis SA. Coupler 116 can be connected to the needle 110 in any desired manner suitable for locking needle 110 and coupler 116 together for simultaneous movement, such as by a pin, set screw, clamp, crimp, weld, press-fit, threading, or other manner of attachment. In the example shown, coupler 116 is connected to needle 110 by a set screw that extends through coupler 116 and engages a surface of needle shaft 114.

Coupler 116 is disposed within dry chamber 128 formed within solenoid housing 90. Coupler 116 is isolated from the spray fluid and is not in contact with the spray fluid in the example shown. Coupler 116 is disposed intermediate the needle assembly 104 and the solenoid 38. In the example shown, coupler 116 is positioned to radially overlap with housing interface 130. Coupler 116 fixes needle assembly 104 and plunger 102 of solenoid 38 together for simultaneous movement, in the example shown. Coupler 116 is positioned to radially overlap with housing interface 130 in the example shown.

Plunger 102 forms the armature of solenoid 38. Plunger 102 has a magnetically attracted part (e.g., permanent magnets, electromagnets, etc.) that is electromagnetically moved by stator 100. Coupler 116 is connected to plunger 102 such that coupler 116 and plunger 102 move simultaneously along spray axis SA. Coupler 116 connects plunger 102 and needle 110 together such that needle 110 and plunger 102 move together along spray axis SA. Coupler 116 can be connected to plunger 102 in any desired manner suitable for locking plunger 102 and coupler 116 together for simultaneous movement, such as by a pin, set screw, clamp, crimp, weld, press-fit, threading, or other manner of attachment. In the example shown, coupler 116 is connected to plunger 102 by a set screw that extends through coupler 116 and engages a surface of plunger 102.

Solenoid 38 is disposed within solenoid housing 90. Solenoid 38 is disposed within dry chamber 128 formed within solenoid housing 90. Dry chamber 128 is a sealed chamber that isolates solenoid 38 from any spray fluid flowing through spray gun 14. Dry chamber 128 can be a sealed chamber that isolates solenoid 38 from any environmental intrusion. For example, the sealed dry chamber 128 can inhibit any environmental contaminants (e.g., overspray, which is spray fluid that does not adhere to the target surface and is instead in the atmosphere, dust, grease, moisture, etc.). In some examples, dry chamber 128 is hermetically sealed.

Solenoid 38 includes stator 100 and plunger 102. Stator 100 includes one or more coils which generate electromagnetic fields when electric current is run through the one or more coils. The coils can be disposed coaxial with and extend around spray axis SA. Plunger 102 is reactive to the electromagnetic fields generated by stator 100 to be displaced along axis SA by the electromagnetic field. In some examples, solenoid 38 is a double-acting solenoid in which electromagnetic fields generated by stator 100 cause plunger 102 to shift in both first axial direction AD1 and second axial direction AD2. In such an example, solenoid 38 can include a pair of coils, one of which is charged to cause plunger 102 displacement in first axial direction AD1 and the other one of which is charged to cause plunger 102 displacement in second axial direction AD2. In some examples, solenoid 38 is a single-acting solenoid in which electromagnetic fields generated by stator 100 cause plunger 102 to shift in one or the other of the first axial direction AD1 and the second axial direction AD2. The plunger 102 can then be mechanically displaced in the other axial direction, such as by spring 86. In the example shown, the stator 100 is configured to electromagnetically displace plunger 102 in second axial direction AD2 and spring 86 is configured to mechanically displace plunger 102 in first axial direction AD1.

In the example shown, stator 100 is mounted to plate 98. Stator 100 can be mounted directly to plate 98 to contact plate 98. In particular, stator 100 can be bolted to the plate 98 among other options. In the example shown, posts 140 extend from stator 100 and through plate 98. The posts 140 can be threaded to engage with threaded nuts to secure stator 100 to plate 98. It is understood, however, that stator 100 can be secured within dry chamber 128 in any desired manner. In some examples, the openings through plate 98 that the posts 140 extend through can be sealed with epoxy or another sealant to hermetically seal the openings through plate 98. Solenoid wire 142 extends from stator 100 and is configured to provide power to the coil of stator 100. Solenoid wire 142 can include two wires for each coil that represent the ends of the coil. Solenoid wire 142 extends through an aperture in plate 98 and out of the dry chamber 128. The aperture that the solenoid wire 142 extends through can be sealed with epoxy or another sealant to hermetically seal that opening. Stator 100 is kept stationary with respect to the solenoid housing 90, fluid housing 88 and nozzle 40.

Extending at least partially within the stator 100 is plunger 102. Plunger 102 can be considered to form the armature of solenoid 38. Plunger 102 is configured to be displaced by the electromagnetic fields generated by stator 100. Plunger 102 can include one or more magnetically attractive components, such as a permanent magnet, that are influenced by the electromagnetic field selectively created by the stator 100 when activated (e.g., current is run through the coil(s)). Plunger 102 can be formed from a conductive material responsive to the electromagnetic fields generate by stator 100. For example, plunger 102 can be formed from a ferric material, such as soft iron, among other conductive materials.

Plunger 102 is connected to needle 110 such that displacement of plunger 102 along axis SA causes displacement of needle 110 along axis SA. Similarly, displacement of needle 110 along axis SA causes displacement of plunger 102 along axis SA. In the example shown, plunger 102 is connected to needle 110 by coupler 116 that is connected to both needle 110 and plunger 102. The connection between plunger 102 and needle 110 is located within dry chamber 128 and the connection point is isolated from the spray fluid flowing through spray gun 14.

Plunger 102 is disposed coaxially with spray valve 36 on spray axis SA. Plunger 102 is disposed coaxially with needle assembly 104 on spray axis SA. Plunger 102 and needle assembly 104 are configured to shift simultaneously along spray axis SA, in the example shown. Plunger 102 and needle assembly 104 are disposed coaxially. Plunger 102 and needle assembly 104 are disposed coaxially with outlet orifice 133. Plunger 102 and needle assembly 104 are disposed coaxially with nozzle 40 that generates the atomized fluid spray, in the example shown. Nozzle 40, spray valve 36, needle assembly 104, and solenoid 38 are disposed coaxially with each other on spray axis SA in the example shown. The spray valve 36, the needle assembly 104, and the solenoid 36 are all coaxially positioned along a common axis, which is formed by the spray axis SA in the example shown.

In the example shown, the plunger 102 is biased in first axial direction AD1 and away from stator 100 by spring 86 via needle assembly 104 and coupler 116. Spring 86 interfaces with needle assembly 104 to bias needle assembly 104 in first axial direction AD1 and towards seat 106. Spring 86 urges spray valve 36 toward the closed state in the example shown. In the example shown, spring 86 is the only spring that urges the spray valve 36 towards being in the closed state. In the example shown, no spring other than spring 86 urges the spray valve 36 towards being in the closed state. Spring 86 interfaces with needle 110 and biases needle 110 towards seat 106 and, due to the connection of needle 110 and plunger 102, also urges plunger 102 in first axial direction AD1 and towards seat 106.

Spring 86 functions to both close spray valve 36 and return solenoid 38 to a non-spray state. During operation, plunger 102 is drawn in second axial direction AD2 by electromagnetic fields generated by stator 100. Plunger 102 is displaced back in first axial direction AD1 by spring 86 to reset solenoid 38. Spring 86 is disposed within wet chamber 126 and is exposed to the spray fluid flowing through spray gun 14. Solenoid 38, which is disposed in dry chamber 128, is reset by a spring 86 that is disposed in a wet chamber 126 and exposed to the spray fluid while components of the solenoid 38, including the plunger 102 that is operatively associated with the spring 86, are disposed in dry chamber 128 and isolated from the spray fluid. In the example shown, the single spring 86 of spray gun 14 both returns spray valve 36 to the closed state to stop spraying by spray gun 14 and returns the plunger 102 away from stator 100 to reset solenoid 38 for a subsequent activation.

During operation, electrical energy is provided to solenoid 38 to energize the coil(s) of stator 100 and thereby cause opening of spray valve 36 and spraying by spray gun 14. The user depresses trigger 34 to generate the spray signal. The spray signal can be transmitted to electrical connector 139 by trigger wire 141. Electrical connector 139 can connect with the wires extending to spray gun 14 via conduit 18. In the example shown, electrical connector 139 is disposed within gun handle 32, as discussed in more detail with regard to FIGS. 18A-18C. The spray signal is provided to a controller, such as controller 28 or a controller onboard spray gun 14, and the controller 28 causes electrical energy to be provided to the coils of stator 100. The stator 100 generates electromagnetic fields that draw plunger 102 in second axial direction AD2.

The electromagnetic force exerted on plunger 102 is sufficient to overcome the biasing force exerted by spring 86 in first axial direction AD1. The plunger 102 thus shifts in second axial direction AD2. The plunger 102 pulls needle assembly 104 in second axial direction AD2 due to the connection between plunger 102 and needle assembly 104 formed by coupler 116. The solenoid 38 is configured to pull needle assembly 104 partway through needle seal 134. The plunger 102 displacing needle assembly 104 in second axial direction AD2 compresses spring 86. Each of plunger 102, coupler 116, and needle assembly 104 simultaneously shift rearward in second axial direction AD2. The ball 108 is pulled off of and is disengaged from seat 106, opening a fluid flowpath through spray valve 36. The spray fluid flows through the wet chamber 126, through the open spray valve 36, out of assembly housing 84 through outlet orifice 133 and downstream to nozzle 40. The spray fluid is emitted through nozzle 40 as an atomized fluid spray. Needle assembly 104 remains in the open state during spraying. Needle assembly 104 does not reciprocate or move while in the position associated with the fully open state during spraying.

To stop spraying, the user releases trigger 34, causing the controller 28 to depower the stator 100, such as by reducing or ceasing provision of electrical energy to the stator 100. The stator 100 is depowered such that plunger 102 is not held in the displaced state by electromagnetic fields of the stator 100. Spring 86 exerts an axial driving force on needle head 112 and drives needle assembly 104 in first axial direction AD1. The spring 86 actuates the spray valve 36 to the closed state. In the example shown, the spring 86 drives needle assembly 104 in first axial direction AD1 to cause ball 108 to engage with seat 106, thereby placing spray valve 36 in the closed state.

The spring 86 displacing needle assembly 104 in first axial direction AD1 also displaces plunger 102 in first axial direction AD1. Plunger 102 is pulled in first axial direction AD1 and towards nozzle 40 as spray valve 36 is actuated to the closed state by spring 86. The plunger 102 is pulled axially away from stator 100 by the spring 86 in the example shown.

In the example shown, the spring 86 both actuates spray valve 36 to the closed state and resets the solenoid 38 for subsequent activation. Spring 86 is disposed axially between spray valve 36 and solenoid 38, in the example shown. Such a configuration provides for a compact spray gun 14. While the spring 86 that actuates both components of spray valve 36 and components of solenoid 38 is shown as disposed in the wet chamber 126 to be exposed to the spray fluid, it is understood that not all examples are so limited. For example, the spring 86 could be disposed in the dry chamber 128, among other options. In such an example, a spring 86 isolated from the spray fluid both resets solenoid 38 and actuates the spray valve 36 exposed to the spray fluid to the closed state.

In the example shown, the spring 86 moves the plunger 102 in a first direction toward the spray valve 36 being in the closed state when the stator 100 is in a non-spray state and the stator 100 moves the plunger 102 in a second direction toward the spray valve 36 being in the open state when the stator 100 is in an activated state.

Spray gun 14 provides significant advantages. Solenoid 38, spray valve 36, and nozzle 40 are disposed coaxially on spray axis SA. Spring 86 is further disposed coaxially with solenoid 38 and spray valve 36 on spray axis SA. The coaxial configuration of the fluid control components and actuating components of spray gun 14 provides for a compact spray gun 14. The compact spray gun 14 is easy to grasp and manipulate in a single hand of the user during spraying. The spray gun 14 includes a single spring 86 that both actuates spray valve 36 to the closed state and resets solenoid 38 for subsequent activation. Spray gun 14 shown does not include additional springs operatively connected to either spray valve 36 or solenoid 38, though it is understood that not all examples are so limited.

Trigger 34 is not mechanically connected to spray control components of the spray gun 14. Instead, the trigger 34 is operatively connected to controller 28 that is operatively connected to solenoid 38 to control power to solenoid 38. The user can depress and release trigger 34 without having to physically overcome the hydraulic pressure within wet chamber 126. The solenoid 38 actuates spray valve 36 to the open state. The solenoid configuration of spray gun 14 reduces user fatigue, providing for more efficient spray operations and allowing the user to perform longer and/or more complex spray jobs. The solenoid configuration of spray gun 14 facilitates less downtime and can allow a single user to operate spray gun 14 for a longer period without requiring breaks.

The configuration of spray control assembly 70 facilitates cooling of electrical components of spray gun 14. Solenoid 38 generates heat during operation. The stator 100 generates heat due to the electrical energy provided to the stator 100 during operation. Solenoid housing 90 is in direct contact with valve housing 92 at housing interface 130. Solenoid housing 90 and fluid housing 88 can both be formed as thermally conductive components, providing thermally conductive continuity between solenoid housing 90 and fluid housing 88. For example, both solenoid housing 90 and valve housing 92 can be formed from thermally conductive material. In some examples, solenoid housing 90 and valve housing 92 can both be formed as metallic components, providing metal continuity between solenoid housing 90 and valve housing 92. In addition, both plate 98 and housing body 96 can be formed as metallic components. Stator 100 is directly mounted to plate 98, providing a direct thermal path from stator 100 to valve housing 92 via plate 98 and housing body 96. Housing body 96 can also absorb heat from within dry chamber 128.

The continuity between solenoid housing 90 and valve housing 92 provides a thermal pathway that facilitates cooling of solenoid 38. The heat generated by solenoid 38 can be transferred through solenoid housing 90 to valve housing 92 and then from valve housing 92 to the spray fluid within wet chamber 126. The spray fluid carries the heat out of spray gun 14 as the spray fluid is emitted as the fluid spray. Such a configuration provides for effective cooling of the solenoid 38. Such cooling further allows for solenoid 38 to be disposed in a scaled dry chamber 128 as airflow cooling is not required to effectively cool solenoid 38, providing for a simpler, more compact, and less expensive configuration of spray gun 14. Such a configuration also protects solenoid 38 from environmental contaminants.

The plunger 102 can also experience inductive heating during operation. Needle assembly 104, coupler 116, and plunger 102 can each be formed as thermally conductive components. Needle assembly 104, coupler 116, and plunger 102 can each be formed as metallic components. The thermally conductive components of needle assembly 104, coupler 116, and plunger 102 can be the same or different materials as the thermally conductive components of solenoid housing 90 and valve housing 92. Needle assembly 104 is exposed to the spray fluid within wet chamber 126. A thermal pathway can be created between the plunger 102 and the spray fluid through the needle 110 such that heat generated by stator 100 can be transferred through plunger 102 and needle assembly 104 to the spray fluid to provide cooling for solenoid 38.

Spray gun 14 is configured as a handheld sprayer in that a user can grasp gun handle 32 to aim spray gun 14 and can actuate trigger 34 with the same hand that is grasping gun handle 32.

Solenoid 38 is disposed axially rearward of handle front side 80. Stator 100 and plunger 102 are spaced in second axial direction AD2 from handle front side 80. Stator 100 does not radially overlap with handle front side 80 in the example shown. In the example shown, the dry chamber 128 does not radially overlap with handle front side 80. Solenoid housing 90 is spaced in second axial direction AD2 relative to handle front side 80. In the example shown, stator 100 is disposed axially rearward, in second axial direction AD2, relative to at least a portion of handle rear side 82. At least a portion of stator 100 does not radially overlap with handle rear side 82 in the example shown. The stator 100 does not radially overlap with at least a portion of handle rear side 82. In the example shown, however, a portion of the stator 100 does radially overlap with a portion of handle rear side 82, but does not radially overlap with an entirety of the handle rear side 82. The solenoid 38 does not radially overlap with the trigger 34. The position of solenoid 38 and solenoid housing 90 relative to gun handle 32 balances the weight of spray gun 14 and facilitates efficient and ergonomic use of spray gun 14.

Spray valve 36 is disposed on an opposite axial side of gun handle 32 from solenoid 38. Spray valve 36 is disposed axially forward of handle rear side 82. In the example shown, spray valve 36 is disposed axially forward of handle front side 80. Spray valve 36 is spaced in first axial direction AD1 relative to handle rear side 82. The spray valve 36 formed at the interface between needle assembly 104 and seat 106 does not radially overlap with gun handle 32 in the example shown. Spray valve 36 does not radially overlap with handle front side 80 in the example shown. Spray valve 36 is spaced in first axial direction AD1 relative to trigger 34 in the example shown. The spray valve 36 does not radially overlap with the trigger 34 in the example shown. Spray valve 36 is spaced in a first axial direction AD1 from the handle front side 80 and the solenoid 38 is spaced in a second axial direction AD2 from the handle front side 80.

Spray valve 36 and solenoid 38 are disposed on opposite axial sides of gun handle 32 in the example shown. Spray valve 36 is spaced in first axial direction AD1 relative to gun handle 32 and solenoid 38 is spaced in second axial direction AD2 relative to gun handle 32. The spray valve 36 is disposed forward of the handle front side 80 and the solenoid 38 is disposed rearward of the handle front side 80. In the example shown, the spray valve 36 is spaced in a first axial direction AD1 from the handle front side 80 and the solenoid 38 is spaced in a second axial direction AD2 from the handle front side 80. The spray valve 36 is disposed forward of the handle front side 80 and the solenoid 38 is disposed rearward of the handle front side 80. Disposing spray valve 36 and solenoid 38 on opposite axial sides of gun handle 32 provides for a balanced, ergonomic spray gun 14 that reduces user fatigue and provides for more efficient spray operations.

While the spray valve 36 does not radially overlap with the handle 32 in the example shown, the needle assembly 104 that forms the valve interface does extend to radially overlap with the gun handle 32. A portion of needle assembly 104 radially overlaps with handle 32 and a portion of needle assembly 104 does not radially overlap with gun handle 32.

Spray axis SA is shown. Nozzle 40, spray valve 36, needle assembly 104, spring 86, needle seal 134, seal housing 94, valve housing 92, plunger 102, and/or stator 100 can each be disposed coaxial with respect to the axis SA.

Figure 5A:
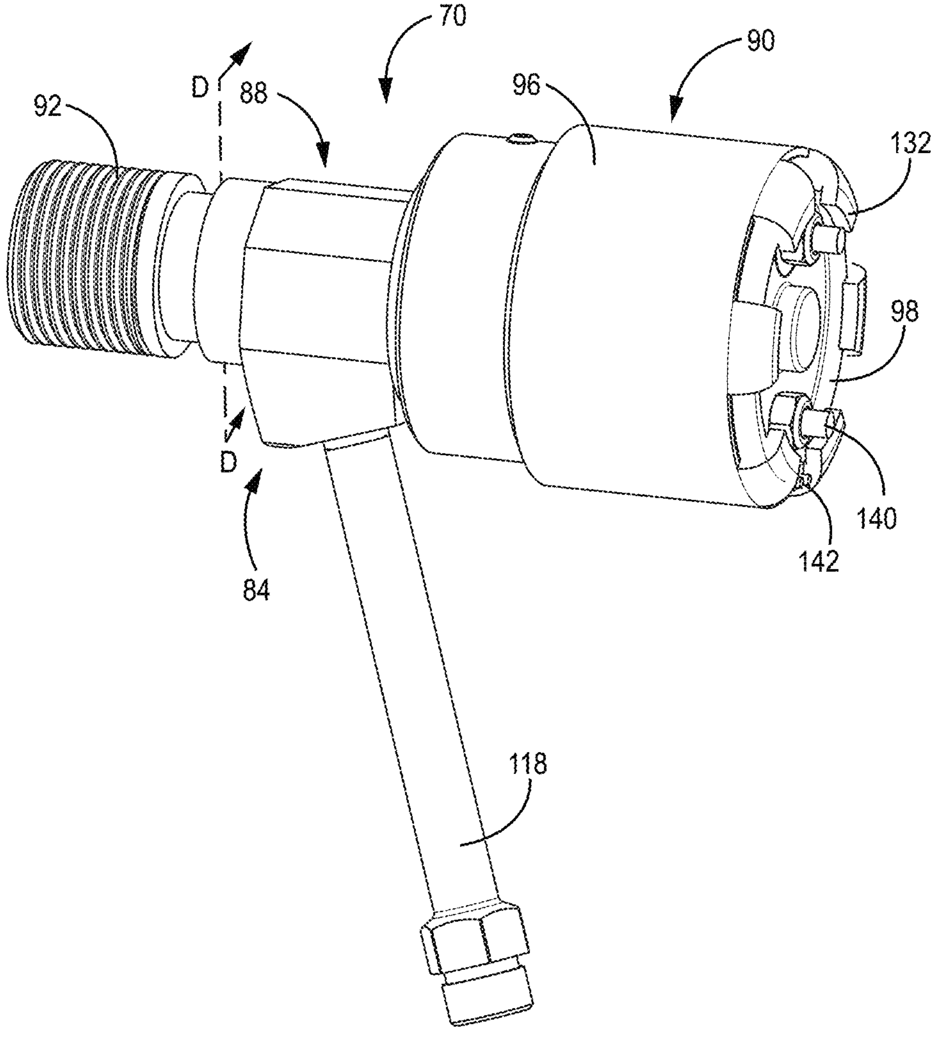
FIG. 5A is an isometric view of a spray assembly of a spray gun.
Figure 5B:
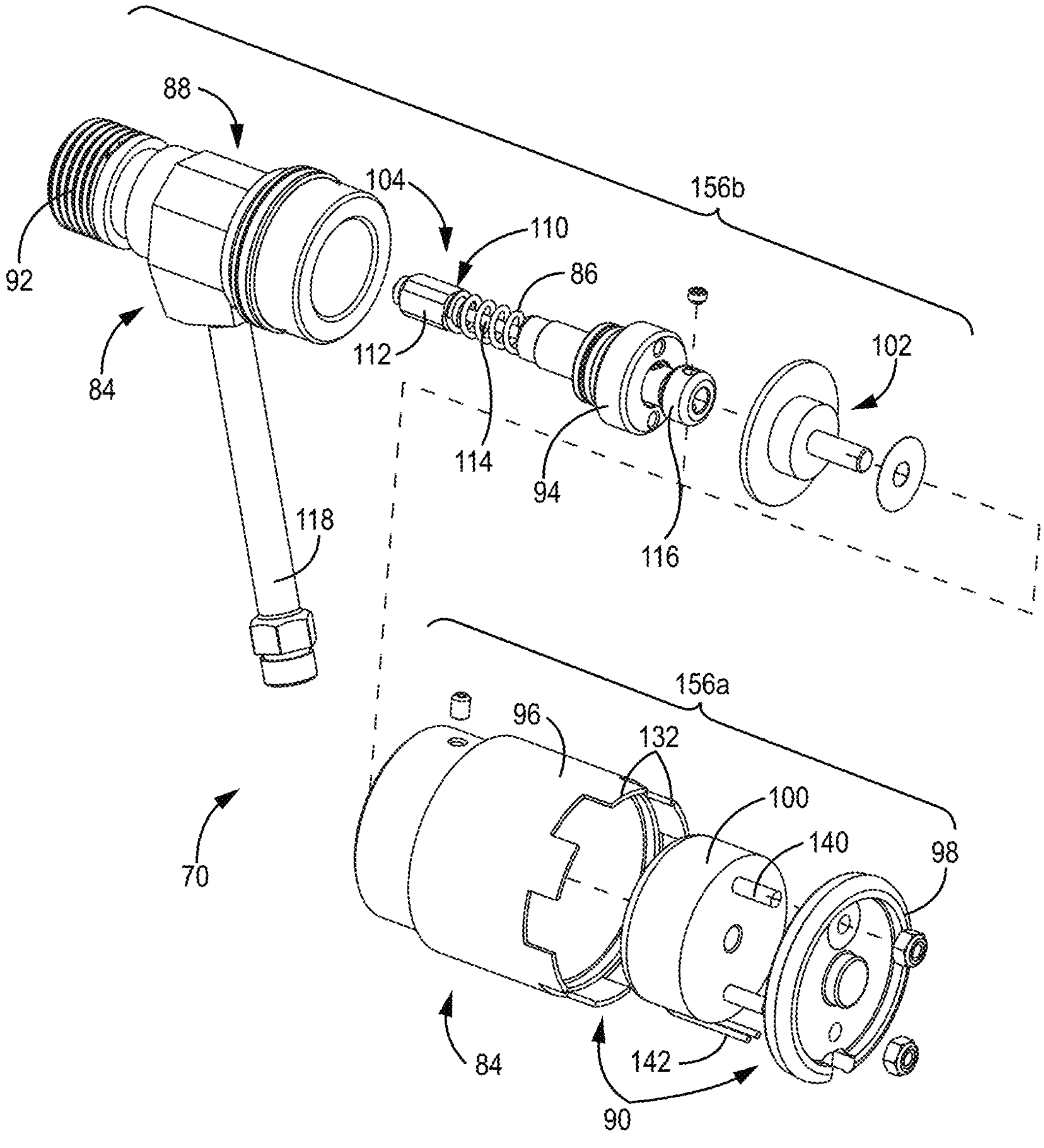
FIG. 5B is an exploded view of the spray assembly shown in FIG. 5A.
Figure 5C:
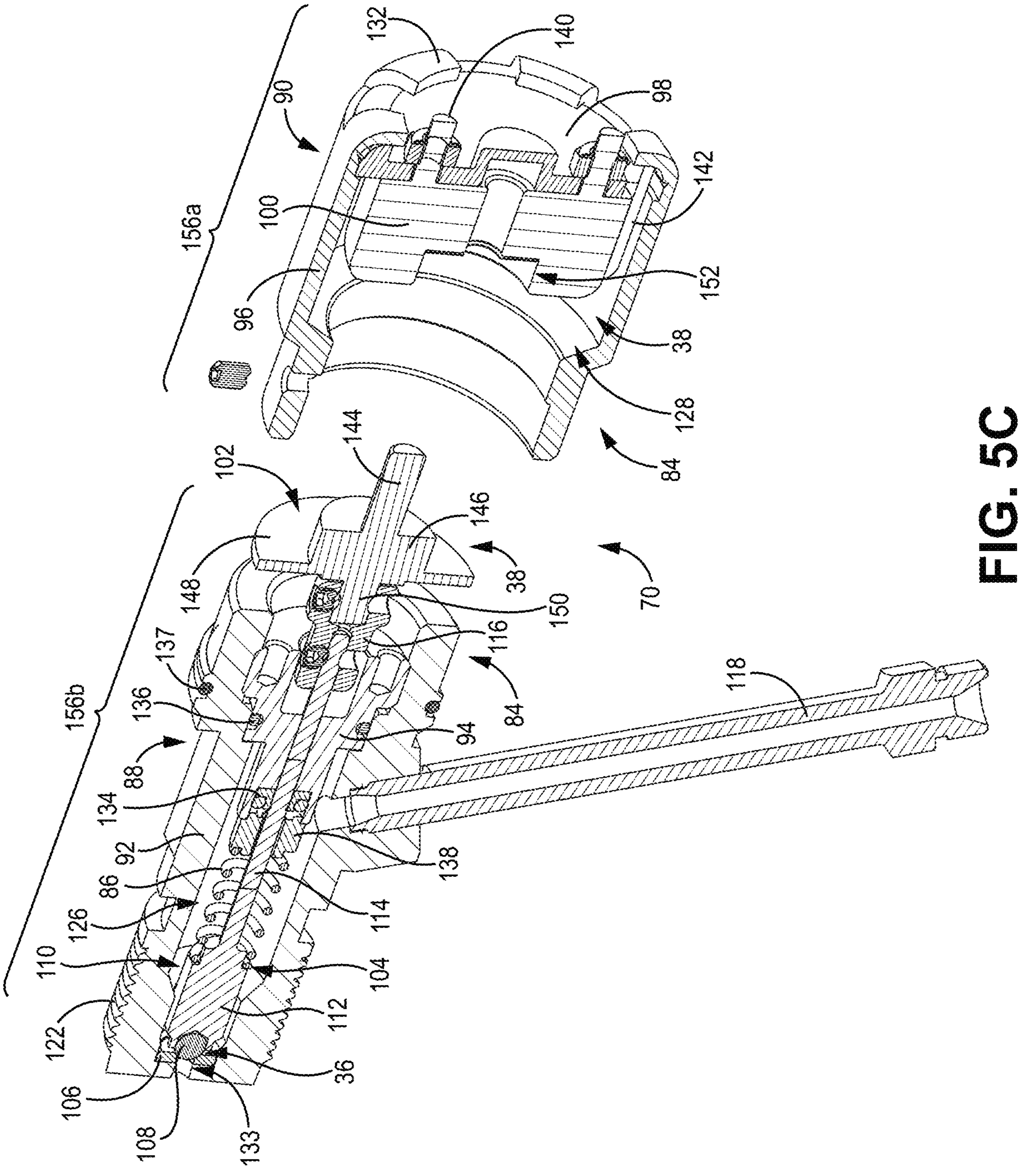
FIG. 5C is a partially exploded cross-sectional view of the spray control assembly shown in FIG. 5A.
Figure 5D:
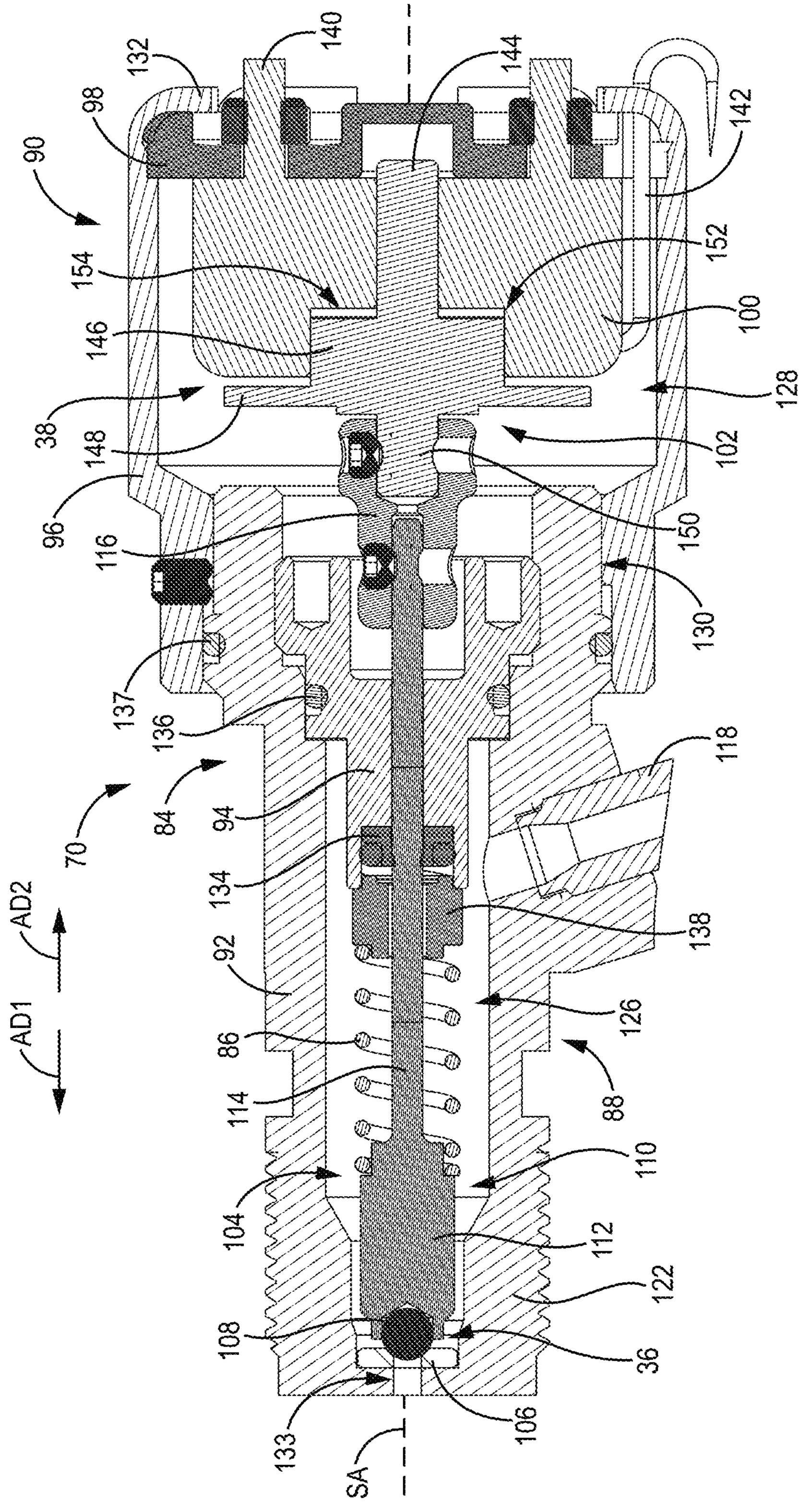
FIG. 5D is a cross-sectional view taken along line D-D in FIG. 5A.

FIG. 5A is an isometric view of spray control assembly 70 with supply tube 118 attached. FIG. 5B is an exploded view of spray control assembly 70. FIG. 5C is a partially exploded cross-sectional view of spray control assembly 70. FIG. 5D is a cross-sectional view of spray control assembly 70 taken along line D-D in FIG. 5A and also showing a portion of tip assembly 58. FIGS. 5A-5D will be discussed together. Spray control assembly 70 includes solenoid 38, spray valve 36, assembly housing 84, and spring 86. Assembly housing 84 includes fluid housing 88 and solenoid housing 90. Fluid housing 88 includes valve housing 92 and seal housing 94. Solenoid housing 90 includes housing body 96 and plate 98. Solenoid 38 includes stator 100 and plunger 102. Spray valve 36 is formed at an interface between needle assembly 104 and seat 106. Needle assembly 104 includes ball 108 and needle 110. Needle 110 includes needle head 112 and needle shaft 114.

Assembly housing 84 contains and supports flow control and flow activation components of a spray gun (e.g., spray gun 14). In the example shown, assembly housing 84 is formed by fluid housing 88 and solenoid housing 90 that are connected together. Fluid housing 88 includes valve housing 92 that forms an exterior portion of fluid housing 88. Seal housing 94 is mounted to valve housing 92 to enclose the wet chamber 126 within fluid housing 88. Seal housing 94 is disposed axially between the wet chamber 126 and the dry chamber 128. Wet chamber 126 is a chamber through which the spray fluid flows during operation. The wet chamber 126 forms a portion of a fluid flow pathway of a fluid sprayer.

Spray valve 36 is disposed within fluid housing 88. Spray valve 36 is actuatable between the open state, with needle assembly 104 disengaged from seat 106, and the closed state, with needle assembly 104 engaged with seat 106, to control spraying of spray fluid. Solenoid 38 is operatively connected to needle assembly 104 to control actuation of needle assembly 104 along spray axis SA. In the example shown, solenoid 38 is configured to displace needle assembly 104 in second axial direction AD2 to actuate spray valve 36 to the open state. In the example shown, spring 86 is configured to displace needle assembly 104 in first axial direction AD1 to actuate spray valve 36 to the closed state. It is understood, however, that in various other examples the solenoid 38 can be a double-acting solenoid that displaces needle assembly 104 in both the first axial direction AD1, from the open state to the closed state, and the second axial direction AD2, from the closed state to the open state. Such an example including a double-acting solenoid may not include a spring 86.

Plunger 102 is a movable component of solenoid 38. Plunger 102 is configured to shift axially relative to stator 100 along spray axis SA. Plunger 102 can be considered to form the armature of solenoid 38. In the example shown, plunger 102 is formed by plunger shaft 144, plunger shoulder 146, plunger flange 148, and connector shaft 150. Plunger shaft 144 extends axially within stator 100. In some examples, plunger shaft 144 can extend fully axially through stator 100. Plunger shoulder 146 projects radially outward from plunger shaft 144. Plunger shoulder 146 has a larger diameter than plunger shaft 144. Plunger shoulder 146 is disposed at least partially within stator cavity 152 within stator 100. Plunger shaft 144 and plunger shoulder 146 radially overlap with stator 100. One or both of plunger shaft 144 and plunger shoulder 146 can radially overlap with the coil of stator 100.

Plunger flange 148 projects radially outward from plunger shoulder 146. Plunger flange 148 can form a largest diameter portion of plunger 102. In some examples, plunger flange 148 can interface with an axial end of stator 100 to define a limit of movement of plunger 102 in second axial direction AD2. Connector shaft 150 extends axially in first axial direction AD1 relative to plunger flange 148. In the example shown, connector shaft 150 extends in an opposite axial direction relative to plunger flange 148 as compared to plunger shoulder 146 and plunger shaft 144. Connector shaft 150 is connected to coupler 116 to secure plunger 102 to coupler 116. In the example shown, connector shaft 150 extends into coupler 116 to connect with coupler 116. In the example shown, needle assembly 104 similarly extends into coupler 116. Connector shaft 150 is connected to coupler 116 by a set screw in the example shown, though it is understood that other connection types are possible.

Axial gap 154 is formed between plunger 102 and stator 100. In the example shown, axial gap 154 is at a largest size when spray valve 36 is in the closed state. Axial gap 154 is maintained between the plunger 102 and the stator 100 via the spring 86 biasing plunger 102 in first axial direction AD1. However, when the stator 100 is activated, the electromagnetic field generated by stator 100 pulls the plunger 102 in second axial direction AD2 and towards the stator 100. This movement of the plunger 102 towards the stator 100 closes the gap 154, overcoming the spring 86 and opening spray valve 36. In some embodiments, movement of the plunger 102 in second axial direction AD2 is stopped by plunger 102 engaging the stator 100. For example, plunger flange 148 can engage an axial face of stator 100. In some examples, plunger shoulder 146 can bottom out within stator cavity 152. In some examples, solenoid 38 can be sized such that the plunger flange 148 engages stator 100 prior to plunger shoulder 146 bottoming out within stator cavity 152. As such, the axial gap 154 can still be considered to be closed even if the axial gap 154 maintains some axial length greater than zero.

The axial gap 154 remains closed as long as the stator 100 is energized. Once the stator 100 is deenergized such that it no longer exerts an electromagnetic pull on the plunger 102, the spring 86 pulls the plunger 102 in first axial direction AD1 and away from the stator 100 to open axial gap 154. The distance of the axial gap 154 can be important because the size of axial gap 154 determines the degree of opening of the spray valve 36, and is ideally set for optimal spraying—not too large or too small. If the axial gap 154 is too large, then the stator 100 may have trouble electromagnetically pulling on the plunger 102 in a responsive manner, being that the distance degrades electromagnetic flux. In addition, spray valve 36 may open to too great of a degree, affecting the quality of the spray pattern. If the axial gap 154 is too short, then the spray valve 36 does not open wide enough for proper spraying.

The axial gap 154 can be set by the interfacing of the solenoid housing 90 with the valve housing 92. The greater or less axial overlap increase or decreases the axial gap 154, thus increasing or decreasing the degree of opening of spray valve 36. The size of axial gap 154 between plunger 102 and stator 100 is set by a degree of overlap between the solenoid housing 90 and the fluid housing 88 in the example shown.

Solenoid 38 is configured such that the force exerted on plunger 102 varies depending on the degree of overlap between stator 100 and plunger 102. The strength of the electromagnetic force on plunger 102 decreases as plunger 102 shifts away from stator 100. The strength of the electromagnetic force on plunger 102 increases as plunger shifts towards stator 100. The electromagnetic force on plunger 102 is based on the axial distance between the magnetically attractive components of plunger 102 and the electromagnetic fields generated by coil(s) of stator 100. In the example shown, solenoid 38 is configured such that the electromagnetic force on plunger 102 is greatest when the axial gap 154 is closed and the electromagnetic force on plunger 102 is weakest when the axial gap 154 is open. In the example shown, solenoid 38 is configured such that the maximum force on plunger 102 is when the spray valve 36 is displaced in second axial direction AD2 to the open state. In the example shown, solenoid 38 is configured such that the minimum force on plunger 102 is when the spray valve 36 is in the closed state.

Solenoid 38 exerts the weaker electromagnetic force on plunger 102 when spray valve 36 is closed. The weaker electromagnetic force is the force that initially cracks spray valve 36 to the open state and the electromagnetic force on plunger 102 increases as plunger 102 displaces in second axial direction AD2. The electromagnetic force being at a greatest relative force with the spray valve 36 in the fully open position, and plunger 102 displaced a furthest distance in second axial direction AD2, allows for less power to be provided to solenoid 38 to maintain spray valve 36 in the open state. In addition, the hydraulic forces in wet chamber 126 act to assist in maintaining spray valve 36 in the open state, which can further reduce the amount of power required to hold spray valve 36 in the open state. Reducing the amount of power required to be provided to solenoid 38 to maintain spray valve 36 in the open state reduces the amount of heat generated by solenoid 38. As such, the operating efficiency of solenoid 38, which can drop as heat rises, is maintained at a greater efficiency for a longer period of time, providing for more efficient operation of solenoid 38.

The maximum electromagnetic force occurring when spray valve 36 is in an open state reduces the amount of power that needs to be provided to solenoid 38 to maintain spray valve 36 in the open state, relative to an opposite configuration in which the electromagnetic forces are weakest when the spray valve 36 is in the open state. Reducing the amount of power provided to solenoid 38 to maintain spray valve 36 in the open state provides cost and energy savings. In examples in which the power source for solenoid 38 is a battery, having the greatest electromagnetic force acting on plunger 102 when spray valve 36 is in the open state reduces battery drain as less power is required to maintain spray valve 36 in the open state. Reducing battery drain provides for greater operating time, reducing downtime and providing for more efficient spray operations.

During assembly, the position of the solenoid housing 90 can be adjusted relative to the valve housing 92 until the proper axial gap 154 is achieved. The axial length of the axial gap 154 sets the distance that the needle assembly 104 can shift axially relative to seat 106 to open the flowpath through spray valve 36. For example, the housing interface 130 might include threading, such that the solenoid housing 90 can overlap and be rotated relative to the valve housing 92 until a proper size of axial gap 154 is achieved. The housing interface 130 can then be pinned, welded, bonded with the adhesive, crimped, press-fit, or other manner of more permanent fixation to maintain the axial gap 154 at the desired size. The size of the axial gap 154 can be considered to be set by an axial length of the housing interface 130, such that the longer the axial length of the housing interface 130 the smaller the size of the axial gap 154.

An example of setting the size of the axial gap 154 is discussed in more detail. Portions of spray valve 36 are assembled as a first assembly component 156*a* and second assembly component 156*b* that are then positioned relative to each other to set the size of the axial gap 154 (best seen in FIGS. 5B and 5C). Stator 100 is connected to plate 98 and plate 98 is connected to housing body 96 to provide a first assembly component 156*a* for spray control assembly 70. In examples including tabs 132, tabs 132 are bent inwards to axially overlap with plate 98 and secure plate 98 on housing body 96. Stator 100 and solenoid housing 90 form the first assembly component 156*a*.

Spring 86 is positioned around needle assembly 104 and needle shaft 114 is passed through needle seal 134 and seal housing 94 such that needle 110 projects fully through seal housing 94. Seal housing 94 is connected to valve housing 92 in any desired manner. In the example shown, seal housing 94 is threaded into valve housing 92. Coupler 116 is connected to needle assembly 104 in any desired manner, such as pinned, welded, bonded with the adhesive, crimped, press-fit, threading, or other manner of more permanent fixation. In the example shown, a portion of needle 110 is inserted into a bore in coupler 116 such that coupler 116 surrounds a portion of needle 110. In the example shown, a set screw is threaded into coupler 116 and engages with an exterior surface of needle 110. The set screw fixes the coupler 116 and needle assembly 104 together.

Plunger 102 is connected to coupler 116. Coupler 116 is connected to plunger 102 in any desired manner, such as pinned, welded, bonded with the adhesive, crimped, press-fit, threading, or other manner of more permanent fixation. For example, a portion of plunger 102 can be inserted into a portion of coupler 116 at the connection interface between plunger 102 and coupler 116. The example shown includes connector shaft 150 of plunger 102 inserted into a bore in coupler 116. In the example shown, a set screw is threaded into coupler 116 and engages with an exterior surface of plunger 102. The set screw fixes the coupler 116 and plunger 102 together. The needle assembly 104, fluid housing 88, coupler 116, and plunger 102 form the second assembly component 156*b*.

The first assembly component 156*a* is aligned with the second assembly component 156*b* on spray axis SA. Solenoid housing 90 is interfaced with valve housing 92 at housing interface 130. The first assembly component 156*a* is shifted in first axial direction AD1 relative to the second assembly component 156*b* until the axial gap 154 is at a desired size.

Adjusting the position of solenoid housing 90 relative to valve housing 92 sets both a valve distance that needle assembly 104 can shift relative to seat 106 and a pick distance that plunger 102 can shift relative to stator 100. Solenoid housing 90 is rotatable relative to valve housing 92 to set the two distances. In the example shown, solenoid housing 90 can be shifted in both axial directions to set the opening distances (the valve and pick distances). The solenoid housing 90 can be shifted in first axial direction AD1 relative to valve housing 92 to decrease the opening distances and can be shifted in second axial direction AD2 to increase the opening distances. Adjusting the position of a single component (solenoid housing 90 relative to valve housing 92 in this example) sets the operative opening distances for both the spray valve 36 and solenoid 38.

The solenoid housing 90 is shifted relative to the valve housing 92 to adjust the opening distances to have desired distances and the solenoid housing 90 and valve housing 92 can then be fixed together to lock the opening distances. For example, solenoid housing 90 can be locked to valve housing 92 by a set screw, welding, adhesive, etc. Both the needle distance and the pick distance are set by adjusting solenoid housing 90 and then the position is locked to lock the needle and pick distances at desired distances.

In some examples, solenoid housing 90 and/or valve housing 92 can include indicators configured to indicate the size of the opening distance as solenoid housing 90 is mounted on valve housing 92. For example, valve housing 92 can have a screw opening formed on the exterior of valve housing 92 that is configured to receive a set screw. The set screw extending through solenoid housing 90 and into the screw opening indicates desired alignment for setting the desired opening distance in such an example.

Figure 6A:
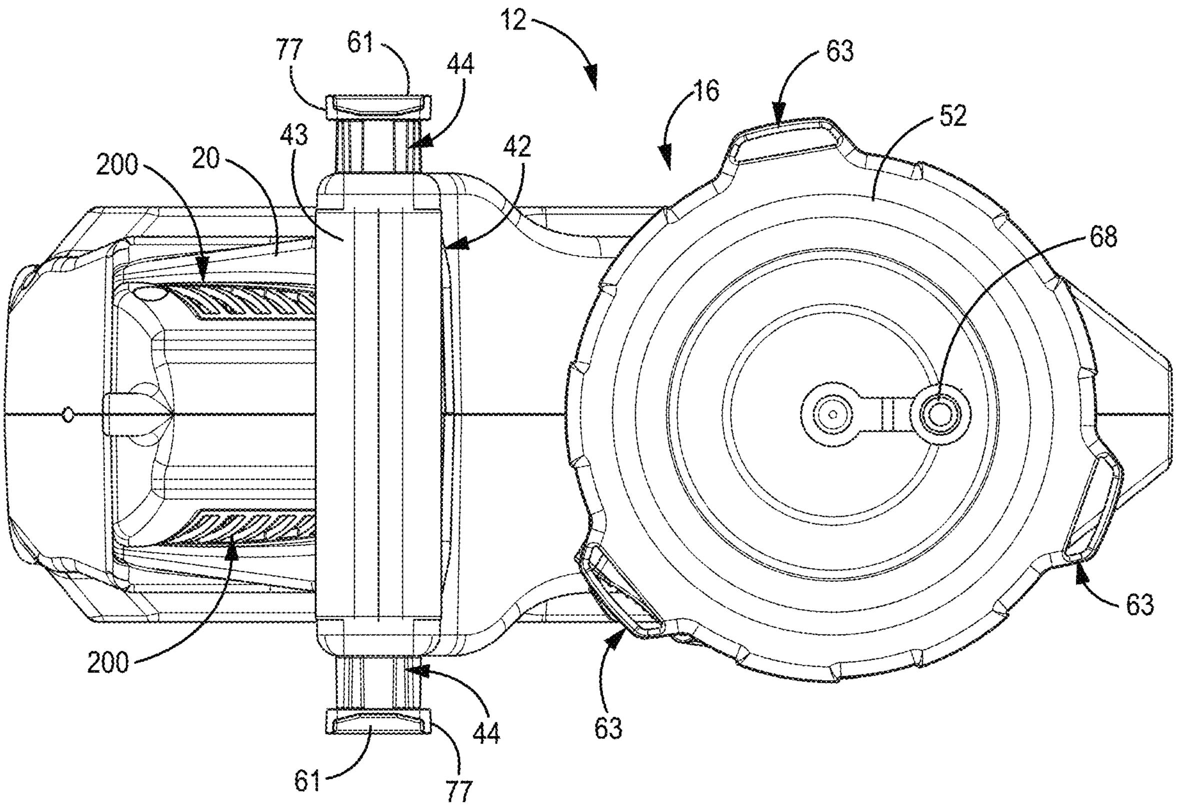
FIG. 6A is a top view of a pump module.
Figure 6B:
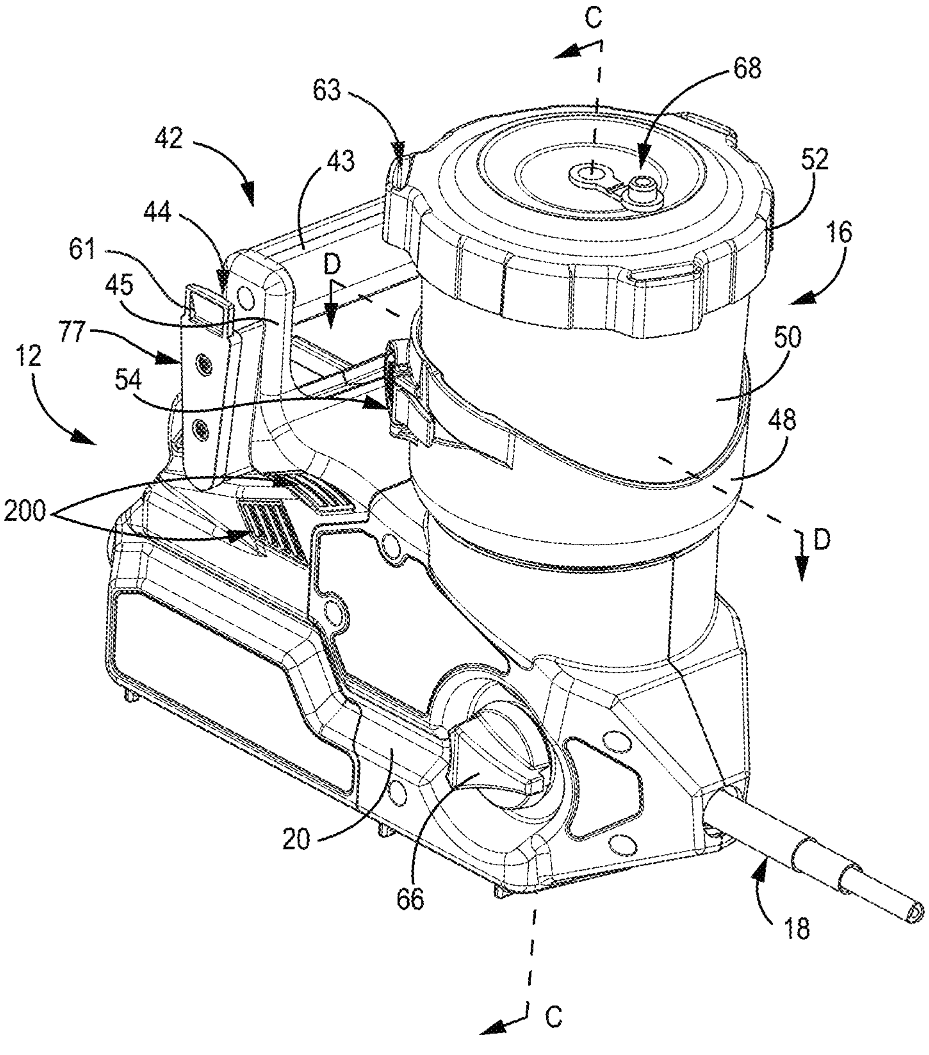
FIG. 6B is an isometric view of the pump module shown in FIG. 6A.
Figure 6C:
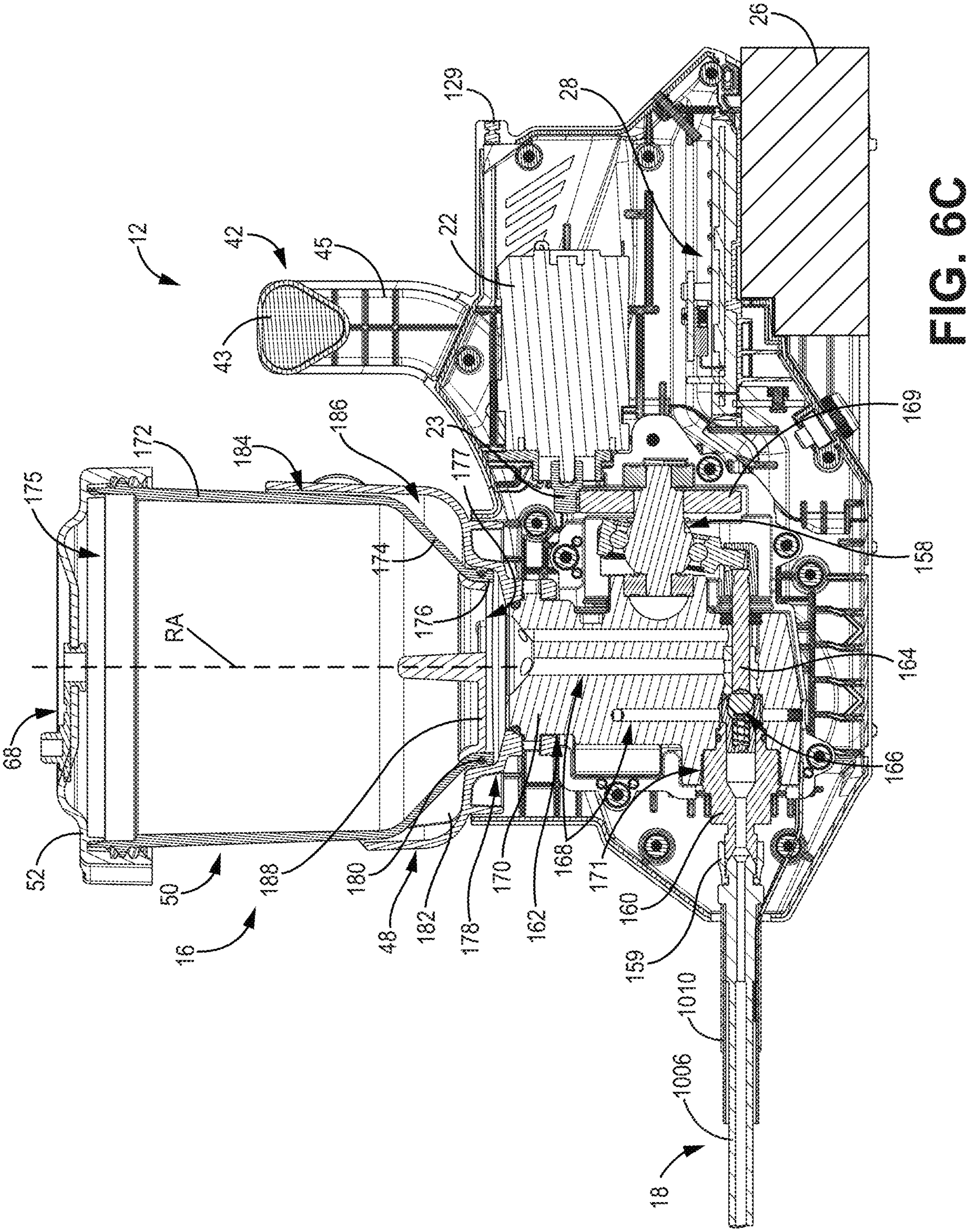
Figure 6D:
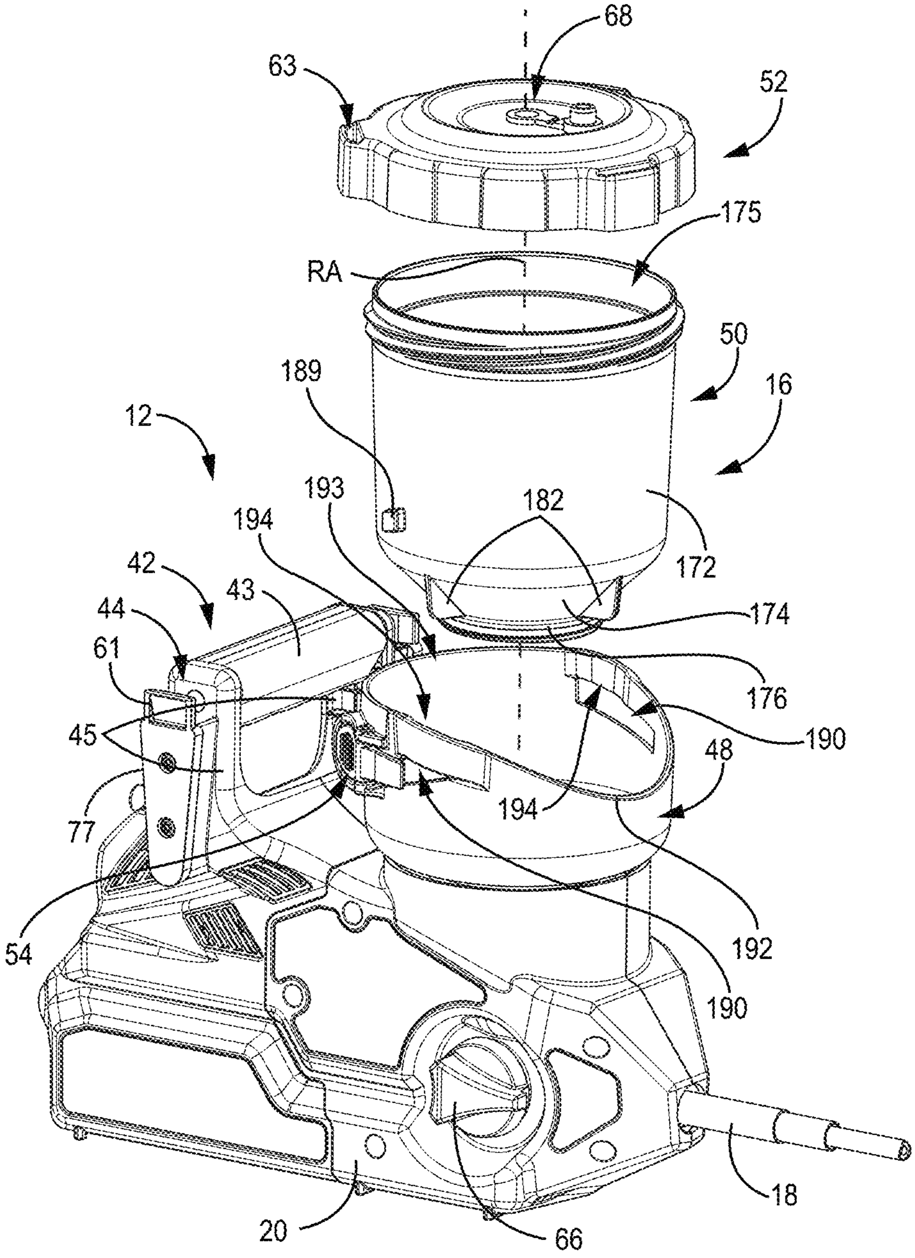
FIG. 6D is an isometric view of pump module 12 showing portions of reservoir 16 exploded away from each other.

FIG. 6A is a top view of pump module 12. FIG. 6B is an isometric view of pump module 12. FIG. 6C is a cross-sectional view of pump module 12 taken along line C-C in FIG. 6B. FIG. 6D is an isometric view of pump module 12 showing portions of reservoir 16 exploded away from each other. FIGS. 6A-6D will be discussed together. Pump module 12 includes reservoir 16, module housing 20, motor 22, pump 24, controller 28, module handle 42, mount 44, valve knob 66, drive 158, and module fitting 160. Reservoir 16 includes basin 48, tube pot 50, lid 52, and pot lock 54. Pump 24 includes pump body 162, fluid displacer 164, and pump valve 166.

Pump module 12 is configured to store a supply of spray fluid and pump the spray fluid under pressure for application by a spray gun, such as spray gun 14. Electrical components of pump module 12 are at least partially disposed within module housing 20. Power source 26 is supported by module housing 20 in the example shown.

Motor 22 is configured to provide motive power to pump 24 to power pumping by pump 24. Motor 22 can be an electric motor, among other options. Motor 22 is configured to generate a rotational output based on signals provided by controller 28. Motor 22 is connected to drive 158 to provide a rotational input to drive 158. Drive 158 is configured to convert the rotational motion from motor 22 to reciprocating linear motion that is provided to pump 24. In the example shown, drive 158 is configured as a wobble drive, though it is understood that drive 158 can be of any desired configuration for converting the rotational output of motor 22 to a reciprocating linear input to pump 24. Pinion 21 of motor 22 is shown interfacing with gear 169 of drive 158.

Pump 24 is at least partially disposed within module housing 20. Pump body 162 supports other components of pump 24. Pump body 162 defines channels 168 between reservoir 16 and one or more pump chambers within which the spray fluid is pressurized by the one or more fluid displacers 164 of pump 24. Pump body 162 includes a pump neck 170 that extends upwards towards a top side of module housing 20 from which module handle 42 also extends.

Multiple channels 168 extend from being exposed to the reservoir 16 to the cylinders housing the fluid displacers 164. Each channel 168 is a separate bore. It is noted that each of the channels 168 includes its own independent opening for receiving fluid from the reservoir 16 to be routed along a respective bore to a respective fluid displacer 164. The channels 168 do not branch within pump body 162 from a common opening that receives fluid from the reservoir 16. The channels 168 may be offset from the central axis RA of the reservoir 16.

Fluid displacer 164 is a moving component of pump 24 that is configured to reciprocate to pressurize and pump the spray fluid. Fluid displacer 164 is connected to drive 158 to be linearly reciprocated by drive 158. While a single fluid displacer 164 of pump 24 is shown, it is understood that examples of pump 24 can include multiple fluid displacers 164 that are connected to drive 158 to be reciprocated by drive 158. For example, pump 24 can include one, two, three, or more fluid displacers 164. In the example shown, fluid displacer 164 is configured as a piston that reciprocates along a piston axis to pump the fluid. It is understood, however, that fluid displacer 164 can be of any desired configuration for pumping the spray fluid. For example, fluid displacer 164 can be a diaphragm, among other options.

Pump valve 166 is disposed downstream of fluid displacer 164. Pump valve 166 is a check valve that allows spray fluid to flow out of pump 24 while preventing backflow of spray fluid to pump 24. In the example shown, pump valve 166 is formed as a ball check valve, but it is understood that pump valve 166 can be a one-way valve of any desired configuration. Module fitting 160 provides a location for conduit 18 to connect with pump module 12. For example, module fitting 160 can be configured as a fluid fitting connectable to the fluid conveying hose of conduit 18. Module fitting 160 is mounted to pump body 162 in the example shown. In the example shown, module fitting 160 mounts to pump body 162 at pump outlet 171. In some examples, the interface between module fitting 160 and the conduit fitting 159 of conduit 18 is entirely located within the module housing 20 such that the conduit 18 only emerges from an aperture in the module housing 20. This allows one or more wires as part of the conduit 18 to separate from the fluid carrying portion of the conduit 18 within the module housing 20, which helps protect the one or more wires.

The pump 24 draws fluid from the fluid reservoir 16 and puts the spray fluid under pressure, outputting the spray fluid through pump valve 166 (with ball and seat in the example shown), and then through pump outlet 171 to the fitting of conduit 18, the fluid conveying hose of conduit 18, and then to the spray gun 14. The fluid hose 1006 and sheath 1010 are shown in FIG. 6C. While sheath 1010 is shown as extending only partially along the length of fluid hose 1006 for visibility, it is understood that sheath 1010 can extend a full length between pump module 12 and spray gun 14. For example, sheath 1010 can extend from a location within module body 20 to a location within gun body 30.

Power source 26 is supported by module housing 20 in the example shown. As shown, power source 26 is a battery that is removable from pump module 12. It is understood, however, that power source 26 can be of any desired configuration suitable for providing electrical power to electrical components of pump module 12. For example, power source 26 can be configured as a power cord that can be plugged into an electrical socket, such as a wall socket.

Reservoir 16 is configured to hold a supply of spray fluid for spraying by the spray gun 14. Reservoir 16 extends along a vertical reservoir axis RA. The reservoir 16 is directly above the pump 24 in the example shown. In particular, the reservoir 16 is directly above the fluid displacer 164 and the pump valve 166. This allows gravity to directly feed the fluid within the interior of the reservoir 16 through channels 168 orientated directly downward into the pump 24, whereas any air that might otherwise interfere with priming and pumping rises to the top of the reservoir 16 to not interfere. Direct gravity feeding aids in consistent continuous flow of fluid to the pump 24.

Basin 48 extends outward from the top side of module housing 20. Basin 48 is mounted to pump body 162 in the example shown. Basin 48 is mounted to pump neck 170 of pump body 162. In the example shown, basin seat 178 interfaces with pump neck 170 to mount basin 48 to pump 24. Basin seat 178 can also be referred to as a basin throat. Basin seat 178 receives a portion of pump neck 170 within basin seat 178 such that a portion of basin 48 extends around a portion of pump body 162. For example, basin 48 can be mounted by a bayonet connection, among other options. Basin 48 extends outward from pump body 162 and is exposed outside of and not fully disposed within module housing 20. Basin 48 can be permanently fixed to pump body 162 in some examples.

Tube pot 50 is configured to mount to basin 48. Tube pot 50 is configured to hold the supply of spray fluid. Tube pot 50 extends at least partially into basin 48 such that basin 48 is disposed outside of and around a portion of tube pot 50. Tube pot 50 interfaces with and is supported by basin 48. In some examples, tube pot 50 does not contact or interface with pump body 162. In such examples, basin 48 connects tube pot 50 to pump body 162. The basin 48 can be radially wider than the tube pot 50 so that the tube pot 50 can be accepted inside of the basin 48.

Tube pot 50 includes pot body 172, pot shoulder 174, and pot neck 176. Pot body 172 is a cylindrical body in the example shown. Pot shoulder 174 extends between and connects pot body 172 and pot neck 176. Pot shoulder 174 defines a sloped interior surface of tube pot 50. Pot shoulder 174 narrows radially as pot shoulder 174 extends between pot body 172 and pot neck 176. The sloped surface of pot shoulder 174 directs the spray fluid radially inward as the spray fluid flows towards pump body 162 to enter into the channels 168 of pump body 162. Pot neck 176 is disposed within basin 48 and can interface with basin 48. In the example shown, pot neck 176 interfaces with basin seat 178. Reservoir seal 180, such as an elastomer seal, such as an O-ring seal, is disposed between pot neck 176 and basin 48 to seal that interface. Reservoir seal 180 can extend annularly around pot neck 176. In the example shown, reservoir seal 180 is mounted to and supported by pot neck 176, but it is understood that not all examples are so limited. For example, reservoir seal 180 can be mounted to and supported by basin 58, such that tube pot 50 moves into and out of engagement with reservoir seal 180 during mounting and dismounting.

Inlet opening 175 is formed at a first axial end of tube pot 50. Outlet opening 177 is formed at a second axial end of tube pot 50. Inlet opening 175 is an opening through which tube pot 50 is configured to receive spray fluid. Lid 52 is configured to mount to tube pot 50 to cover inlet opening 175. The lid 52 can thread on to the top end of the tube pot 50 to seal the lid 52 to the tube put 50, amongst other fixation options. Outlet opening 177 is an opening of tube pot 50 through which tube pot 50 is configured to emit fluid for ingress into pump 24. Outlet opening 177 is disposed within basin 48 with tube pot 50 mounted to basin 48 and inlet opening 175 is disposed outside of basin 48 with tube pot 50 mounted to basin 48. Tube pot 50 is configured such that tube pot 50 is hollow and open at each axial end. Tube pot 50 mounts to basin 48 such that tube pot 50 is spaced from pump body 162. As such, outlet opening 177 is configured to output spray fluid into basin 48 and such fluid then flows to and enters into pump body 162. In the example shown, outlet opening 177 has a smaller diameter than inlet opening 175.

Fins 182 are disposed on an exterior of tube pot 50. Fins 182 project from the exterior of tube pot 50 and are configured to interface with basin 48. Fins 182 can interface with an interior surface of the basin 48. In the example shown, tube pot 50 includes an array of the fins 182 disposed around the exterior of tube pot 50. Fins 182 support tube pot 50 on basin 48 to prevent rocking of tube pot 50. Fins 182 are discrete projections extending from the exterior of tube pot 50. Fins 182 provide stability and support to tube pot 50 relative to basin 48.

An annular gap 184 is formed between the exterior of tube pot 50 and the interior surface of basin 48. In the example shown, the annular gap 184 is formed between the exterior surface of pot body 172 and the interior surface of basin 48. Annular gap 184 provides a space for any spray fluid on the exterior surface of tube pot 50 to flow into basin 48, preventing the spray fluid from flowing onto module housing 20.

Pooling chamber 186 is formed within basin 48 and between the exterior of tube pot 50 and the interior of basin 48. Pooling chamber 186 is formed as an annular chamber around tube pot 50. Fins 182 extend within the pooling chamber 186 to interface with basin 48. Pooling chamber 186 provides a location for any spray fluid to accumulate within the interior of basin 48, such as spray fluid spilled on the exterior of tube pot 50 and that flows downwards through the annular gap 184. The pooling chamber 186 is formed between the exterior of pot shoulder 174 and the interior surface of basin 48. The exterior of tube pot 50 is spaced from the interior of basin 48 by the pooling chamber 186. The pooling chamber 186 is sized to capture any overflow of spray fluid while also preventing the spray fluid from curing between tube pot 50 and basin 48 in such a manner that could effectively glue the tube pot 50 to the basin 48. Pooling chamber 186 thereby facilitates quick and efficient removal of tube pot 50 from basin 48 without concern that the spray fluid can act as an adhesive that would prevent such removal. When tube pot 50 is removed from basin 48, any spray fluid that is within the pooling chamber 186 can flow to the pump body 162 and into the pump 24.

Projections 189, which can also be referred to as tabs, extend outward from the exterior of tube pot 50. Projections 189 are configured to interface with mount slots 190 formed in basin 48. Slots 190 are angled so that as the tube pot 50 is rotated, the projections 189 force the tube pot 50 to move axially upward relative to the basin 48 to separate the pot neck 176 from the basin seat 178 during dismounting. Projections 189 are canted to match the angle of the angled slots 190 to facilitate relative sliding of the projection 189 within the slot 190. The angled slots 190 also guide the tube pot 50 axially downward into basin 48 during mounting to form the mating interface between pot neck 176 and basin seat 178. Mount slots 190 can be considered to extend helically partially about basin 48, though not all examples are so limited. This allows the pot neck 176 and the reservoir seal 180 to fit tightly in the basin seat 178 to promote sealing, but such interference may resist separation. The interface of the projections 189 with angled mount slots 190 during relative rotation provides mechanical advantage for axial separation of the tube pot 50 from the basin seat 178. Likewise, rotating the tube pot 50 relative to the basin 48 provides mechanical advantage as the pot neck 176 is moved axially downward into the basin seat 178 for an interference fit. In this way, the user does not need to push or pull the tube pot 50 axially when engaging or disengaging the interference between the pot neck 176 and the basin seat 178. Instead, the user can simply rotate tube pot 50 and the angled slots 190 will cause axial displacement of tube pot 50 due to the interface between projections 189 and mount slots 190. Tube pot 50 can thus be considered to mount to basin 48 at a tab-in-slot interface that provides mechanical advantage for removal of the tube pot 50 from the basin 48.

Mount notches 194 are formed as vertical paths in the walls of basin 48. Projections 189 can move into or out of mount slots 190 through mount notches 194. The mount notches 194 are configured as outward bows in the walls of the basin 48 which accommodate the radial diameter of the projections 189 to pass through when the tube pot 50 is moved up or down relative to the basin 48 during mounting and dismounting. The projections 189 interface with mount slots 190 when connecting and disconnecting tube pot 50 with basin 48.

Tube pot 50 can be rotated relative to basin 48 during mounting and dismounting. In the example shown, the relative rotation does not engage a threaded interface. Instead, the relative rotation engages the interference fit between pot neck 176 and basin seat 178.

Pot lock 54 is configured to interface with a projection 189 to secure tube pot 50 on basin 48 with the interference fit formed between pot neck 176 and basin seat 178. Pot lock 54 can be actuated to an unsecured state to allow the projection 189 to pass by pot lock 54 during dismounting of the tube pot 50 from basin 48.

Filter 188 is disposed within tube pot 50. Filter 188 is disposed at least partially within the pot neck 176 of tube pot 50. Filter 188 can be a mesh filter, such as steel mesh, among other options. The filter 188 can serve several purposes. One purpose is to strain the fluid being pumped, such as non-sprayable particles in paint. The filter 188 can be removed for cleaning and reinserted. One purpose is in covering the inlets of the channels 168 so that pressure within the pump 24 does not cause unexpected retrograde flow through the channels 168 that would project out of the tube pot 50 if the lid 52 is not fastened. The filter 188 blocks the trajectory of fluid spouting from the channels 168. In the example shown, filter 188 includes an axial projection aligned on the reservoir axis RA. The axial projection can be referred to as a head. The head can block axial flow in the reservoir 16 directly toward the pump 24 and instead forces flow around the head of the filter 188. The suction created by channels 168 could create a void of fluid in the center along axis RA if the liquid flows directly axially into pump 24 along reservoir axis RA and can cause air to be taken into the channels 168 to deprime the pump 24 despite fluid being on the side of the reservoir 16, particularly when viscous fluids, such as thicker paints, are sprayed which flow slower near walls. FIG. 6C shows a static wick 129 partially exposed on an exterior of the pump module 12. In particular, the static wick 129 is supported by the module housing 20 to support a wire extending from an interior of the module housing 20 to have its terminal end exposed on an exterior of the pump module 12. The static wick 129 can be a conductive wire, such as formed of copper, among other options. The static wick 129 can be electrically connected to any ground line within the fluid sprayer 10.

Referring back to FIG. 4, a similar static wick 127 is exposed on the exterior of the gun body 30. The static wick 127 of spray gun 14 also concerns a wire extending within the gun body 30 and having its terminal end exposed on an exterior of the gun body 30. The static wick 127 can be electrically connected to the ground line. The static wicks 127, 129 can be electrically connected to each other. The active end of each static wick 127, 129 is exposed to air. The static wicks 127, 129 are configured to discharge electrostatic potential energy into the air around its free end. Fluid sprayer 10 can thus include one or more electrically conductive static wicks 127, 129 having a first end connected to a component of the sprayer 10 on which charge can accumulate and a second end exposed to atmosphere. Each static wick 127, 129 may be formed of a single small diameter wire, multiple wires, or any other conductive geometric object, the purpose of which is to discharge electrostatic energy to the surrounding air rather than through a connection to earth ground.

The static wicks 127, 129 can dissipate static electricity generated within the sprayer to atmosphere, such as due to the flow of fluids against metal components. Dual static wicks 127, 129 that are separated from each other may increase their capability to dissipate static electricity due to being located remote from each other such that their magnetic fields do not interfere with each other. On the contrary, static wicks located on the same body, in closer proximity to each other, may interfere and may not get any benefit out of there being multiple of them. But several housings (e.g., module body 20 and gun body 30) separated by a conduit 18 allows the respective housings to be far enough apart from each other that each can function to dissipate static electricity. It is noted that the static electricity can be generated at the spray gun 14 or at the pump module 12 and either or both static wick 127, 129 may dissipate such energy. Alternatively, static wick 127 may dissipate principally or only static electricity generated at the spray gun 14 while static wick 129 may dissipate principally or only static electricity generated at the pump module 12. Fluid sprayer 10 thus includes an electrostatic discharge protection system that prevents the accumulation and discharge of static energy in fluid sprayer 10 without an earth ground connection. The system includes static wicks 127, 129 that contribute to preventing the accumulation and discharge of static energy that could pose a safety hazard.

Figure 7:
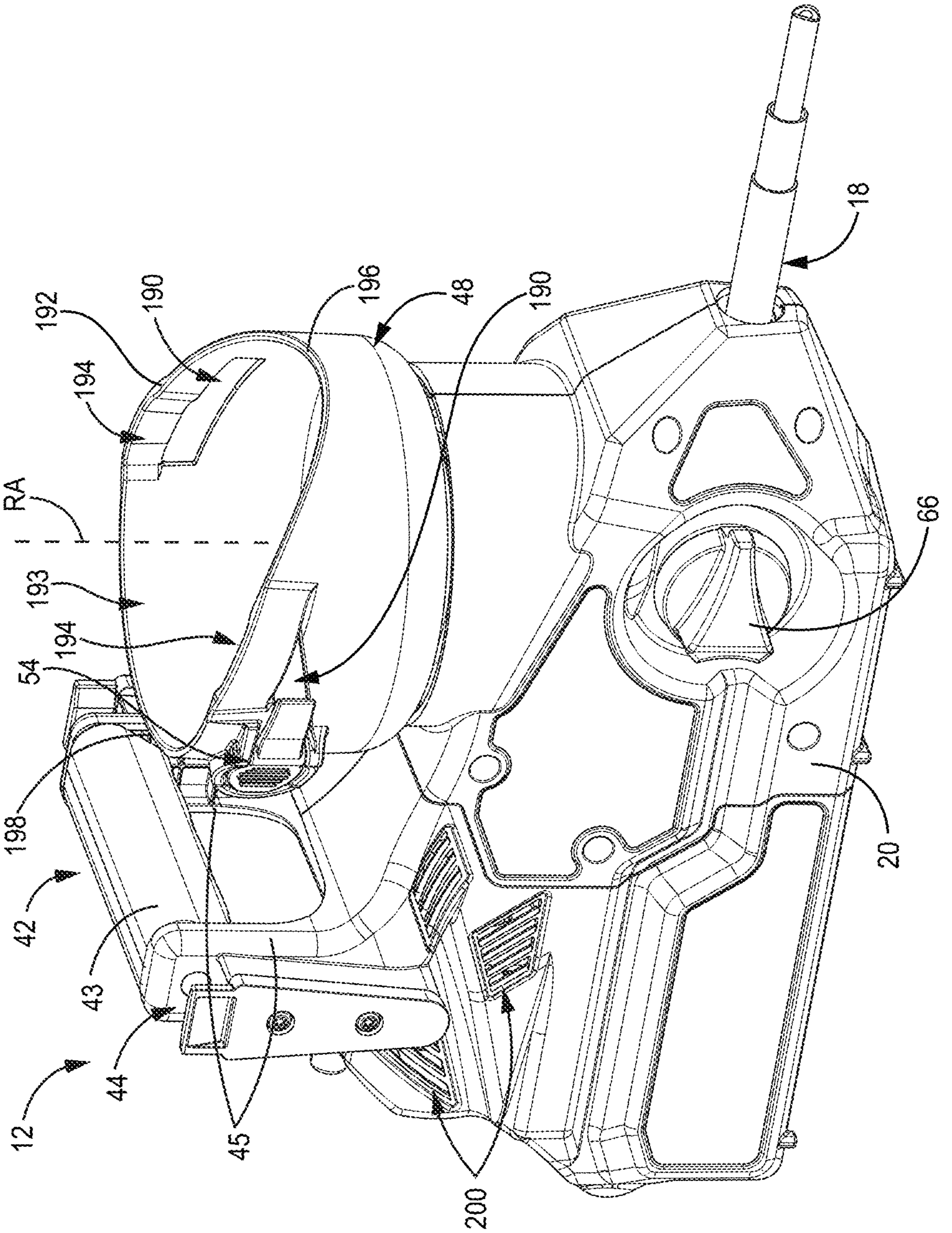
FIG. 7 is an isometric view of a pump module with portions of the reservoir dismounted.

FIG. 7 is an isometric view of pump module 12 with tube pot 50 dismounted from pump module 12. Tube pot 50 is not shown in FIG. 7. Mount slots 190 and basin rim 192 of basin 48 are shown. Basin rim 192 is formed as an annular lip that defines the opening of basin 48 through which tube pot 50 can be inserted and removed. The basin rim 192 includes mount notches 194, lower lip 196, and upper lip 198. Mount slots 190 are formed through basin 48 and extend fully through basin 48 in the example shown.

Basin rim 192 defines the installation opening 193 through which tube pot 50 can be inserted into basin 48 and removed from basin 48. Basin rim 192 includes sloped portions between upper lip 198 and lower lip 196. Upper lip 198 is a vertically highest portion of basin rim 192. Lower lip 196 is a vertically lowest portion of basin rim 192. Upper lip 198 is disposed vertically higher than lower lip 196. Upper lip 198 is spaced vertically from lower lip 196 such that upper lip 198 does not radially overlap with lower lip 196 relative to reservoir axis RA.

Basin rim 192 is shaped and configured to direct any fluid overflow away from moisture sensitive components of pump module 12. Vents 200 through module housing 20 provide openings for cooling airflow into and out of module housing 20 for cooling of electric components of pump module 12 that are disposed within module housing 20. The vents 200 are positioned between a rear end of module housing 20 and basin 48. The upper lip 198 is formed on a side of basin 48 oriented towards the rear end of module housing 20 and lower lip 196 is formed on a side of basin 48 oriented towards a front end of module housing 20 and away from the rear end of module housing 20. If spray fluid were to overflow from basin 48, the rising fluid level will encounter lower lip 196 prior to encountering upper lip 198. Such spray fluid would overflow over lower lip 196, which is oriented to direct such overflow towards the front end of module housing 20 and away from the vents 200. Basin rim 192 is thus contoured to protect the moisture sensitive components by directing spray fluid away from such components.

Mount notches 194 are formed as radial enlargements at basin rim 192. The mount notches 194 extend radially outward relative to other portions of basin rim 192. Mount notches 194 provide openings through which projections of the tube pot 50 can pass to move into or out of mount slots 190. Mount notches 194 form vertical paths through which the projections of tube pot 50 can shift. Mount notches 194 can be considered to form outward bows in the wall of the basin 48 that accommodate the radial diameter of the projections of the tube pot 50.

Mount slots 190 are formed on basin 48. In the example shown, mount slots 190 are formed fully through basin 48 between the interior surface of basin 48 and the exterior surface of basin 48, through it is understood that not all examples are so limited. Mount slots 190 are angled to extend both axially relative to reservoir axis RA and circumferentially about reservoir axis RA. The mount slots 190 are angled so that as the tube pot 50 is rotated during mounting or dismounting, the projections of the tube pot 50 travel along the sloped mount slots 190 to force the tube pot 50 to move axially upward relative to the basin 48 during mounting and to force the tube pot 50 axially downward during mounting to assist in forming or breaking the seal between the tube pot 50 and basin 48.

Figure 8:
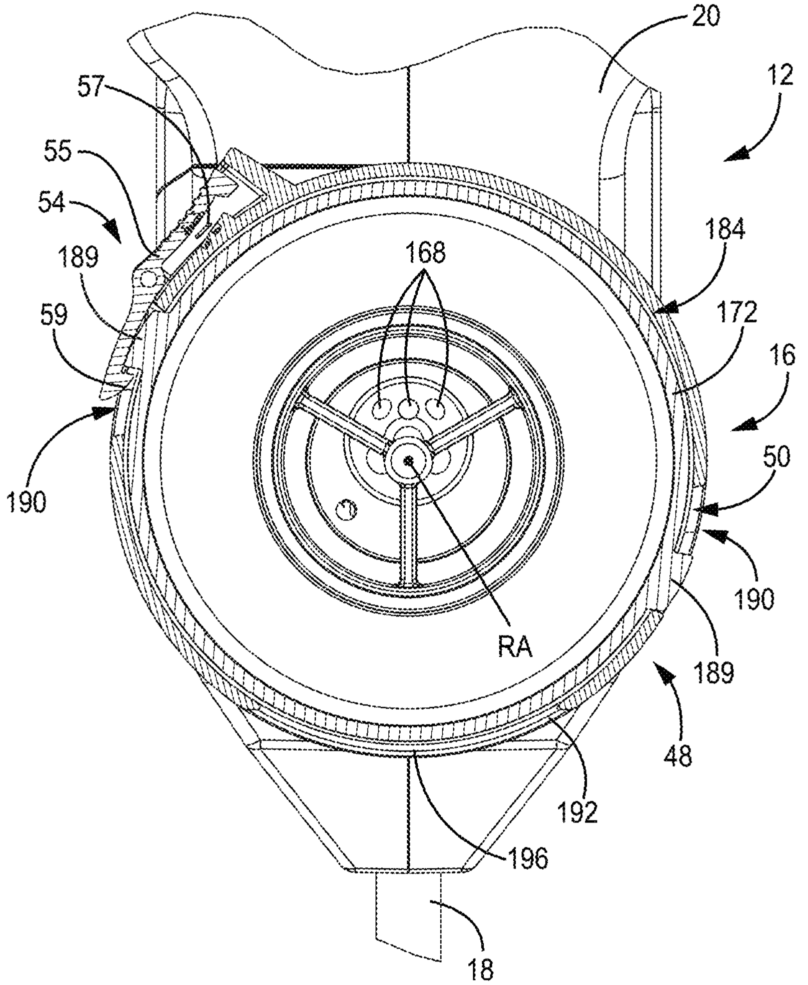
FIG. 8 is a cross-sectional view of a pump module taken along line 8-8 in FIG. 6B.

FIG. 8 is a cross-sectional view taken along line 8-8 in FIG. 6B showing a portion of pump module 12. Tube pot 50 is mounted to basin 48 and secured to basin 48 by pot lock 54. Pot lock 54 engages with a projection 189 of tube pot 50 as tube pot 50 is shifted into engagement with basin 48. In the example shown, pot lock 54 is a spring actuated lever arm. The projection 189 of tube pot 50 can pass under lever arm 55 of pot lock 54 to force the lever arm 55 outward to allow projection 189 to pass under the lever arm 55. The projection 189 passes under the retaining hook 59 of lever arm 55 and then lock spring 57 can cause lever arm 55 to snap back into position. The retaining hook 59 circumferentially overlaps with projection 189 relative to reservoir axis RA such that lever arm 55 inhibits rotation of tube pot 50 relative to basin 48 with tube pot 50 mounted to basin 48. The lock spring 57 snaps lever arm 55 into position such that pot lock 54 snaps to engage and retain the projection 189 without the user having to manipulate pot lock 54. The user can depress lever arm 55 to uncover projection 189 and release tube pot 50 for dismounting from basin 48.

Figure 9A:
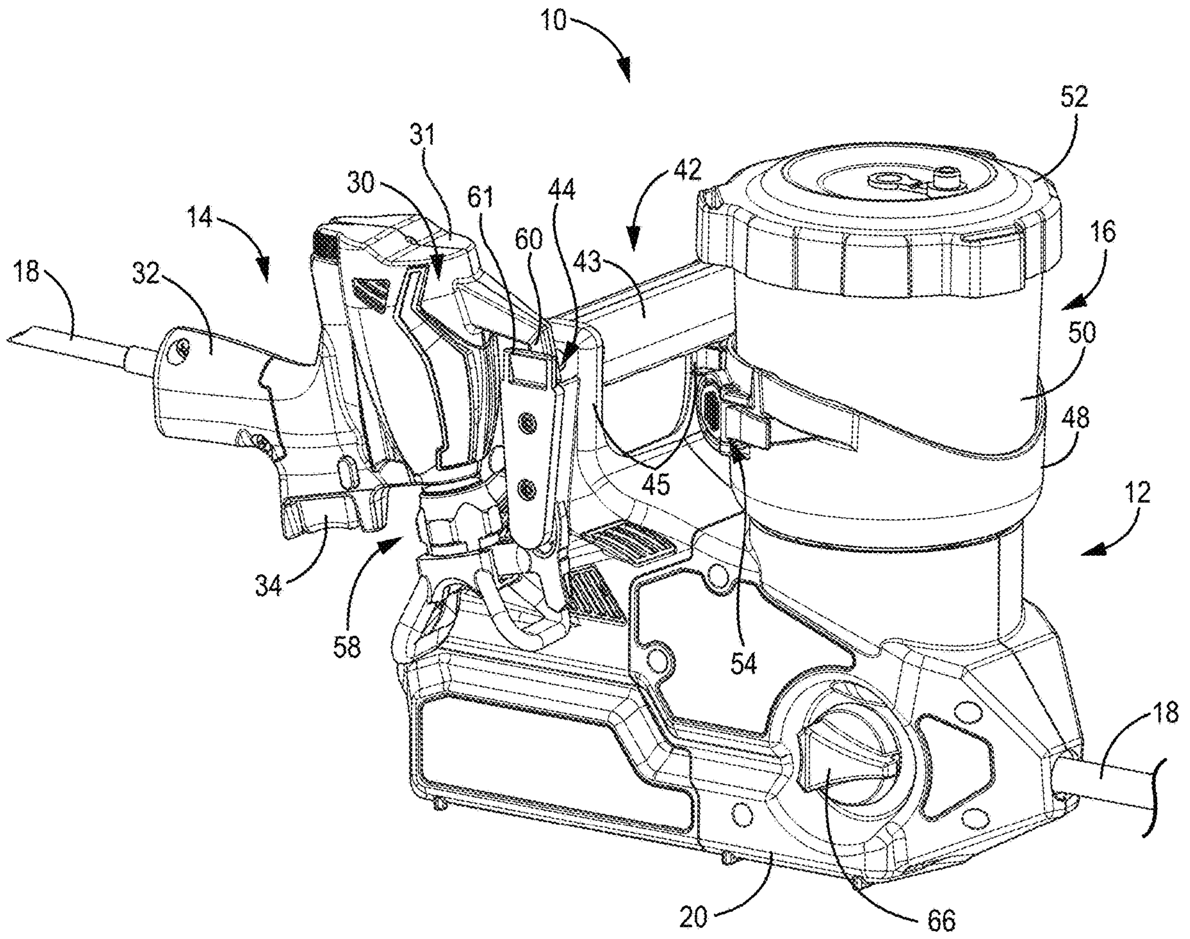
FIG. 9A is an isometric view of a fluid sprayer showing a spray gun mounted to a pump module in a first orientation.
Figure 9B:
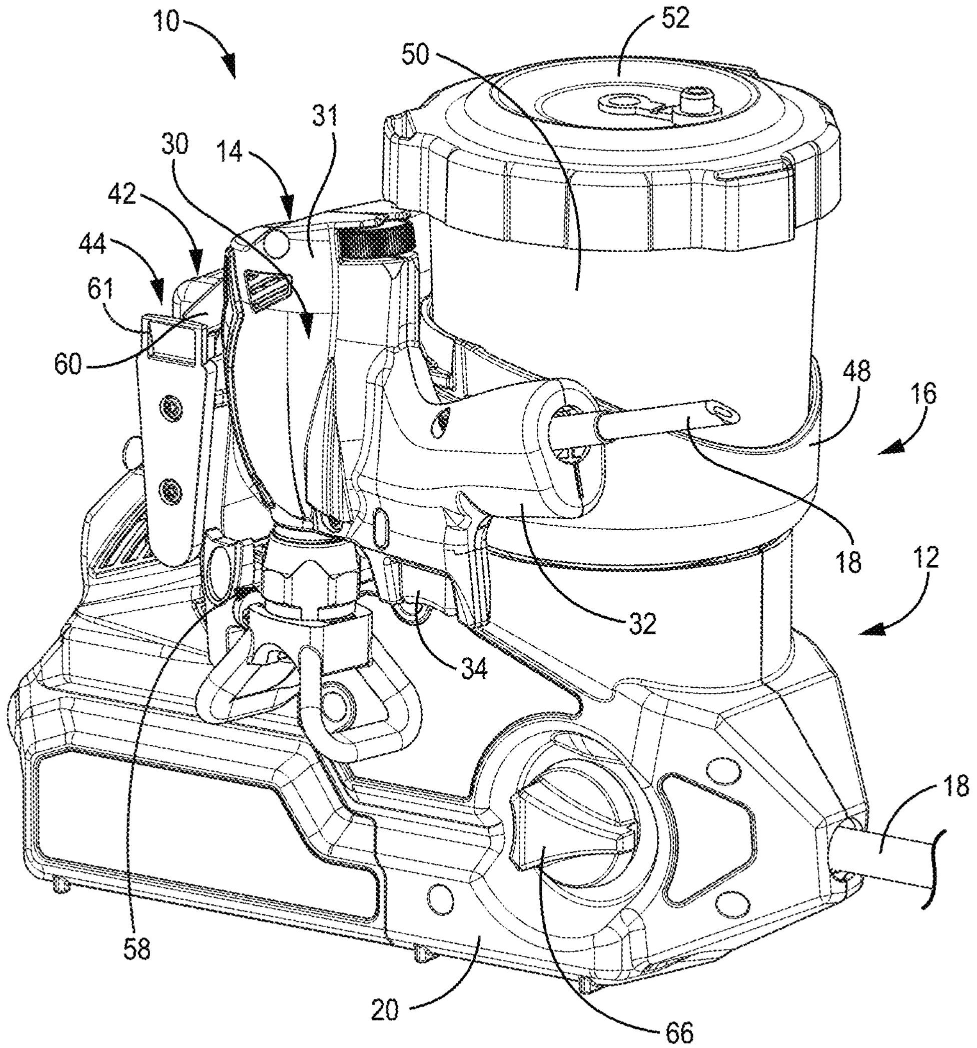
FIG. 9B is an isometric view of the fluid sprayer showing the spray gun mounted to the pump module in a second orientation.
Figure 9C:
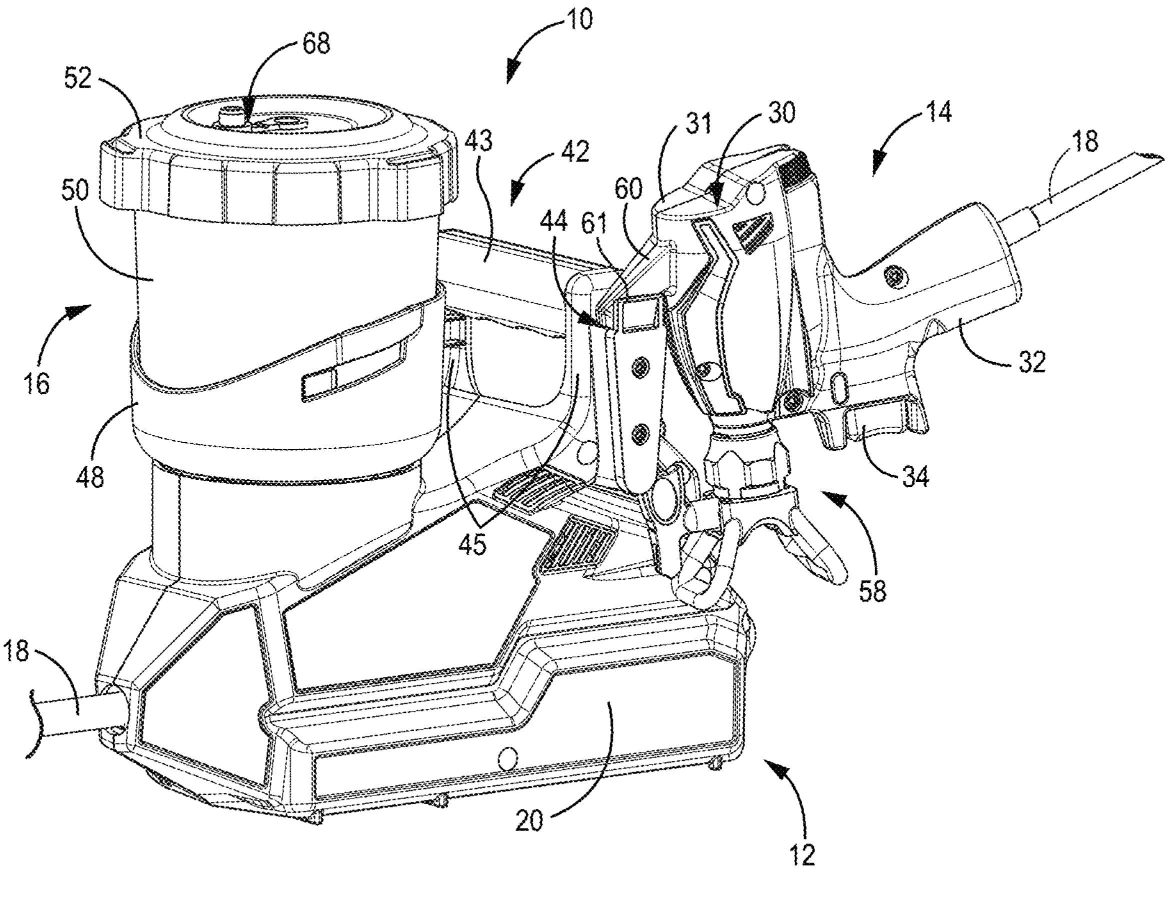
FIG. 9C is an isometric view of the fluid sprayer showing the spray gun mounted to the pump module in a third orientation.
Figure 9D:
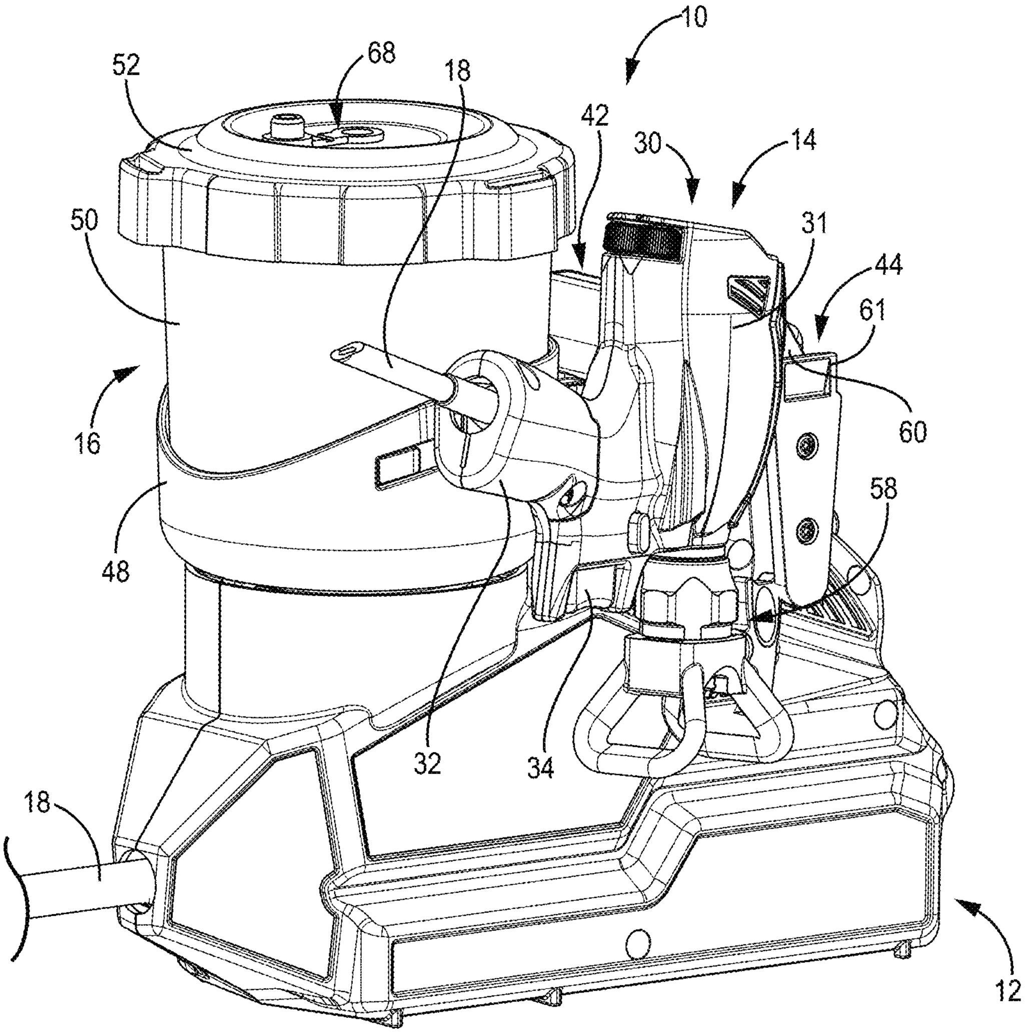
FIG. 9D is an isometric view of the fluid sprayer showing the spray gun mounted to the pump module in a fourth orientation.
Figure 9F:
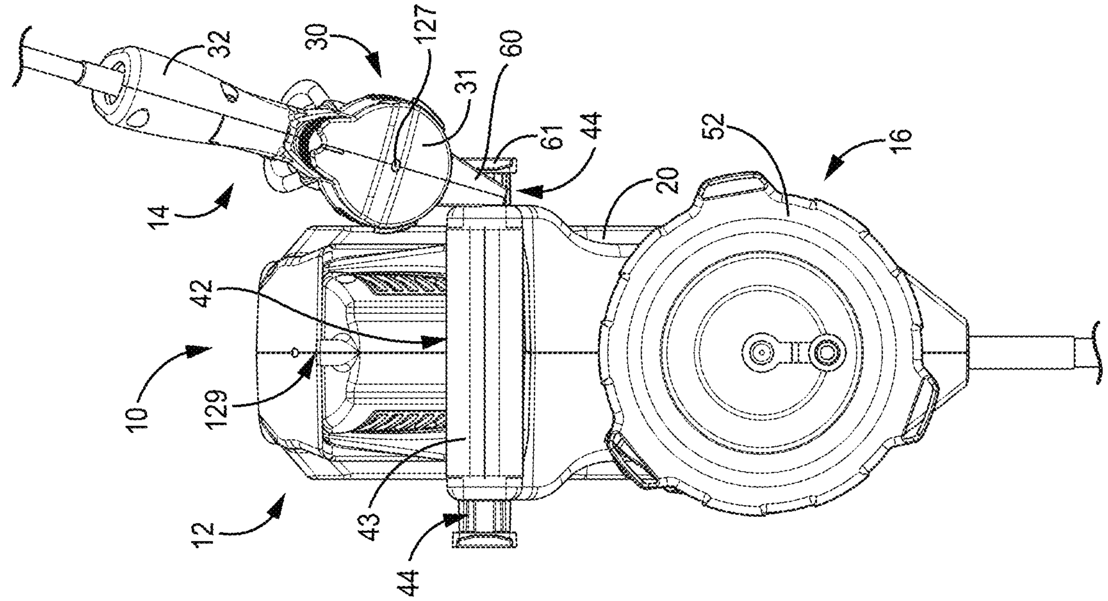
FIG. 9F shows a top view of the fluid sprayer showing the spray gun mounted in the fourth orientation.
Figure 9E:
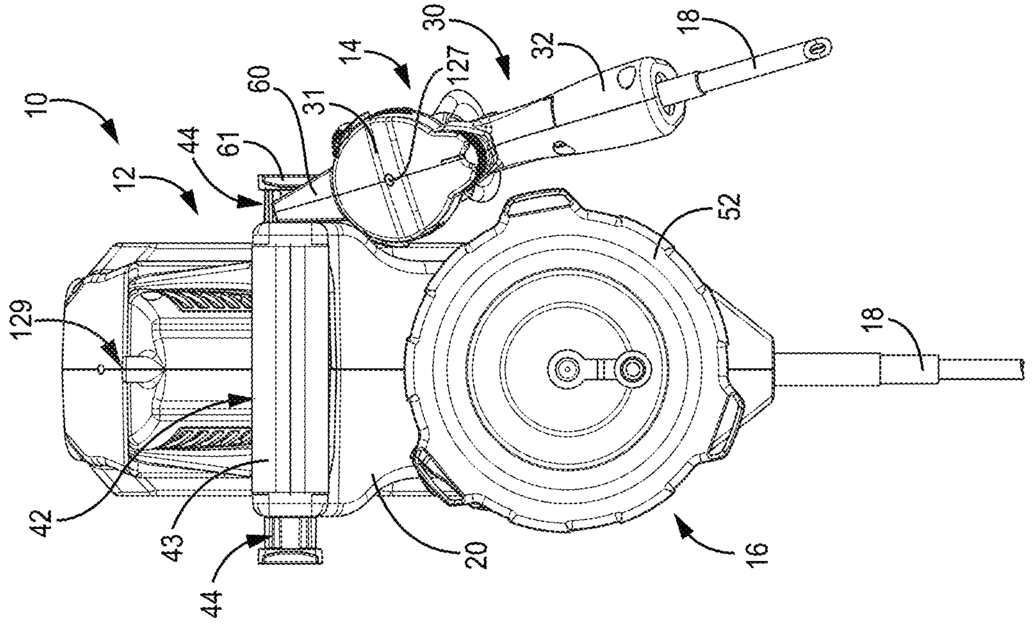
FIG. 9E shows a top view of the fluid sprayer showing the spray gun mounted in the third orientation.

FIG. 9A is an isometric view of fluid sprayer 10 showing spray gun 14 mounted to pump module 12 in a first orientation. FIG. 9B is an isometric view of fluid sprayer 10 showing spray gun 14 mounted to pump module 12 in a second orientation. FIG. 9C is an isometric view of fluid sprayer 10 showing spray gun 14 mounted to pump module 12 in a third orientation. FIG. 9D is an isometric view of fluid sprayer 10 showing spray gun 14 mounted to pump module 12 in a fourth orientation. FIG. 9E shows a top view with spray gun 14 mounted in the third orientation. FIG. 9F shows a top view with spray gun 14 mounted in the fourth orientation.

Spray gun 14 can be mounted to pump module 12 such that spray gun 14 is fully supported by pump module 12. The user can then pick up pump module 12 by grasping grip 43 of module handle 42. Legs 45 of module handle project away from the top side of module housing 20 to space grip 43 from a main body portion of module housing 20. Mounts 44 are disposed on module handle 42. In the example shown, pump module 12 includes a pair of mounts 44 that are disposed on each lateral side of module handle 42. The mounts 44 are formed in recesses that are spaced laterally outward from the grip 43 of module handle 42.

In the example shown, spray gun 14 can mount to pump module 12 by gun mount 60 extending into a mount 44. Mount 44 can be a cavity with a top opening. A user can connect the spray gun 14 to the pump module 12 at mount 44 by inserting gun mount 60 into mount 44 and then carry pump both pump module 12 and spray gun 14 by carrying the pump module 12, such as via module handle 42, with the spray gun 14 connected at mount 44.

As discussed above, pump module 12 is configured to be worn on the body of the user during operation. The pump module 12 can be supported by a strap, such as strap 46, that can be worn around the waist of the user, among other strap options. The spray gun 14 being mountable on either lateral side of the pump module 12 allows the user to mount the spray gun 14 to pump module 12 regardless of whether the user wears the pump module 12 on the right or left hip of the user.

In the first orientation shown in FIG. 9A, spray gun 14 is mounted on a first lateral side of pump module 12 with gun handle 32 oriented rearward relative to pump module 12. In the second orientation shown in FIG. 9B, spray gun 14 is mounted on the first lateral side of pump module 12 with gun handle 32 oriented forward relative to pump module 12. In the third orientation shown in FIG. 9C, spray gun 14 is mounted on a second lateral side of pump module 12 with gun handle 32 oriented rearward relative to pump module 12. In the fourth orientation shown in FIG. 9D, spray gun 14 is mounted on the second lateral side of pump module 12 with gun handle 32 oriented forward relative to pump module 12. As such, spray gun 14 is mountable in four distinct orientations on pump module 12, in the example shown.

Figure 10A:
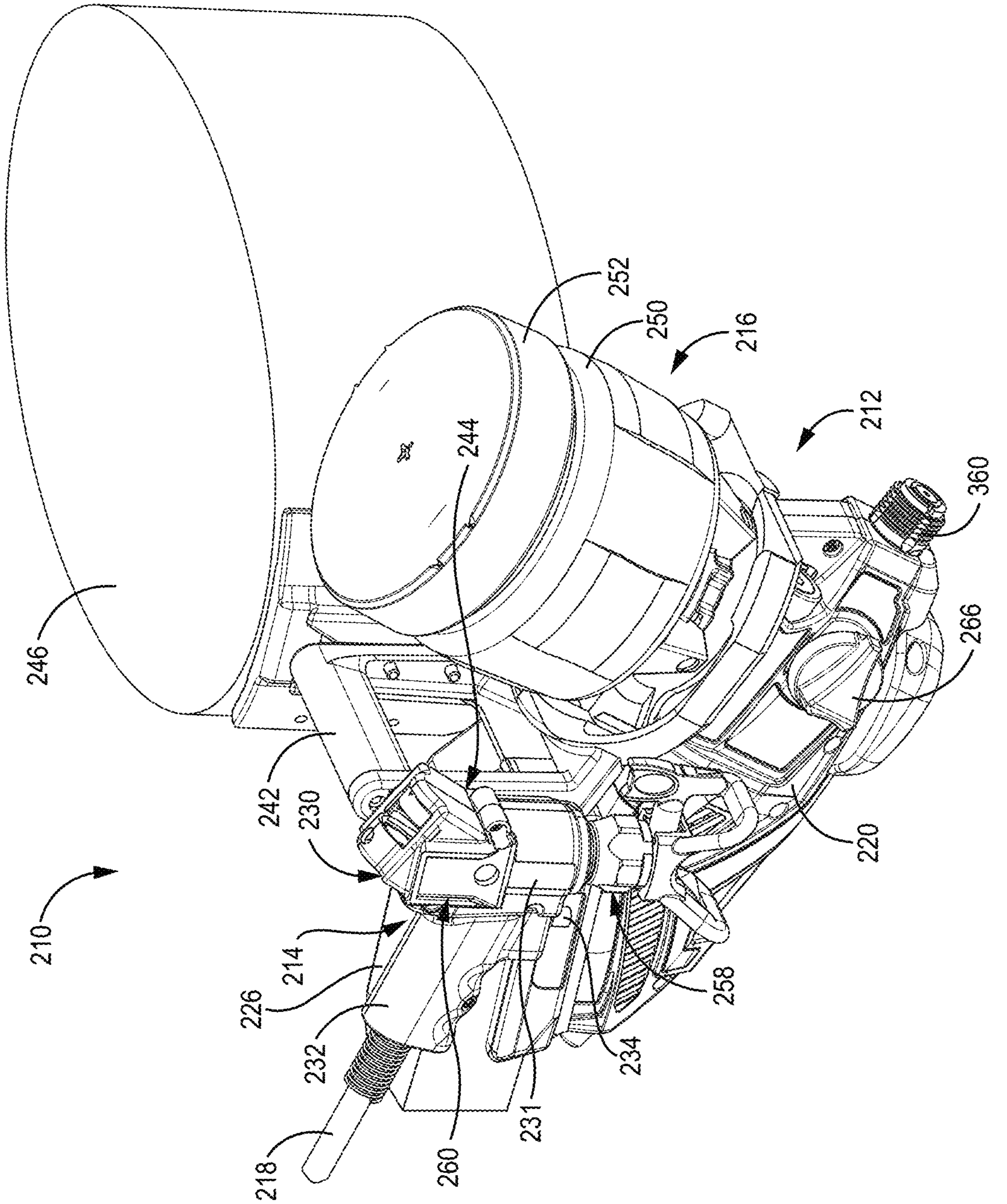
FIG. 10A is an isometric view of another fluid sprayer.
Figure 10B:
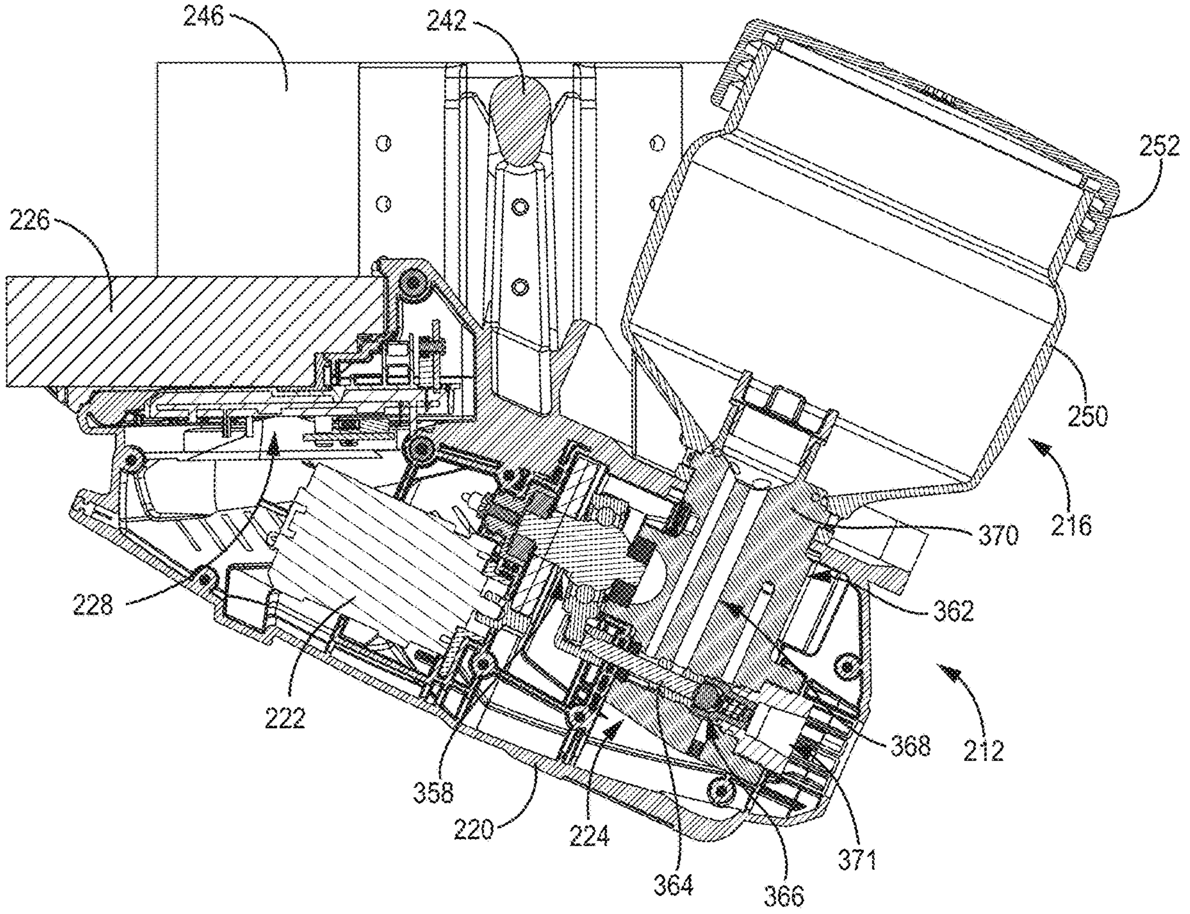
FIG. 10B is a cross-sectional view of the pump module of the fluid sprayer shown in FIG. 10A.

FIG. 10A is an isometric view of fluid sprayer 210. FIG. 10B is a cross-sectional view of the pump module 212 of fluid sprayer 210. FIGS. 10A and 10B will be discussed together. Pump module 212, spray gun 214, and conduit 218 of fluid sprayer 210 are shown. Reservoir 216, module housing 220, motor 222, pump 224, power source 226, controller 228, module handle 242, mount 244, strap 246, tube pot 250, lid 252, valve knob 266, drive 358, and module fitting 360 of pump module 212 are shown. Pump body 362, fluid displacer 364, pump valve 366, channels 368, and pump neck 370 of pump 224 are shown. Gun body 230 including gun housing 231 and gun handle 232, trigger 234, tip assembly 258, and gun mount 260 of spray gun 214 are shown.

Fluid sprayer 210 is substantively similar to fluid sprayer 10 best seen in FIG. 3, and the reference numerals that refer to same or similar components of fluid sprayer 210 as fluid sprayer 10 are incremented by two-hundred relative to the reference numerals that refer to parts of fluid sprayer 10. All components and functions are the same unless otherwise noted are shown to be different.

The fluid sprayer 210 is a handheld sprayer in that it can be fully supported by being carried by a person while spraying. Additionally, the fluid sprayer 210 can be supported by the user's body. Fluid sprayer 210 includes a spray gun 214 which includes gun handle 232 for gripping by hand such that the fluid sprayer 210 can be operated by one hand. Gun handle 232 projects from gun housing 231. The fluid sprayer 210 includes a pump module 212.

The fluid sprayer 210 includes a power source 226. In this embodiment, the power source 226 is a removable electric battery (e.g., rechargeable lithium ion based), although in various other versions the power source 226 can be an electrical cord for plugging into a standard electrical outlet.

Fluid sprayer 210 includes a fluid reservoir 216. The fluid reservoir 216 can contain the fluid to be sprayed. In this example, the fluid reservoir 216 is fully supported by the pump module 212. The fluid reservoir 216 is mounted on the top of the pump module 212 in this example, however in various other examples, the fluid reservoir 216 can be to the side of and/or below the pump module 212 or be integrated entirely within the module housing 220 of the pump module 212.

The fluid sprayer 210 includes a conduit 218 that extends from the pump module 212 to a spray gun 214. The conduit 218 is flexible and includes a fluid conveying hose for routing the fluid under pressure.

As further discussed herein, the conduit 218 can have one or more wires integrated into it to transmit electrical signals (including power) between the pump module 212 and the spray gun 214.

Conduit 218 connects with the pump module 212 at module fitting 360. A fitting of conduit 218 interfaces with module fitting 360. The fitting of conduit 218 can be threaded to connect and disconnect from the module fitting 360 of pump module 212. The fitting of conduit 218 may include a fluid connection for routing pumped paint from the pump module 212 to the spray gun 214. The fitting of conduit 218 may also facilitate multiple electrical connections of the conduit 218 to the pump module 212, such as by aligning conductive contacts.

The pump module 212 includes a valve knob 266. Valve knob 266 can connect with a prime valve internal to the pump module 212 which can recirculate fluid output from the pump back to the reservoir 216 for priming, or route the paint through the module fitting 360 to the conduit 218 for spraying, depending on the orientation of the valve knob 266.

Pump module 212 includes a module housing 220 which can contain components and support components. The module housing 220 may be formed from halves, amongst other components. As such, some examples of module housing 220 can be formed as a clamshell housing. Some components of the pump module 212 may be contained within the module housing 220, others may be mounted on the exterior the module housing 220 or separate from the module housing 220. Some components of pump module 212 can be partially disposed within module housing 220 and partially disposed outside of module housing 220. The module housing 220 can be polymer, such as a polymer clamshell.

The pump module 212 can be attached to a strap 246 for holding the pump module 212 to the user. In this case, the strap 246 is a belt which can be worn around the waist of the user, however other options are possible, such as a shoulder strap or backpack amongst other options.

Fluid sprayer 210 includes a trigger 234. In this embodiment, the trigger 234 is located next to or is part of the gun handle 232 of spray gun 214. Actuation of the trigger 234 causes the spray gun 214 to emit a fluid spray from a nozzle of the spray gun 214, similar to nozzle 40. In this case, the trigger 234 is a button which can be depressed, but the trigger 234 can take different forms. The trigger 234 is mounted on the spray gun 214. In this way, the trigger 234 can be separate from the pump module 212 as the conduit 218 extends away from the pump module 212.

The trigger 234 can be electrically connected to the controller 228 within the pump module 212, such as via a wired or wireless connection. The trigger 234 can be an electrical switch. Actuation of the trigger 234 causes the fluid sprayer 210 to emit an atomized spray of the spray fluid.

The electric motor 222 can be electrically connected to a controller 228. The controller 228 can be one or more circuits for receiving (e.g., from an input, sensor, power source, etc.), conditioning, and/or sending signals (e.g., outputs, commands, power signals). Controller 228 may be one or more distinct circuits. Controller 228 may be one or more distinct boards. Controller 228 may contain digital logic circuit, such chip(s) containing program instructions, for carrying out any of the functions described herein.

The controller 228 receives actuation signals from the trigger 234. Upon receiving an actuation signal, the controller 228 is powered from a power source 226 to the electric motor 222 which outputs rotational motion. Drive 358 receives the rotational output from the electrical motor 222 and converts that motion into a reciprocating motion. The reciprocating motion output by the drive 358 is input to the pump 224 to operate the pump 224. The pump 224 includes one or more fluid displacers 264, such as a piston. While one fluid displacer 364 is shown in the cross-sectional view of FIG. 10B, three fluid displacers 264 are included which reciprocate out of phase with respect to each other. The pump 224 draws fluid from the fluid reservoir 216 and puts it under pressure, outputting the fluid through pump valve 366 (with ball and seat in the example shown), and then through pump outlet 371 to the fitting of conduit 218, the fluid conveying hose of conduit 218, and then to the spray gun 214.

In some embodiments, the interface between module fitting 360 and the fitting of conduit 218 is entirely located within the module housing 220, such that the conduit 218 only emerges from an aperture in the module housing 220. This allows one or more wires as part of the conduit 218 to separate from the fluid carrying portion of the conduit 218 within the module housing 220, which helps protect the one or more wires.

The reservoir 216 is directly above the pump 224. In particular, the reservoir 216 is directly above the fluid displacer 364 and the pump valve 366. This allows gravity to directly feed the fluid within the interior of the reservoir 216 through channels 368 orientated directly downward into the pump 224, whereas any air that might otherwise interfere with priming and pumping rises to the top of the reservoir 216 to not interfere. Direct gravity feeding aids in consistent continuous flow of fluid to the pump 224.

The reservoir 216 includes a tube pot 250. The tube pot 250 includes top and bottom openings, like a tube, which can be sealed at both ends by the lid 252 and the pump body 362 to contain fluid. The lid 252 can thread on to the top end of the tube pot 250 to seal the lid 252 to the tube pot 250, amongst other fixation options. The bottom end of the tube pot 250 can interface with the pump body 362 to mount and seal a connection between the pump body 362 and the reservoir 216. In the example shown, tube pot 250 is directly mounted to pump neck 370. The connection between the tube pot 250 and the pump body 362 may be threaded, amongst other options.

Multiple channels 368 extend from being exposed to the reservoir 216 to the cylinders housing the fluid displacers 264. Each channel 368 is a separate bore. It is noted that each of the channels 368 includes its own independent opening for receiving fluid from the reservoir 216 to be routed along a respective bore to a respective fluid displacer 364. The channels 368 do not branch from a common opening that receives fluid from the reservoir 216. The channels 368 may be offset from the central axis of the tube pot 250.

The pump module 212 optionally includes a module handle 242 for supporting the body of the pump module 212 by hand. The module handle 242 includes two support legs and a grip portion extending between the two support legs. The two support legs extend vertically upward.

The module handle 242 can be formed from the same material as module housing 220 of the pump module 212. In this embodiment, the module handle 242 includes a mount 244, which can also be referred to as a module mount, however the mount 244 may be located elsewhere on the pump module 212. The mount 244 can include a receiver for receiving gun mount 260 portion of the spray gun 214, for securing the spray gun 214 to the pump module 212. A snap fit connection may be established between the spray gun 214 and the pump module 212 for connecting the gun mount 260, which can also be referred to as a gun mating part, to the mount 244, such as by engagement of tabs and recesses of respective housings of the spray gun 214 and the pump module 212. Slot-and-tab engagement may be used instead for a connection that is established and separated by relative sliding. The mount 244 may be located on both lateral sides of the pump module 212 so that the spray gun 214 can be mounted on either lateral side of the pump module 212 depending on which side of the user's body the pump module 212 is mounted. Likewise, gun mounts 260 can be located on both lateral sides of the spray gun 214 to connect with both lateral sides of the pump module 212. Thus, the spray gun 214 can be mounted on either side of the pump module 212. Further, when mounted on either side, the spray gun 214 can point in any of two directions. For example, when the spray gun 214 is worn on the right side of the user, the spray gun 214 can be mounted such that gun handle 232 can be pointed either forwards or backwards depending on the preference of the user. Likewise, when the spray gun 214 is worn on the left side of the user, the spray gun can be mounted such that the handle can be pointed either forwards or backwards depending on the preference of the user. This is accomplished by having complementary gun mounts 260 on both lateral sides of the spray gun 214 which selectively connect with mounts 244 on both lateral sides of the pump module 212.

Figure 11:
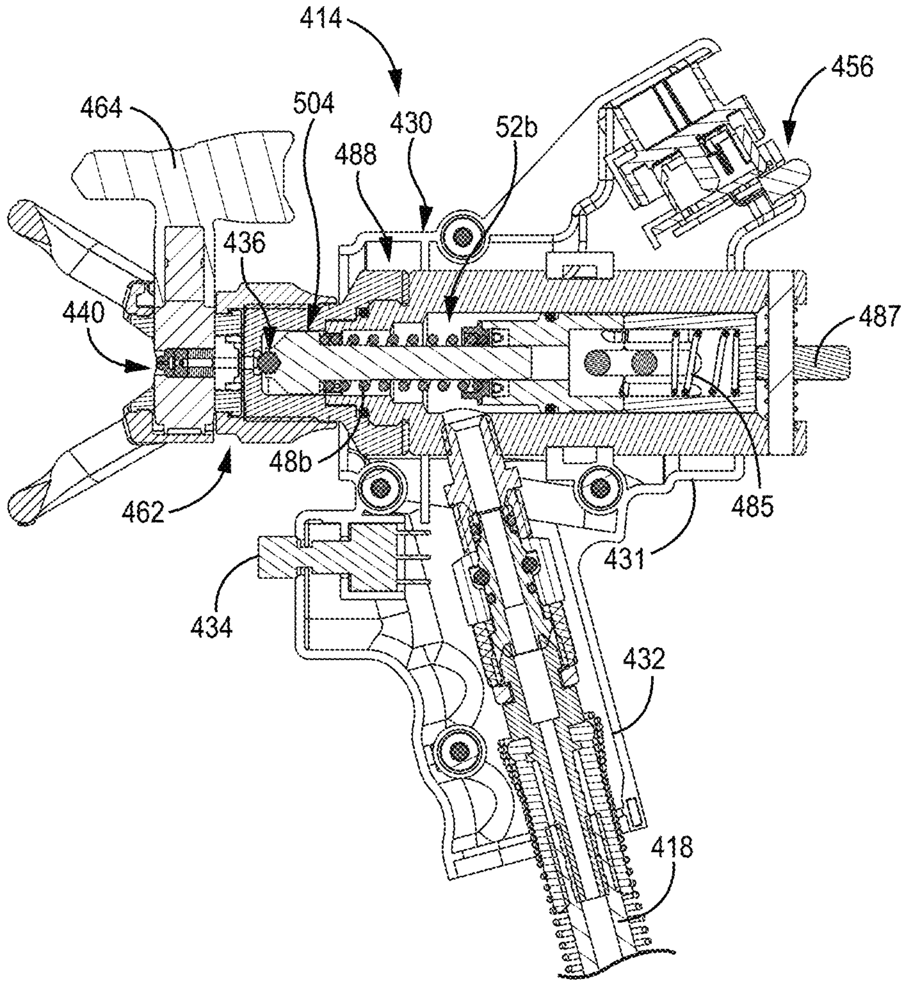
FIG. 11 is a cross-sectional view of an alternative embodiment of a spray gun.

FIG. 11 is a cross-sectional view of spray gun 414. Spray gun 414 is substantively similar to spray gun 14 previously shown as described, and the reference numerals that refer to same or similar components of spray gun 414 as spray gun 14 are incremented by four-hundred relative to the reference numerals that refer to parts of spray gun 14. All components and functions are the same unless otherwise noted are shown to be different.

Spray gun 414 includes gun body 430 having gun housing 431 and gun handle 432 extending from gun housing 431. Trigger 434 extends outward relative to gun handle 432 in the example shown. Fluid housing 488 is disposed at least partially within gun body 430 and defines wet chamber 526 that the spray fluid can flow within. The spray gun includes reversible spray tip 464 that is supported by tip housing 462 mounted to fluid housing 488. The spray tip 464 can be inserted into a bore in tip housing 462 and can be rotated 180-degrees to reverse the direction of flow through the spray tip 464. The nozzle 440 is contained within the spray tip 464 and is configured to atomize the fluid under pressure into a spray fan.

The spray gun 414 includes a spray valve 436. In the example shown, the spray valve 436 opens under pressure from the spray fluid being pumped through the conduit 418 to spray when the pressure of the spray fluid within a wet chamber 526 is above a threshold level that overcomes the spring 486. The spring 486 closes the spray valve 436 when the pressure falls sufficient that the pressure no longer overcomes the spring 486 and the spring 486 pushes the needle assembly 504 forward to close the spray valve 436, stopping spraying. Spray gun 414 differs from spray gun 14 in that spray gun 414 does not include a solenoid that actuates the spray valve 436.

Extending through the wet chamber 526 is a needle assembly 504. Needle assembly 504 can be operationally connected to a tensioning spring 485, which balances the spring 486 for what pressure has to be achieved in the wet chamber 526 to overcome the spring 486 and open the spray valve 436. Tensioning knob 487 can be rotated clockwise or counterclockwise to change the tension in position of the spring 486 relative to the tensioning spring 485 to adjust the threshold level at which the pressure of the fluid in the wet chamber 526 overcomes the spring 486 to open the spray valve 436 to spray, and close the spray valve 436. It is noted that spring 486, needle assembly 504, tensioning spring 485, and tensioning knob 487 are all coaxial, in this example.

In this example and various other examples, the trigger 434 does not directly or manually open the spray valve 436. There is no direct, mechanical link such that the spray valve 436 moves with the trigger 434. Rather, the actuation of the trigger 434 causes a controller (e.g., controller 28, controller 228) to power an electric motor (e.g., electric motor 22, electric motor 222) to drive a pump (e.g., pump 24, pump 224) to increase fluid pressure within the conduit 418 and the wet chamber 526 to overcome the spring 486 to open the spray valve 436 in order for the fluid to spray from the nozzle 440. Releasing of the trigger 434 causes the controller to reduce power to the electric motor, which reduces the hydraulic pressure in the conduit 418 and in the wet chamber 526 which allows the spring 486 to close the spray valve 436 to cease spraying from the nozzle 440.

Spray gun 414 includes spray setting input 456. Spray setting input 456 can be an interface, such as a dial, switch, knob, or other input that is in electrical communication with the controller (wired or wireless). The spray setting input 456 can receive an input from the user indicating a level of power to deliver to the electric motor. Such level of power can be selected via the spray setting input 456 to control the pressure, spray volume, spray fan size, or other metric of the output of the spray gun 414. A signal may be communicated between the spray setting input 456 and the controller. Further, a signal may be communicated between the trigger 434 and the controller. The signal may be communicated, at least in part, by one or more wires that extends along the conduit 418. Alternatively, signals may be communicated wirelessly.

Figure 12:
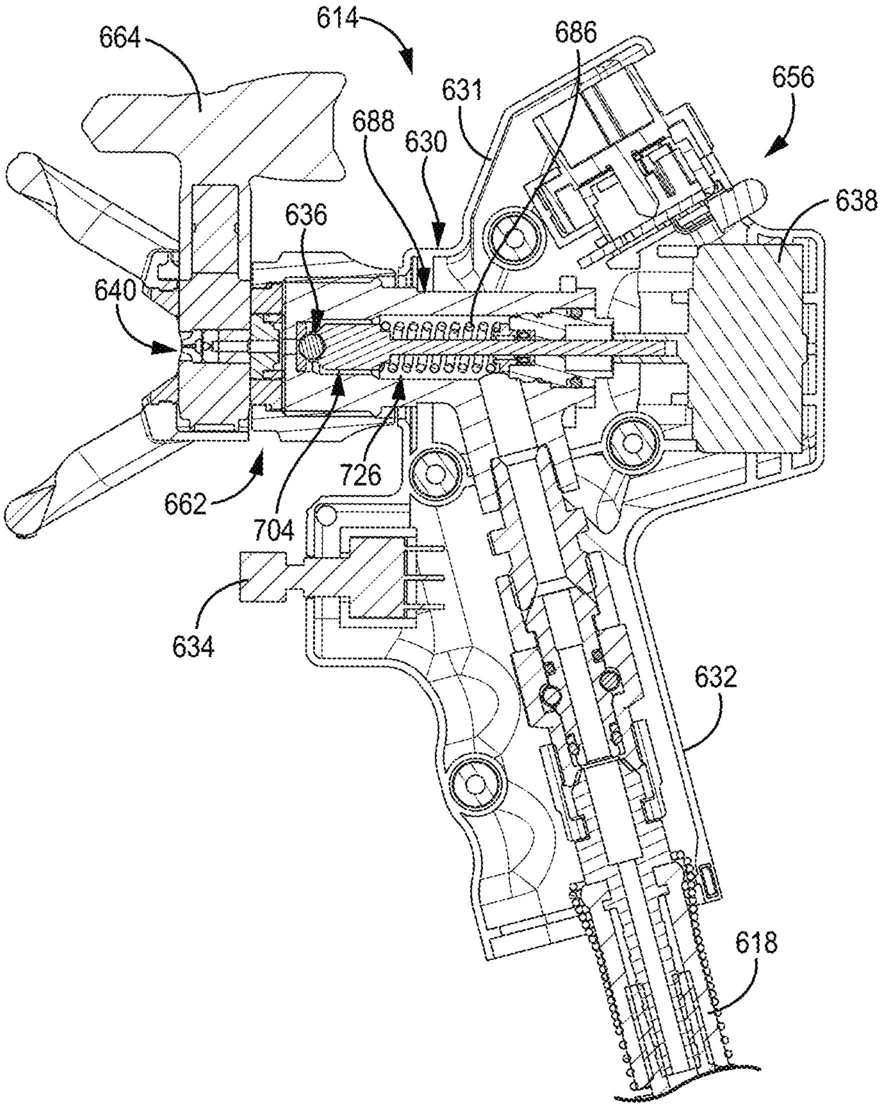
FIG. 12 is a cross-sectional view of an alternative embodiment of a spray gun.

FIG. 12 shows an alternative design of the spray gun 614. Spray gun 614 is substantively similar to spray gun 14 previously shown as described, and the reference numerals that refer to same or similar components of spray gun 614 as spray gun 14 are incremented by six-hundred relative to the reference numerals that refer to parts of spray gun 14. All components and functions are the same unless otherwise noted are shown to be different. Spray gun 614 differs from spray gun 14 in that spray gun 614 does not include a separate dry chamber within a housing that is within gun body 630. Instead, solenoid 638 of spray gun 614 is disposed within gun body 630, which facilitates air cooling of the solenoid 638. Solenoid 638 is still isolated from the spray fluid. Spray gun 614 differs from spray gun 414 in that spray gun 614 includes a solenoid 638 for actuating the spray valve 636.

Spray gun 614 includes gun body 630 having gun housing 631 and gun handle 632 extending from gun housing 631. Trigger 634 extends outward relative to gun handle 632 in the example shown. Fluid housing 688 is disposed at least partially within gun body 630 and defines wet chamber 726 that the spray fluid can flow within. The spray gun includes reversible spray tip 664 that is supported by tip housing 662 mounted to fluid housing 688. The spray tip 664 can be inserted into a bore in tip housing 662 and can be rotated 180-degrees to reverse the direction of flow through the spray tip 664. The nozzle 640 is contained within the spray tip 664 and is configured to atomize the fluid under pressure into a spray fan. Spray setting input 656 is supported by gun body 630 and can provide spray setting signals to the controller to regulate operation of the pump that provides spray fluid to spray gun 614 through conduit 618.

In this embodiment, a solenoid 638 pulls back the needle assembly 704 to open the spray valve 636 instead of, or in addition to, the pressure within the wet chamber 726. Solenoid 638 is disposed coaxially with needle assembly 704, spray valve 636, and nozzle 640 in the example shown. In operation, the actuation of the trigger 634 sends a signal along a wire, or wirelessly, to a controller (e.g., controller 28, controller 228). The controller sends a signal back up the wire (the wire being understood to contain multiple, independent, and isolated electrical connections to conduct multiple, independent signals simultaneously), or wirelessly, to activate the solenoid 638 to pull the needle assembly 704 rearward to overcome the spring 686 to open the spray valve 636 to release fluid that is within the wet chamber 726 from the nozzle 640 as an atomized spray. Spraying continues for as long as the trigger 634 continues to be actuated. When the user releases the trigger 634, a signal is sent (or the previous signal is discontinued) to the controller which depowers the solenoid 638, allowing the spring 686 to return the needle assembly 704 to a forward position, closing the spray valve 636 to cease spraying from the nozzle 640. The cycle is repeated each time the trigger 634 is pulled and released.

Figure 13B:
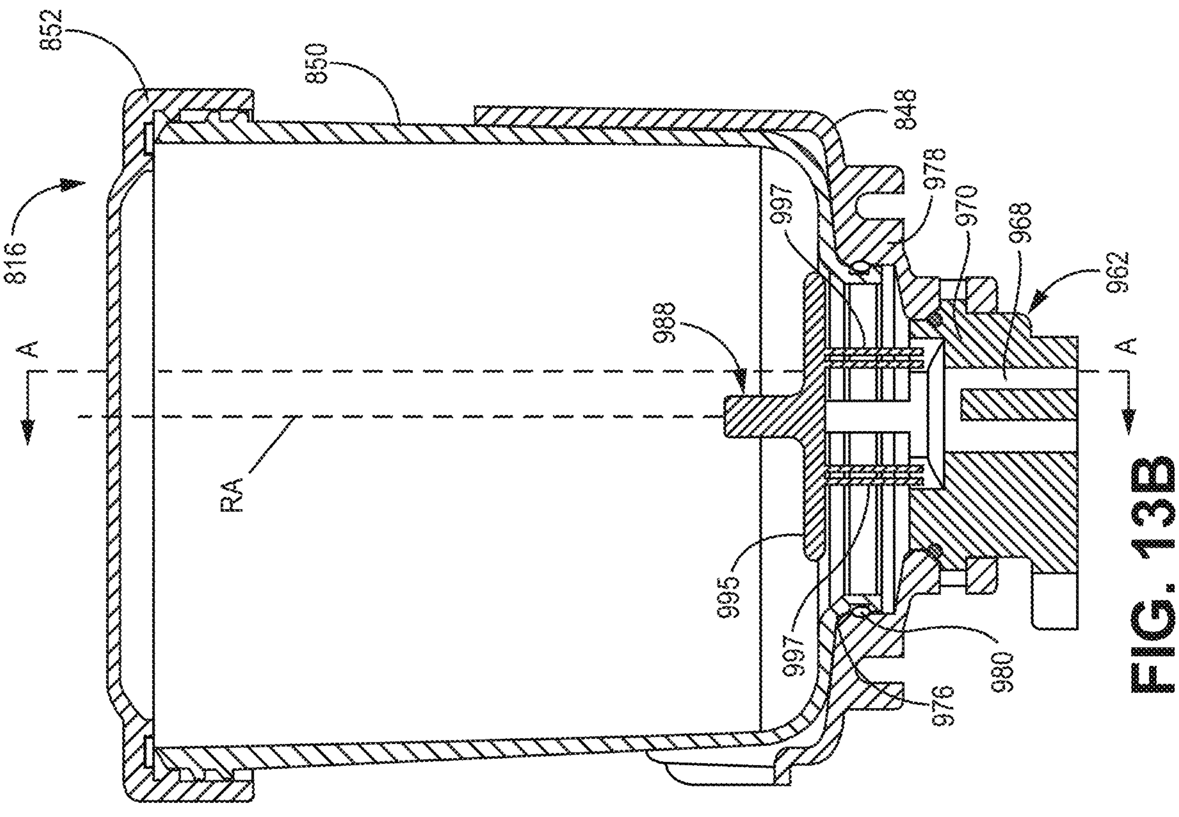
FIG. 13B is a cross-sectional view of the fluid reservoir shown in FIG. 13A taken along line B-B in FIG. 13A.
Figure 13A:
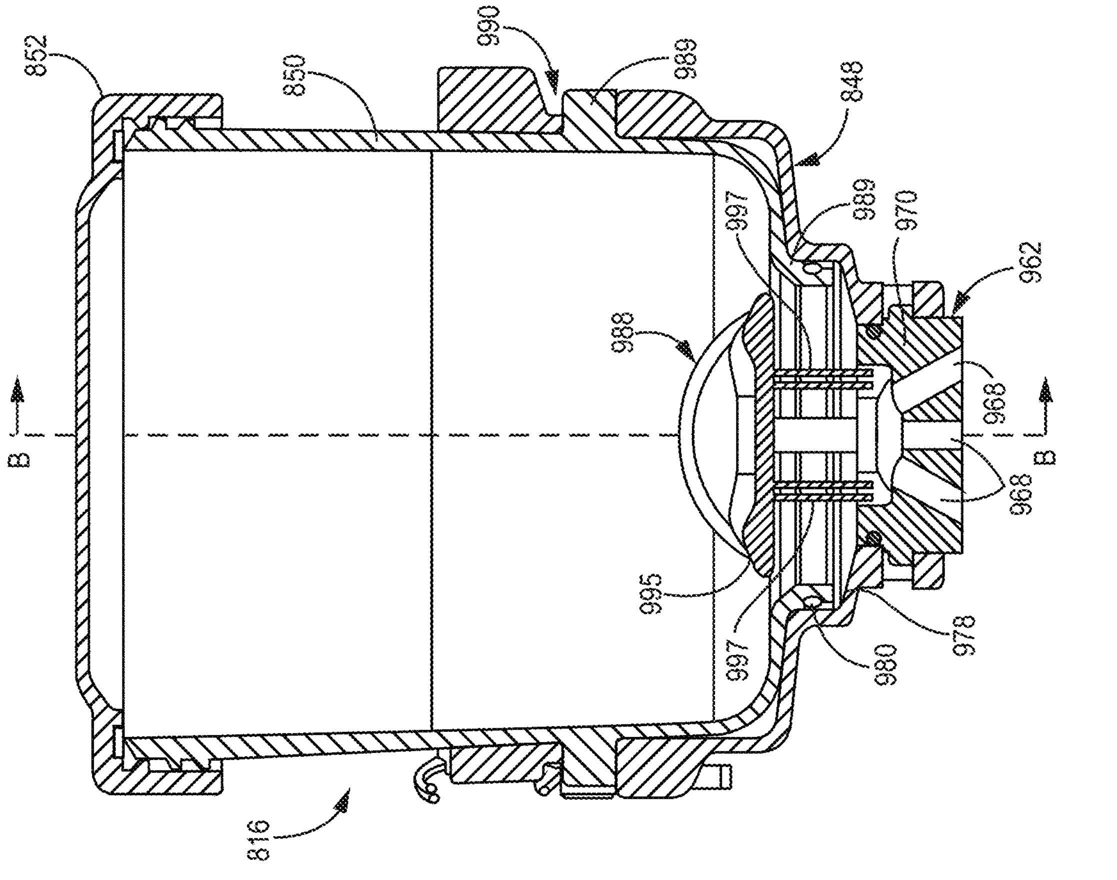
FIG. 13A is a cross-sectional view of an alternative embodiment of a fluid reservoir taken along line A-A in FIG. 13B.
Figure 14:
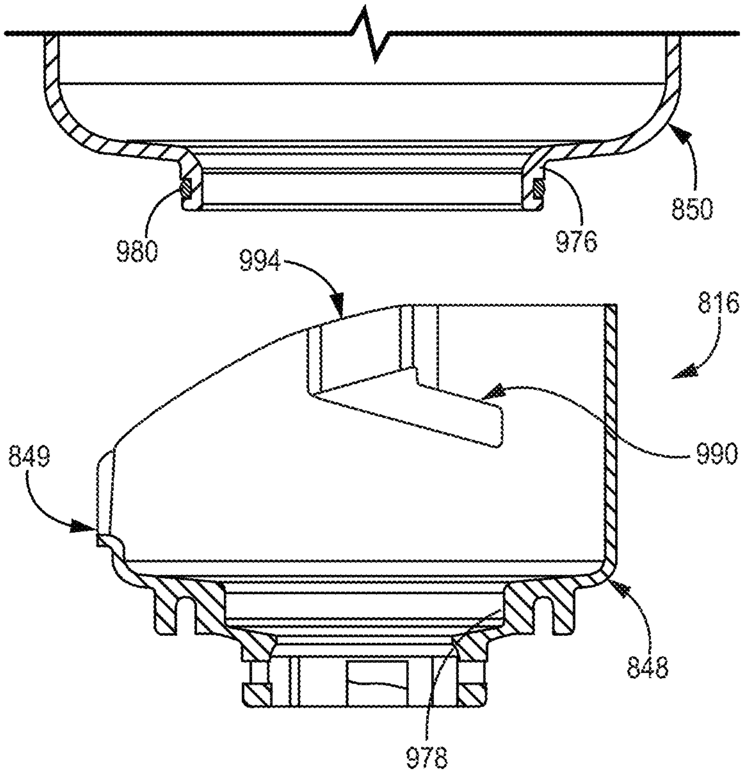
FIG. 14 is an enlarged cross-sectional, exploded view of a portion of the fluid reservoir shown in FIG. 13A.
Figure 15:
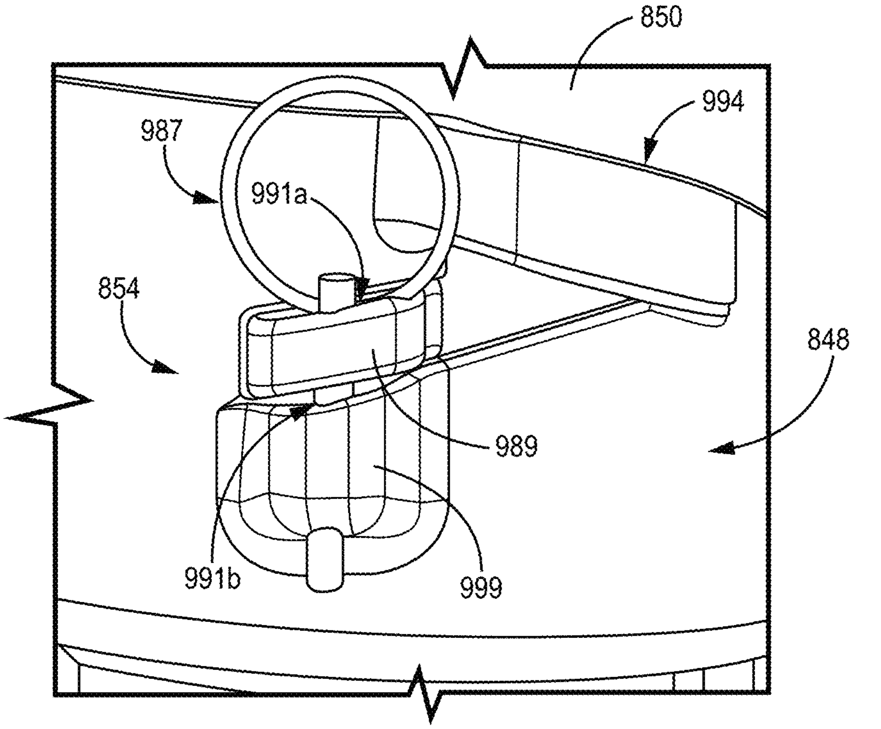
FIG. 15 is an enlarged isometric view showing a pot lock of the fluid reservoir shown in FIG. 13A.

FIG. 13A is a cross-sectional view of an alternative reservoir 816 taken along line A-A in FIG. 13B. FIG. 13B is a cross-sectional view of reservoir 816 taken along line B-B in FIG. 13A. FIG. 14 is an enlarged cross-sectional, exploded view of reservoir 816 showing the tube pot 850 dismounted from the basin 848. FIG. 15 is an enlarged isometric view showing a pot lock 854 of the reservoir 816. FIGS. 13A-15 are discussed together. Reservoir 816 is substantively similar to reservoir 16 previously shown as described, and the reference numerals that refer to same or similar components of reservoir 816 as reservoir 16 are incremented by eight-hundred relative to the reference numerals that refer to parts of reservoir 816. All components and functions are the same unless otherwise noted are shown to be different.

While some details might be different, this embodiment can be used as a reservoir for the pump module 12 or pump module 212 previously shown and referenced. This embodiment includes several features. One feature is a basin 848 into which the tube pot 850 in this seated. The basin 848 can be permanently fixed to the module housing (e.g., module housing 20 or module housing 220) and/or the pump (e.g., pump 24 or pump 224), such as directly to the pump body (e.g., pump body 162 or pump body 362). The pump neck 970 of pump body 962 of a pump (substantively similar to pump 24, pump 224) is shown in FIGS. 13A and 13B. The tube pot 850 can be lifted out of, and released from, the basin 848. Interfacing between projections 989 and mount slots 990 selectively fixes the tube pot 850 on and releases the tube pot 850 from the basin 848. The tube pot 850 includes a pot neck 976, which can also be referred to as a taper. Reservoir seal 980 is disposed between the pot neck 976 and basin seat 978 for sealing with the basin seat 978 of the basin 848. The walls of the basin 848 are radially outward of the walls of the tube pot 850 to contain fluid within the basin 848, radially between the walls.

The channels 968 through pump body 962 are not aligned with the vertical reservoir axis RA of the tube pot 850. Specifically, the channels 968 are offset from the vertical reservoir axis RA of the tube pot 850.

Located directly above the inlets of the channels 968 is a filter 988. The filter 988 is in the shape of a mushroom, with a wider filter head 995 and a narrower filter base 997. The filter base 997 is formed by a plurality of legs, with mesh material extending between the legs to filter paint. The filter base 997 of the filter 988 press fits into a cavity of the pump body 962 in the example shown. The press-fit allows the filter 988 to be removed for cleaning and reinserted. The filter base 997 of the filter 988 may alternatively have a threaded connection for connecting to the pump body 962, amongst other options for facilitating a connection to secure the filter 988 to the base pump body 962.

The filter 988 can serve several purposes. One purpose is to strain the fluid being pumped, such as non-sprayable particles in paint. As previously stated, the filter 988 can be removed for cleaning and reinserted.

One purpose of filter 988 is in covering the outlets of the channels 968 so that pressure within the pump 824 does not cause unexpected retrograde flow through the channels 968 that would project out of the tube pot 850 if the lid 852 is not fastened. The filter 988 blocks the trajectory of fluid spouting from the channels 968. In particular, the filter head 995 blocks any fluid propelled upward along reservoir axis RA.

In one purpose, the filter head 995 of the filter 988 is round and causes the fluid within the tube pot 850 to flow around the filter head 995 of the filter 988 and not directly downward (through the filter head 995 of the filter 988) to the channels 968. Alternatively, if the fluid was to flow directly downward instead of around the filter head 995, the suction created by channels 968 could create a void of fluid in the center along axis RA and cause air to be taken into the channels 968 to deprime the pump 824 despite fluid being on the side of the reservoir 816, particularly when viscous fluids such as thicker paints are sprayed which flows slower near walls.

The basin 848 can be permanently fixed to the pump 824. The basin 848 can be radially wider than the tube pot 850 so that the tube pot 850 can be accepted inside of the basin 848. The basin 848 is round with high walls to catch and contain any fluid that falls from the tube pot 850 to prevent fluid from dripping onto other parts of the pump module (e.g., pump module 12, pump module 212). If the fluid drips into the basin 848, the fluid can either flow downward toward the channels 968 for removal by the pump 824 or poured out of spout 849. Spout 849 is a lower part of the annular wall of the basin 848 to facilitate pouring from a particular circumferential part of the basin 848 while higher walls elsewhere about the basin 848 prevent the escape of the fluid from the basin 848. The spout 849 can be orientated forward on the pump module to route any fluid away from the sides and/or back (where controls, handle, and/or battery are located).

Mount slots 990 are angled so that as the tube pot 850 is rotated, the projections 989 force the tube pot 850 to move axially upward relative to the basin 848 to separate the pot neck 976 from the basin seat 978 during dismounting. Mount slots 990 are angled so that as the tube pot 850 is rotated, the projections 989 force the tube pot 850 to move axially downward during mounting. This allows the pot neck 976 and the reservoir seal 980 to fit tightly in the basin seat 978 to promote sealing, but such interference may resist separation. But the interface of the projections 989 with angled mount slots 990 during relative rotation provides mechanical advantage for axial separation of the tube pot 850 from the basin seat 978. Likewise, rotating the tube pot 850 relative to the basin 848 provides mechanical advantage as the pot neck 976 is moved axially downward into the basin seat 978 for an interference fit. In this way, the user does not need to push or pull the tube pot 850 axially when engaging or disengaging the interference between the pot neck 976 and the basin seat 978.

Projections 989 can move into and out of the mount slots 990 by mount notches 994 that form vertical pathways. Mount notches 994 are outward bows in the walls of the basin 848 which accommodate the radial diameter of the projections 989 to pass through when the tube pot 850 is moved up or down relative to the basin 848.

FIG. 15 shows bowing of the walls of the basin 848 to form the mount notches 994. Projection 989 includes a lock aperture 991*a* to line up with a lock aperture 991*b* in a bulge 999 in the basin 848 to allow a fastener 987 to temporarily lock the position of the tube pot 850 relative to the basin 848. In this case, the fastener 987 is a pin, however other options are possible. The fastener 987 extending through the projection 989 and bulge 999 forms the pot lock 854 of reservoir 816 in the example shown.

Figure 16:
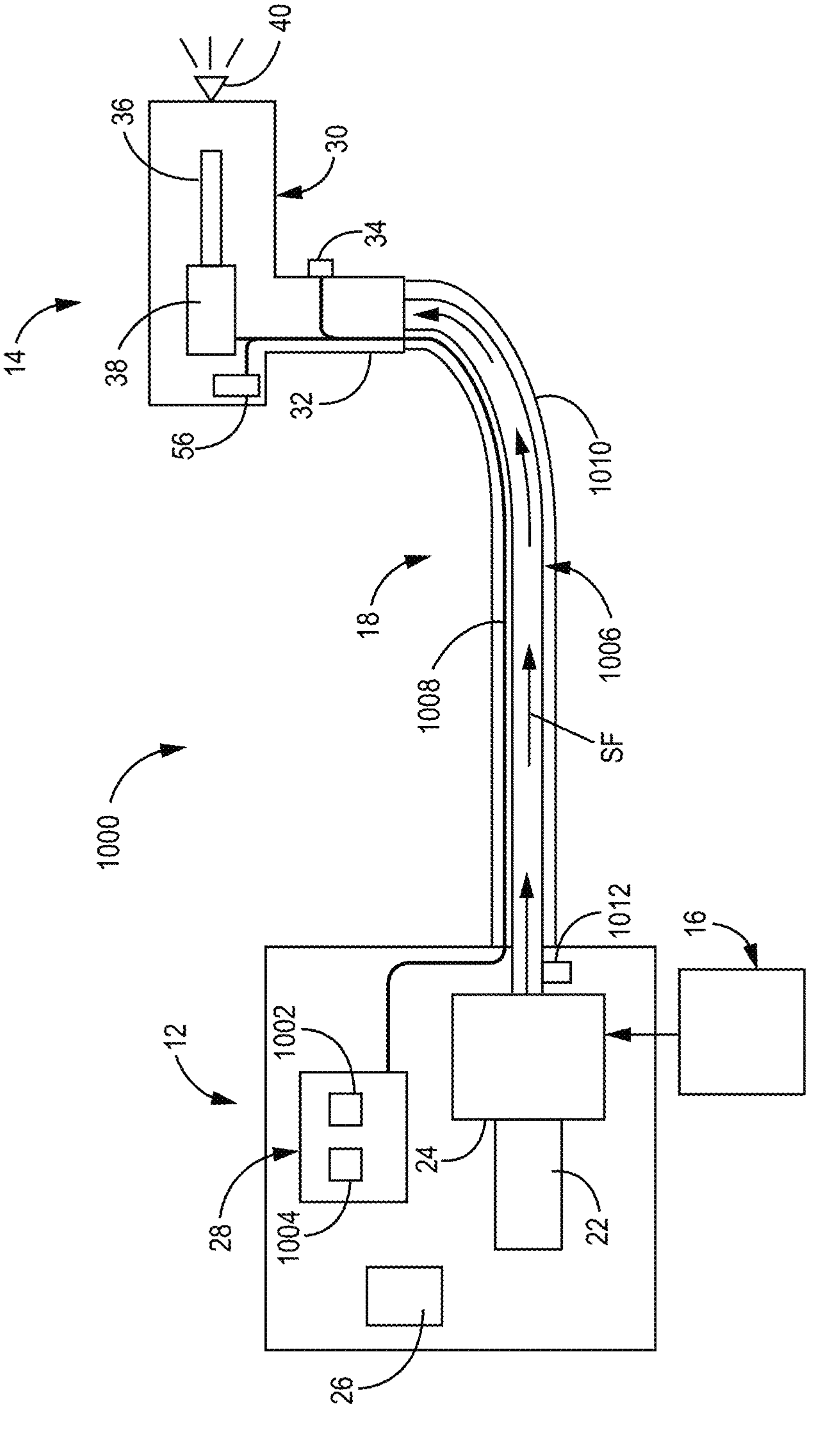
FIG. 16 is a schematic block diagram of a fluid sprayer.

FIG. 16 is a schematic block diagram of fluid sprayer 1000. Fluid sprayer 1000 is substantively similar to the fluid sprayer 10 previously shown and described. Fluid sprayer 1000 includes pump module 12, spray gun 14, reservoir 16, and conduit 18. Pump module 12 includes motor 22, pump 24, power source 26, and controller 28. Controller 28 includes control circuitry 1002 and memory 1004. Spray gun 14 includes gun body 30 having gun handle 32, trigger 34, spray valve 36, solenoid 38, nozzle 40, and spray setting input 56. Conduit 18 includes fluid hose 1006, wires 1008, and sheath 1010. While fluid sprayer 1000 is described with regard to pump module 12, spray gun 14, reservoir 16, and conduit 18, it is understood that fluid sprayer 1000 can include any one or more of the pump modules, spray guns, reservoirs, and conduits disclosed, including any features of such components.

Reservoir 16 is configured to store a supply of spray fluid for spraying by spray gun 14. Reservoir 16 can be supported by pump module 12 or can be formed separate from pump module 12. Pump module 12 is configured to pump the spray fluid from the reservoir 16 to the spray gun 14 under pressure, as shown by flow arrows FA. Spray gun 14 is configured to emit an atomized spray of the spray fluid for application on a target surface.

Conduit 18 extends between pump module 12 and spray gun 14. Sheath 1010 encloses other components of conduit 18. Hose 1006 extends between pump 24 and spray gun 14 to convey the spray fluid from pump 24 to spray gun 14 under pressure. Wires 1008 extend between electrical components of spray gun 14 and controller 28. Wires 1008 are disposed external to hose 1006 and are not exposed to the spray fluid flowing within hose 1006 in the example shown. In the example shown, one more wires 1008 can extend between trigger 34 and controller 28, between solenoid 38 and controller 28, and between spray setting input 56 and controller 28. Sheath 1010 encloses wires 1008 and hose 1006. Wires 1008 are configured to transmit signals (communication and/or power) between pump module 12 and spray gun 14.

Transducer 1012 is shown. It is understood that transducer 1012 may not be present in various examples of fluid sprayer 1000. Transducer 1012 is operatively associated with the spray fluid downstream of pump 24 and upstream of spray gun 14. Transducer 1012 is configured to generate information regarding one or more properties of the spray fluid. In some examples, transducer 1012 can be configured as a pressure sensor that is configured to generate information regarding a pressure of the spray fluid. In some examples, transducer 1012 can be configured as a flow sensor configured to generate information regarding the flow of the spray fluid (e.g., flow rate among other options). It is understood that some examples that include transducer 1012 can include both pressure and flow sensors, among other sensor options. Transducer 1012 is configured to generate parameter information regarding a parameter of the spray fluid at a location downstream of the pump 24 and upstream of the nozzle 40.

Motor 22 is configured to power pumping by pump 24. Motor 22 can be configured to generate a rotational output that causes pumping by the fluid displacer or pump 24. In some examples, the fluid displacer of pump 24 is configured to linearly reciprocate to pump the spray fluid. For example, the pump 24 can be configured as a piston pump, a diaphragm pump, or other manner of reciprocating pump. A drive, such as drive 158, can connect the motor 22 and pump 24 to provide the rotational output from motor 22 to pump 24 to cause the linear reciprocation of the fluid displacer of pump 24. The drive can convert the rotational motion from motor 22 to linear reciprocating motion provided to pump 24 to power pumping by pump 24.

Pump 24 is configured to draw spray fluid from reservoir 16, pressurize the spray fluid to a desired pressure for spraying, and drive the spray fluid downstream through hose 1006 to spray gun 14 for spraying by spray gun 14.

Spray gun 14 is configured to receive the pressurized fluid pumped by pump 24 through hose 1006 and output an atomized spray of the spray fluid. Spray gun 14 is operatively connected to controller 28 for controlling emission of the spray fluid from spray gun 14.

Trigger 34 is operatively connected to controller 28 to provide spray signals to the controller 28. In the example shown, the trigger 34 is connected to the controller 28 by a wired connection, but it is understood that not all examples are so limited. For example, trigger 34 can be wirelessly connected to controller 28 to communicate with the controller 28. Actuation of the trigger 34 generates a spray signal that is transmitted to controller 28 to cause the controller 28 to initiate spraying by fluid sprayer 1000, as discussed in more detail below. The spray signal can be transmitted via wires 1008. Depressing the trigger 34 can cause the controller 28 to direct power to the electric motor 22 and/or the solenoid 38. Upon release of the trigger 34 the controller 28 can reduce power to the electric motor 22 and/or the solenoid 38.

Nozzle 40 is configured to emit the spray fluid as an atomized fluid spray. Nozzle 40 forms the outlet of the spray gun 14 through which the spray fluid is sprayed. Nozzle 40 can be shaped to form the spray pattern emitted by spray gun 14.

Spray valve 36 is disposed within spray gun 14. Spray valve 36 is disposed upstream of nozzle 40. Spray valve 36 is configured to control flow of the spray fluid to nozzle 40 for emission from spray gun 14. Spray valve 36 is actuatable between a closed state, in which spray valve 36 prevents the spray fluid from flowing to nozzle 40, and an open state, in which the spray fluid can flow through spray valve 36 to nozzle 40 for emission from the spray gun 14.

Solenoid 38 is operatively connected to spray valve 36 to control actuation of the spray valve 36 between the closed state and the open state. For example, an armature (e.g., plunger 102) of the solenoid 38 can be connected to a movable component of the spray valve 36 (e.g., needle assembly 104) such that movement of the armature causes movement of valving components of the spray valve 36. Solenoid 38 can be configured as a single-acting solenoid that displaces the spray valve 36 from one state to the other (e.g., from the closed state to the open state) or a double-acting solenoid that displaces the spray valve 36 from the open state to the closed state and from the closed state to the open state. Solenoid 38 can be operatively connected to pump module 12 via wires to receive power and/or communication signals from power source 26.

Power source 26 is configured to provide power to electric powered components of fluid sprayer 1000 (e.g., controller 28, motor 22, and solenoid 38). Power source 26 can be formed as an electric battery (e.g., rechargeable lithium ion based, among other options). Power source 26 can be formed as a power cord configured to plug into an electrical socket. Power source 26 can be of any desired configuration for providing power to electric powered components of fluid sprayer. While fluid sprayer 1000 is shown as including a signal power source 26, it is understood that some examples can include discrete power sources 26 for the pump module 12 and spray gun 14. For example, a first power source 26 (e.g., battery or power cord) can be configured to provide electric power to components of pump module 12 and a second power source 26 (e.g., battery or power cord) can be configured to provide electric power to components of spray gun 14.

Controller 28 is operatively connected to other components of fluid sprayer 1000 to control operation of the other components of fluid sprayer 1000. Controller 28 is operatively connected to motor 22, electrically and/or communicatively, to control operation of motor 22. Controller 28 can be operatively connected to trigger 34, electrically and/or communicatively, such as via wires 1008, to receive control signals from trigger 34. For example, trigger 34 can be configured to provide spray signals to controller 28 to cause controller 28 to activate motor 22 to cause pumping by pump 24. Controller 28 can be operatively connected to solenoid 38, electrically and/or communicatively, such as via wires 1008, to control activation of solenoid 38 and thereby control actuation of spray valve 36. Controller 28 can be operatively connected to spray setting input 56, electrically and/or communicatively, such as via wires 1008, to receive spray setting information regarding a desired property of the spray fluid for spraying.

Controller 28 is configured to store software, implement functionality, and/or process instructions. Controller 28 is configured to perform any of the functions discussed herein, including receiving an output from any sensor referenced herein, detecting any condition or event referenced herein, and controlling operation of any components referenced herein. Controller 28 can be of any suitable configuration for controlling operation of components of fluid sprayer 1000 (e.g., motor 22 and/or solenoid 38), receiving signals from components of fluid sprayer 1000 (e.g., trigger 34 and/or spray setting input 56 and/or transducer 1012), gathering data, processing data, etc. Controller 28 can include hardware, firmware, and/or stored software, and controller 28 can be entirely or partially mounted on one or more boards. Controller 28 can be of any type suitable for operating in accordance with the techniques described herein.

Control circuitry 1002, in one example, is configured to implement functionality and/or process instructions. For example, control circuitry 1002 can be capable of processing instructions stored in memory 1004. Examples of control circuitry 1002 can include one or more of a processor, a microprocessor, a controller, a digital signal processor (DSP), an application specific integrated circuit (ASIC), a field-programmable gate array (FPGA), or other equivalent discrete or integrated logic circuitry. Control circuitry 1002 can be entirely or partially mounted on one or more circuit boards.

Memory 1004 can be configured to store information before, during, and/or after operation. Memory 1004, in some examples, is described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, memory 1004 is a temporary memory, meaning that a primary purpose of memory 1004 is not long-term storage. Memory 1004, in some examples, is described as volatile memory, meaning that memory 1004 does not maintain stored contents when power to controller 28 is turned off. Examples of volatile memories can include random access memories (RAM), dynamic random access memories (DRAM), static random access memories (SRAM), and other forms of volatile memories. In some examples, memory 1004 is used to store program instructions for execution by control circuitry 1002. Memory 1004, in one example, is used by software or applications to temporarily store information during program execution.

Memory 1004, in some examples, also includes one or more computer-readable storage media. Memory 1004 can be configured to store larger amounts of information than volatile memory. Memory 1004 can further be configured for long-term storage of information. In some examples, memory 1004 includes non-volatile storage elements. Examples of such non-volatile storage elements can include magnetic hard discs, optical discs, flash memories, or forms of electrically programmable memories (EPROM) or electrically erasable and programmable (EEPROM) memories.

Controller 28 is operatively connected to motor 22 to control pumping by pump 24 and controller 28 is operatively connected to solenoid 38 to control actuation of spray valve 36 between the open and closed states.

The user depresses trigger 34 to initiate spraying by fluid sprayer 1000. Actuation of the trigger 34 sends the spray signal along wire 1008 to controller 28, although the spray signal may be communicated wirelessly in some examples. The controller 28 sends a signal back up the wire 1008 (the wire 1008 being understood to contain multiple, independent, and isolated electrical connections to conduct multiple, independent signals simultaneously), or wirelessly, to activate the solenoid 38 to actuate the spray valve 36 to an open state (e.g., by pulling a needle assembly 104 rearward to overcome the spring 86) to release fluid that is within the a wet chamber of the spray gun 14 from the nozzle 40 as an atomized spray. Spraying continues for as long as the trigger 34 continues to be actuated. When the user releases the trigger 34, a signal is sent (or the previous signal is discontinued) to the controller 28 which causes the solenoid 38 to be placed in the non-spray state, allowing the spray valve 36 to return to the closed state (e.g., by the spring 86 returning the needle assembly 104 to a forward position) to cease spraying from the nozzle 40. The cycle is repeated each time the trigger 34 is pulled and released.

Based on the reception by the controller 28 of the spray signal indicating actuation of the trigger 34, in addition to causing the solenoid 38 to open the spray valve 36, the controller 28 also powers the electric motor 22 to operate the pump 24 to increase fluid pressure within the hose 1006 and in the wet chamber 126 of the spray gun 14 and drive the spray fluid to spray gun 14 under pressure. Based on the controller 28 recognizing discontinuation of the signal, or the controller 28 receiving a different signal indicating release of the trigger 34, the controller 28 reduces power to the electric motor 22 to stop the pump 24 from operating. The cycle is repeated each time the trigger 34 is pulled and released.

Controller 28 can be configured to control sequencing of activation of the motor 22 and activation of the solenoid 38. Sequencing activation of motor 22 and activation of solenoid 38 can reduce pressure drop when spray valve 36 is initially actuated to the open state, thereby providing higher quality spray at the initiation of spraying and providing for more efficient spraying by fluid sprayer 1000.

The user depressing the trigger 34 causes trigger 34 to generate the spray signal that is communicated to the controller 28. In some examples, the controller 28 causes activation of the motor 22 prior to activating solenoid 38 to displace spray valve 36 to the open state. For example, the controller 28 can generate and send a drive signal, which can be power from power source 26, to the motor 22 based on reception of the spray signal from the trigger 34. The drive signal causes a rotor of the motor 22 to begin spinning, generating the rotational output and causing pumping by pump 24. In some examples, the controller 28 can implement a delay between receiving the spray signal from trigger 34 and activating motor 22. Implementing such a delay can ensure that the trigger 34 actuation was purposeful and for spraying, rather than an inadvertent triggering.

The controller 28 can implement a delay between powering the motor 22 and providing the activation signal to the solenoid 38. As such, the solenoid 38 can remain in the closed state while the motor 22 begins rotating and the pump 24 begins pumping the spray fluid. The controller 28 can thereby activate the electric motor 22 to start rotating before activating the solenoid 38 to open the spray valve 36. The controller 28 can thus start the electric motor 22 to spin before the solenoid 38 opens the spray valve 36 to ramp up pressure within the wet chamber 126 before the spray valve 36 is opened to ensure sufficient pressure for spraying.

The pump 24 increases the fluid pressure within the fluid circuit between pump 24 and spray valve 36. With the motor 22 already powered, the controller 28 provides the actuation signal to the solenoid 38 to cause the solenoid 38 to actuate the spray valve 36 to the open state. The solenoid 38 actuates the spray valve 36 to the open position with the pump 24 being powered by motor 22 and the pressurized spray fluid is emitted through nozzle 40. Sequencing activation of the motor 22 and the solenoid 38 provides high quality spraying while reducing any "deadband." Deadband is the period after actuation of a spray control valve to an open state and prior to a spray system sensing that the spray valve is open. Such a situation creates a pressure drop prior to the pump activating and again increasing the pressure to a desired level for spraying. The deadband can be detrimental to spray quality.

It is understood that, in some examples, the controller 28 activates the solenoid 38 to open the spray valve 36 prior to electric motor 22 being started (or before the electric motor 22 reaches full speed intended for the present spray output level). Such a configuration can prevent overpressurizing the fluid circuit between pump 24 and spray gun 14.

In some examples, the controller 28 can simultaneously provide the activation signal to the solenoid 38 and power the motor 22 to activate the motor 22. The controller 28 can activate the electric motor 22 to start rotating simultaneous with activating the solenoid 38 to open the spray valve 36. In some examples, the controller 28 opens the spray valve 36 by activating the solenoid 38 simultaneous with the electric motor 22 being started to rotate.

In some examples, controller 28 can activate solenoid 38 to open spray valve 36 based on a determined speed (e.g., measured or calculated rotational speed) of the electric motor 22. For example, controller 28 can activate solenoid 28 as the electric motor 22 reaches full speed intended for the present spray output level.

Upon release of the trigger 34, the controller 28 can sequence depowering of motor 22 and solenoid 38. For example, controller 28 can, in some examples, decrease or stop power to the motor 22 prior to deactivating the solenoid 38. As such, power can be removed from motor 22 prior to spray valve 36 actuating to the closed state to avoid operating the pump 24 while the fluid circuit is closed which may otherwise risk over pressurizing the system. In some examples, controller 28 can deactivate the solenoid 38 prior to decreasing or stopping power to the motor 22. In such an example, the motor 22 can continue to drive pump 24 when spray valve 36 actuates to the closed state and the motor 22 can then be deactivated after spray valve 36 closure. The controller 28 can cause the solenoid 38 to close the spray valve 36 before the pump 24 stops pumping. Such a configuration can facilitate building pressure in the fluid circuit to prime the system with pressure for subsequent spraying by spray gun 14, decreasing or eliminating deadband. For example, the controller 28 can close the spray valve 36 via depowering the solenoid 38 before depowering the electric motor 22 to ensure sufficient pressure for spraying until closure of the spray valve 36.

In some examples, the controller 28 is configured to depower the motor 22 and deactivate the solenoid 38 simultaneously. Such a configuration can allow the pump 24 to continue pumping even after closure of the spray valve 36 in examples in which the rotor of motor 22 continues to rotate after depowering of motor 22. The controller 28 can cause the solenoid 38 to close the spray valve 36 before the pump 24 stops pumping.

In some examples, the controller 28 begins depowering the electric motor 22 (i.e. decreasing and/or ceasing power) before closing the valve 36 via depowering the solenoid 38. In some examples, the controller 28 starts to depower the electric motor 22 simultaneous with closing the valve 36 via depowering the solenoid 38. The controller 28 can causing the solenoid 38 to close the spray valve 36 simultaneous with the pump 24 stopping pumping.

In some examples, motor 22 is configured to coast when power is removed from the motor 22. In such an example, the rotor of the motor 22 will continue to rotate for a time period after depowering the motor 22. The rotor continuing to rotate means that the motor 22 will continue to generate the rotational output that powers pump 24 and pump 24 will continue to pump the spray fluid even after depowering of the motor 22. In such an example, the controller 28 can be configured to depower the solenoid 38, thus causing closure of the spray valve 36, while the rotor of the motor 22 continues to rotate. Such deactivation of the solenoid 38 can occur prior to, simultaneous with, or after the motor 22 is depowered. Having the spray valve 36 close while the rotor of the motor 22 continues to rotate, even if such rotation is not powered rotation, allows pump 24 to build pressure in the fluid circuit for subsequent spray operations.

In some examples, based on detection of release of the trigger 34, the controller 28 depowers the solenoid 38 and the electric motor 22 simultaneously. In some examples, while the solenoid 38 may immediately release its holding power upon being depowered, the hydraulic pressure within the wet chamber 126 may resist the spring 86 to prevent closure of the spray valve 36 until the pressure drops below a threshold amount. The threshold amount may be greater than 250 psi and less than 2000 psi, among other pressure threshold options. In one example, upon the controller 28 receiving a spray signal from the trigger 34 indicating actuation of the trigger 34, the controller 28 continues to monitor the spray signal from the trigger 34 for a first window of time, such as less than 50 milliseconds (e.g., between 5-30 milliseconds) to ensure sustained actuation of the trigger 34. The spray signal forms a first signal from the spray gun 14 to the pump module 12 based on the trigger 34 being depressed by a finger of a user. If the spray signal fails to confirm continuous actuation of the trigger 34 during the first window of time, then no action is taken and the controller 28 continues to monitor for the future instance of sustained actuation. If the signal confirms continuous actuation of the trigger 34 throughout the first window of time, then the controller 28 delivers operational power to the electric motor 22 to accelerate, reach, and sustain operational pumping by the pump 24 over a second window of time.

The second window of time starts after the first window of time closes, such as immediately after, and in some cases may begin concurrent with closure of the first window.

During the second window of time, operational power sufficient to actuate the solenoid 38 is not delivered to the solenoid 38 by the controller 28. The electric motor 22 may reach full speed for the present spray setting from the spray setting input 56 during the second window of time, or may be at least 50% of the way to full speed by the closure of the second window of time, or may be at least 75% of the way to full speed by the closure of the second time. The second time window may be open for between 20-80 milliseconds, amongst other options. After (or upon) closure of the second time window, a third time window is opened (e.g., concurrent with the closure of the second time window or immediately afterwards, amongst other options).

During the third time window, the controller 28 continues to send operational power to drive the electric motor 22 while also starting delivery of operational power to the solenoid 38 to cause the armature of the solenoid 38 to move to open the spray valve 36. During the third window of time, the controller 28 delivers a first level of power signal to the solenoid 38 which may be voltage or current controlled. The first power level signal to the solenoid 38 is sufficient to actuate the solenoid 38 from a first position to a second position. On or after the closure of the third time window, a fourth time window is opened.

Within the fourth time window, the controller 28 continues to deliver operational power to the electric motor 22 but reduces the power delivered to the solenoid 38 to a second level of power. The second level of power corresponds with a hold power sufficient to hold the solenoid 38 in a position that the spring 86 continues to be overcome and the valve 36 remains open. The fourth window of time can continue until the controller 28 senses release of the trigger 34.

The trigger 34 can one or both of send a second signal from the spray gun 14 to the pump module 12 and cease sending the first signal to the pump module 12 based on the trigger 34 being released by the user. The controller 28 based on one or both of receiving the second signal and no longer receiving the first signal from the trigger 34, decreases power delivery to the solenoid 38 to cause the spray valve 36 to close and decreases power delivery to the motor 22 to stop the pump 24 from pumping.

In some examples, controller 28 can actively control the sequencing of the motor 22 and solenoid 38 based on parameters of the system, such as parameters sensed by transducer 1012 or set by spray setting input 56. In some examples, controller 28 can alter the delay period between the motor 22 being powered and the solenoid 38 being powered based on the sensed parameters of the system. In some examples, controller 28 can alter the sequence of the motor 22 being powered and the solenoid 38 being powered (e.g., having motor 22 be powered prior to solenoid 38 being powered based on certain operating conditions and having the motor 22 be powered after the solenoid 38 is powered based on other operating conditions). For example, controller 28 can actively control any delay between powering the motor 22 and powering the solenoid 38 based on data provided by transducer 1012, such as the flow rate of the spray fluid and/or the pressure of the spray fluid. In some examples, controller 28 can actively control the delay based on pressure of the spray fluid.

In some examples, the controller 28 can control the delay based on pressure data generated by transducer 1012. For example, the controller 28 can be configured to implement a greater delay between activating the motor 22 and activating the solenoid 38 based on the sensed pressure being less and can implement a shorter delay between activating the motor 22 and activating the solenoid 38 based on the sensed pressure being greater.

In some examples, the controller 28 can control the delay based on the spray setting information provided by the spray setting input 56. For example, controller 28 can implement a greater delay between activating the motor 22 and activating the solenoid 38 based on the spray setting input indicating a lower desired pressure and can implement a shorter delay between activating the motor 22 and activating the solenoid 38 based on the spray setting input indicating a greater desired pressure. As such, the controller 28 can be configured to adjust the delay period based on a user input.

In some examples, a variety of potential delay periods can be stored in memory 1004 and controller 28 can select the desired delay period based on various parameters of the fluid sprayer 1000. For example, the user can input information regarding the fluid sprayer 1000 at set up, such as the size of the orifice of nozzle 40, the length of hose 1006, the type of fluid being sprayed (e.g., paint, lacquer, etc.), etc. The controller 28 can then recall a delay period from memory 1004 based on the user-provided information and control activation of motor 22 and activation of solenoid 38 based on the recalled delay period from memory 1004.

Controller 28 can be configured to control the power provided to solenoid 38 during operation depending on the operating state of the solenoid 38. For example, controller 28 can be configured to provide a first power level to solenoid 38 when solenoid 38 is initially powered to actuate spray valve 36 from the closed state and controller 28 can be configured to provide a different, second power level to solenoid 38 when solenoid 38 is holding the spray valve 36 in the open state.

In one example, controller 28 is configured to control operation of solenoid 38 based on a voltage level of the power provided to solenoid. For example, controller 28 can be configured to maintain a constant voltage level (e.g., a set current or current within a desired range) for the power provided to solenoid 38. The constant voltage level can vary depending on the operating state of solenoid 38, such as whether solenoid 38 is picking spray valve 36 from the closed state or maintaining spray valve 36 in the open state. Controller 28 can be configured to provide a first voltage level (e.g., a first voltage or a voltage within a first range) to solenoid 38 upon activation of solenoid 38, when the solenoid 38 initially picks the spray valve 36 from the closed state. Controller 28 can be further configured to provide a second voltage level (e.g., a second voltage or a voltage within a second voltage range) to solenoid 38 when solenoid 38 is holding the spray valve 36 in the open state.

As previously discussed, solenoid 38 can be configured such that the electromagnetic forces acting on the armature are at a relatively weakest level with spray valve 36 in the closed state and the electromagnetic forces acting on the armature are at a relatively strongest level with spray valve 36 being held in the open state. In such a configuration, controller 28 can be configured to provide a relatively higher voltage level to solenoid 38 on the initial activation of solenoid 38 to pick spray valve 36 from the closed state. The controller 28 can then provide a relatively lower voltage level to solenoid 38 when solenoid 38 is holding the spray valve in the open state. The controller 28 dynamically varying the voltage based on the operating state of solenoid 38 saves power and reduces heat generated by solenoid 38 during operation.

In some examples, controller 28 is configured to control operation of solenoid 38 based on a current level provided to solenoid 38. For example, controller 28 can be configured to maintain a constant current level (e.g., a set current or current within a desired range) for the power provided to solenoid 38. The constant current level can vary depending on the operating state of solenoid 38, such as whether solenoid 38 is picking spray valve 36 from the closed state or maintaining spray valve 36 in the open state. Current is directly proportional to voltage and inversely proportional to resistance. As heat rises, such as due to electrical flow through the coil of the stator 100 of the solenoid 38, the resistance will increase. Controller 28 can adjust the voltage provided to solenoid 38 to maintain the current at a desired current level throughout operation, accounting for the varying resistance in the coil and compensating for decreased solenoid strength due to the heat rise. Controlling operation of solenoid 38 based on current to solenoid 38 allows for continued, efficient operation of solenoid 38 even as the heat rises due to operation of solenoid 38. The controller 28 can vary the voltage provided to solenoid 38 to maintain the current at the desired current level.

In some examples, controller 28 can be configured to provide a first current level throughout operation, both when solenoid 38 initially picks spray valve 36 from the closed state and when solenoid 38 is holding the spray valve 36 in the open state.

In some examples, the controller 28 can be configured to provide a first current level (e.g., a set current or a current within a first current range) to solenoid 38 upon activation of solenoid 38, when the solenoid 38 initially picks the spray valve 36 from the closed state. Controller 28 can be further configured to provide a second current level (e.g., a set current or a current within a second current range) to solenoid 38 when solenoid 38 is holding the spray valve 36 in the open state.

As previously discussed, solenoid 38 can be configured such that the electromagnetic forces acting on the armature are at a relatively weakest level with spray valve 36 in the closed state and the electromagnetic forces acting on the armature are at a relatively strongest level with spray valve 36 being held in the open state. In such a configuration, controller 28 can be configured to provide a relatively higher current to solenoid 38 on the initial activation of solenoid 38 to pick spray valve 36 from the closed state. The controller 28 can then provide a relatively lower current to solenoid 38 when solenoid 38 is holding the spray valve in the open state. The controller 28 dynamically varying the current based on the operating state of solenoid 38 saves power and reduces heat generated by solenoid 38 during operation.

In some examples, controller 28 can be configured to dynamically adjust the power level (e.g., current or voltage) provided to solenoid 38 based on operating parameters of the fluid sprayer 1000. As discussed above, controller 28 can be configured to provide a first power level to solenoid 38 at initiation, when spray valve 36 is initially picked from the closed state, and can provide a second power level to solenoid 38 during hold. Controller 28 can be configured to adjust various parameters of those power levels during operation, as discussed in more detail below.

For example, controller 28 can reduce the time period during which the first power level is provided to solenoid 38 based on parameters of the fluid sprayer 1000 (e.g., based on sensed fluid parameters from transducer 1012 such as fluid pressure, based on set fluid parameters such as desired spray pressure from spray setting input 56, based on physical characteristics of the fluid sprayer 1000 such as length of hose 1006 or the size of the orifice of nozzle 40, etc.). In one example, controller 28 can be configured to vary the time period of the first power level based on fluid pressure, such as having a shorter time period for lower pressure operations and longer time periods for higher pressure operations.

Additionally or alternatively, controller 28 can be configured to dynamically adjust the first power level itself (e.g., increase or reduce the current level or voltage level) based on parameters of the fluid sprayer 1000. For example, less power may be required to pick spray valve 36 from the closed state when spraying at lower pressures as compared to spraying at higher pressures. The controller 28 can be configured to adjust the power level based on fluid pressure (sensed (e.g., based on information from transducer 1012) or desired (e.g., based on information from spray setting input 56)) such that controller 28 will provide relatively less power to cause solenoid 38 to shift the spray valve 36 to the open state at lower fluid pressure levels as the solenoid 38 has to overcome less hydraulic resistance and provide greater power to cause the solenoid 38 to shift the spray valve 36 to the open state at higher pressure levels as the solenoid 38 has to overcome greater hydraulic resistance.

In some examples, the controller 28 can be configured to adjust both the duration and the level of the power provided to solenoid 38 to cause the spray valve 36 to shift from the closed state. For example, the controller 28 can provide less power for a shorter duration based on lower fluid pressure to cause solenoid 38 to actuate spray valve 36 to the open state and can similarly be configured to provide greater power for a longer duration based on higher fluid pressure to cause solenoid 38 to actuate spray valve 36 to the open state.

In some examples, the controller 28 can be configured to adjust the power provided to solenoid 38 to determine the required power level for solenoid 38 to shift the spray valve 36 to the open state. For example, the controller 28 can initially provide a relatively low level of power (e.g., controlled based on current or voltage) to solenoid 38 and then ramp the power level until the solenoid 38 actuates the spray valve 36 to the open state. The controller 28 can then save that power level that actually cause the spray valve 36 to shift to the open state in the memory 1004 and utilize that power level for subsequent actuations of the spray valve 36 to the open state. Additionally or alternatively, the controller 28 can monitor the time period over which power is provided to solenoid 38 to actually cause the spray valve 36 to shift to the open state. The controller can then adjust one or both of the power level provided to solenoid 38 and the time period over which that power is provided to adjust the pick power provided for solenoid 38 to generate adequate pick force to shift the spray valve 36 to the open state for subsequent actuations of spray valve 36.

Controller 28 can be configured to dynamically control the power provided to solenoid 38. For example, controller 28 can be configured such that a first power level is provided to solenoid 38 to initiate movement of spray valve 36 and a second power level is provided to solenoid 38 by the time the moving component of spray valve 36 reaches a position associated with the fully open state of spray valve 36.

Controller 28 can be configured to dynamically alter the power level provided to solenoid 38 based on a variable of fluid sprayer 1000. The variable can be based on a user input, based on a sensed parameter, etc. The variable can be based on a fluid parameter, an electrical parameter, a temporal parameter, etc. A fluid parameter can be a fluid pressure, a fluid flow rate, etc. An electrical parameter can be a current draw, etc. A temporal parameter can be a pick time, which is the time period between applying power to solenoid 38 to actuate spray valve 36 and spray valve 36 being in the fully open state, among other temporal parameters.

In some examples, controller 28 can be configured to adjust the power level based on an input from spray setting input 56. For example, the user can provide a desired fluid pressure to the controller 28, such as through spray setting input 56. Controller 28 can adjust the power level based on the input from the user, such as by providing a relatively higher power level based on relatively higher desired pressure and a relatively lower power level based on relatively lower desired pressure.

The variable can be based on a sensed parameter of fluid sprayer 1000. For example, the controller 28 can adjust the power level based on a sensed pressure, a sensed current draw, etc.

In some examples, controller 28 can be configured to control operation of solenoid 38 based on a desired pick time. During operation, controller 28 can determine the actual pick time based on an operating parameter of fluid sprayer 1000. The operating parameter can be a fluid parameter or an electrical parameter, among other options. The fluid parameter can be based on pressure or flow rate. The electrical parameter can be measured current draw, which can be indicative of the state of the moving component of spray valve 36.

In some examples, controller 28 is configured to power the electric motor 22 to start powering the electric motor 22 to operate the pump 24 based on the first to occur of either receipt of a first signal from the spray gun 14 indicating actuation of the trigger 34 or a second signal from the transducer 1012 indicating a first change in the sensed parameter (e.g., pressure, among other options) of the fluid downstream of the pump 24. The controller 28 can be configured to decrease power to the electric motor 22 to cease operating the pump 24 based on both of a second change in the second signal and there being no indication from the first signal that the trigger 34 is actuated. The controller 28 can be configured to decrease power to the electric motor 22 to cease operating the pump 24 based on the first to occur, when the electric motor 22 is powered to operate the pump 24, of either of a second change in the second signal or there being no indication from the first signal that the trigger 34 is actuated. The first change in the signal from the transducer 1012 can be the parameter decreasing below a threshold, such as pressure decreasing below a threshold. The second change in the signal from the transducer 1012 can be the parameter increasing above a threshold, such as pressure increasing above a threshold. The threshold for the first change and the threshold for the second change can be the same or different parameter levels.

In some examples, the controller 28 can be configured to dynamically adjust the sequencing of directing power to the electric motor 22 and directing power to the solenoid 38 such that for a first spray event the electric motor 22 is powered prior to the solenoid 38 being powered and for a second spray event the solenoid 38 is powered prior to the electric motor 22 being powered. In some examples, the controller 28 is configured to dynamically adjust the sequencing of directing power to the electric motor 22 and directing power to the solenoid 38 based on a parameter of the spray fluid, such as sensed by transducer 1012 or set by spray setting input 56. In some examples, the controller 28 is configured to alter a delay period between the controller 28 directing power to the electric motor 22 and the controller directing power to the solenoid 38. The controller 28 can be configured to alter the delay period based on a spray setting signal from a spray setting input 56 configured to be set by the user. In some examples, the controller 28 is configured to sequence powering of the electric motor 22 and powering of the solenoid 38 such that the delay period is zero.

Figure 17:
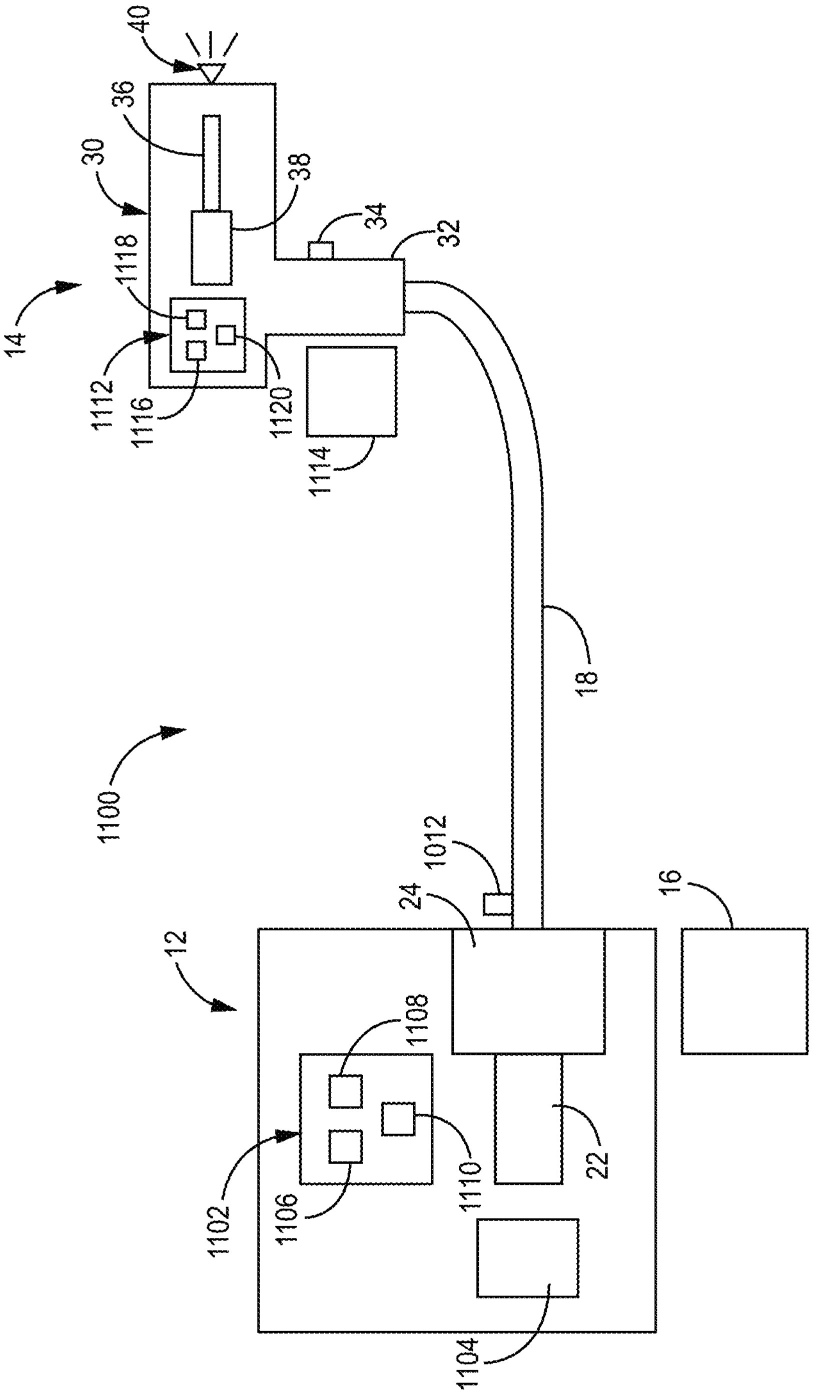
FIG. 17 is a schematic block diagram of a fluid sprayer.

FIG. 17 is a schematic block diagram of fluid sprayer 1100. Fluid sprayer 1100 is substantially similar to fluid sprayer 10 and fluid sprayer 1000 previously shown and discussed, except that spray gun 14 includes a gun controller 1112 and gun power source 1114. Fluid sprayer 1100 includes pump module 12, spray gun 14, reservoir 16, conduit 18, and transducer 1012. Pump module 12 includes motor 22, pump 24, module power source 1104, and module controller 1102. Module controller 1102 includes module control circuitry 1106, module memory 1108, and module communications circuitry 1110. Spray gun 14 includes gun body 30 having gun handle 32, trigger 34, spray valve 36, solenoid 38, nozzle 40, gun controller 1112, and gun power source 1114. Gun controller 1112 includes gun control circuitry 1116, gun memory 1118, and gun communications circuitry 1120. While fluid sprayer 1100 is described with regard to pump module 12, spray gun 14, reservoir 16, and conduit 18, it is understood that fluid sprayer 1100 can include any one or more of the pump modules, spray guns, reservoirs, and conduits disclosed, including any features of such components.

Reservoir 16 is configured to store a supply of spray fluid. Reservoir 16 can be a component of pump module 12, such as supported by a housing of pump module 12, or can be formed separate from pump module 12.

Pump module 12 is configured to draw spray fluid from reservoir 16 and pump the spray fluid through conduit 18 to spray gun 14. Spray gun 14 is configured to generate an atomized fluid spray. Specifically, motor 22 of pump module 12 is configured to power pumping by pump 24. Motor 22 can be an electric motor 22. Pump 24 can be of any desired configuration for pressurizing the spray fluid and driving the spray fluid to spray gun 14 under pressure for spraying, such as a reciprocating piston pump or reciprocating diaphragm pump, among other options.

Module power source 1104 is configured to provide electrical power to electrical components of pump module 12. For example, module power source 1104 can provide electrical power to motor 22 and module controller 1102, among other components. Module power source 1104 can be formed as an electric battery (e.g., rechargeable lithium ion based, among other options). The electric battery can be removable. The electric battery can be replaceable. Module power source 1104 can be formed as a power cord configured to plug into an electrical socket. Module power source 1104 can be of any desired configuration for providing power to electric powered components of pump module 12. In some examples, module power source 1104 is not electrically connected to spray gun 14 and does not provide electric power to spray gun 14.

Transducer 1012 is operatively associated with the spray fluid downstream of pump 24 and upstream of spray gun 14. Transducer 1012 is configured to generate information regarding one or more properties of the spray fluid. In some examples, transducer 1012 can be configured as a pressure sensor that is configured to generate pressure information regarding a pressure of the spray fluid. In some examples, transducer 1012 can be configured as a flow sensor configured to generate flow information regarding the flow (e.g., flow rate among other options) of the spray fluid. It is understood that some examples that include transducer 1012 can include both pressure and flow sensors, among other sensor options.

Module controller 1102 is operatively connected to other components of pump module 12 to control operation of the other components of pump module 12. Module controller 1102 is operatively connected to motor 22, electrically and/or communicatively, to control operation of motor 22. Module controller 1102 can be operatively connected to transducer 1012, electrically and/or communicatively, to receive parameter signals from transducer 1012. For example, transducer 1012 can be configured to provide pressure data, flow data, etc. to module controller 1102. The module controller 1102 can be configured to direct power to the electric motor 22 based on the parameter information generated by the transducer 1012.

Module controller 1102 is configured to store software, implement functionality, and/or process instructions. Module controller 1102 is configured to perform any of the functions discussed herein, including receiving an output from any sensor referenced herein, detecting any condition or event referenced herein, and controlling operation of any components referenced herein. Module controller 1102 can be of any suitable configuration for controlling operation of components of pump module 12, receiving signals from components of pump module 12, gathering data, processing data, etc. Module controller 1102 can include hardware, firmware, and/or stored software, and module controller 1102 can be entirely or partially mounted on one or more boards. Module controller 1102 can be of any type suitable for operating in accordance with the techniques described herein. While module controller 1102 is illustrated as a single unit, it is understood that module controller 1102 can be formed as multiple discrete controllers. In some examples, module controller 1102 can be implemented as a plurality of discrete circuitry subassemblies. Module controller 1102 can be configured similarly or the same as controller 28.

Spray gun 14 is fluidly connected to pump module 12 via conduit 18 to receive the pressurized spray fluid output by pump module 12. Spray gun 14 is configured to generate the atomized fluid spray. Nozzle 40 is formed as an orifice of spray gun 14 that is configured to emit the spray fluid. Nozzle 40 can be shaped to form the spray pattern emitted by spray gun 14. For example, nozzle 40 can be configured to generate a spray fan. A fluid flow path is formed through spray gun 14 between the conduit 18 that inputs spray fluid to the spray gun 14 and nozzle 40 that outputs spray fluid from the spray gun 14.

Trigger 34 is configured to be manipulated by the user to cause emission of spray fluid by spray gun 14. In the example shown, trigger 34 is located next to or is part of the gun handle 32. Actuation of trigger 34 causes the spray gun 14 to emit the fluid through nozzle 40. More specifically, actuation of trigger 34 causes solenoid 38 to actuate the spray valve 36 to an open state. In the example shown, trigger 34 is a button which can be depressed, but it is understood that the trigger 34 can take different forms. For example, trigger 34 can be formed as a lever arm that is pulled by fingers of the user. Trigger 34 is mounted on the spray gun 14. Trigger 34 is communicatively connected to gun controller 1112 to provide signals to the gun controller 1112.

Spray valve 36 is disposed within spray gun 14. Spray valve 36 is disposed upstream of nozzle 40. Spray valve 36 is configured to control flow of the spray fluid to nozzle 40 for emission from spray gun 14. Spray valve 36 is actuatable between a closed state, in which spray valve 36 prevents the spray fluid from flowing to nozzle 40, and an open state, in which the spray fluid can flow through spray valve 36 to nozzle 40 for emission from the spray gun 14. Spray valve 36 can be of any desired configuration for controlling flow of the spray fluid through nozzle 40, such as a needle valve, among other options.

Solenoid 38 is operatively connected to spray valve 36 to control actuation of the spray valve 36 between the closed state and the open state. For example, an armature of the solenoid 38 can be connected to the spray valve 36 such that movement of the armature causes movement of valving components of the spray valve 36 (e.g., the armature displacing a needle assembly 104). In some examples, solenoid 38 is a single-acting solenoid connected to spray valve 36 to actuate spray valve 36 from the closed state to the open state. A spring can be configured to return the spray valve 36 to the closed state. In some examples, solenoid 38 is a double-acting solenoid configured to actuate the spray valve 36 from the closed state to the open state and from the open state to the closed state.

Gun power source 1114 is configured to provide power to electric powered components of spray gun 14 (e.g., gun controller 1112 and solenoid 38). Gun power source 1114 can be formed as an electric battery (e.g., rechargeable lithium ion based, among other options). The electric battery can be removable. The battery can be supported by the spray gun 14 or be separate from the spray gun 14 and supported by the user, supported by the conduit 18, etc. For example, gun power source 1114 can be mounted to the spray gun 14, worn by the user, or connected to conduit 18 to be supported by conduit 18, among other options. In some examples, gun power source 1114 can be formed as a power cord configured to plug into an electrical socket. Gun power source 1114 can be of any desired configuration for providing power to electric powered components of spray gun 14. In some examples, gun power source 1114 is not electrically connected to pump module 12 and does not provide electric power to pump module 12.

It is understood that spray gun 14 can be connected to pump module 12 by a wired connection that provides communications but not power signals to the spray gun 14. Spray gun 14 can be wired to power module 12 but is not powered by power module 12.

Gun controller 1112 is operatively connected to other components of spray gun 14 to control operation of the other components of spray gun 14. Gun controller 1112 is operatively connected to solenoid 38, electrically and/or communicatively, to control operation of solenoid 38. Gun controller 1112 can be operatively connected to trigger 34, electrically and/or communicatively, to receive spray signals from trigger 34.

Gun controller 1112 is configured to store software, implement functionality, and/or process instructions. Gun controller 1112 is configured to perform any of the functions discussed herein, including receiving an output from any sensor referenced herein, detecting any condition or event referenced herein, and controlling operation of any components referenced herein. Gun controller 1112 can be of any suitable configuration for controlling operation of components of spray gun 14, receiving signals from components of spray gun 14, gathering data, processing data, etc. Gun controller 1112 can include hardware, firmware, and/or stored software, and gun controller 1112 can be entirely or partially mounted on one or more boards. Gun controller 1112 can be of any type suitable for operating in accordance with the techniques described herein. While gun controller 1112 is illustrated as a single unit, it is understood that gun controller 1112 can be formed as multiple discrete controllers. In some examples, gun controller 1112 can be implemented as a plurality of discrete circuitry subassemblies. Gun controller 1112 can be configured similarly or the same as controller 28.

Pump module 12 and spray gun 14 can be directly or indirectly communicatively connected. Module communications circuitry 1110 of pump module 12 and gun communications circuitry 1120 of spray gun 14 can be configured to facilitate wired or wireless communications. For example, the module communications circuitry 1110 can facilitate radio frequency communications and/or can facilitate communications over a network, such as a local area network, wide area network, cellular network, and/or the Internet. The gun communications circuitry 1120 can facilitate radio frequency communications and/or can facilitate communications over a network, such as a local area network, wide area network, cellular network, and/or the Internet. While pump module 12 and spray gun 14 are described as communicatively connected, it is understood that not all examples are so limited. For example, components of spray gun 14 can be controlled independent of components of pump module 12 and components of pump module 12 can be controlled independent of components of spray gun 14 absent communications or power signals being transmitted therebetween.

In some examples, module controller 1102 and gun controller 1112 can be configured to wirelessly communicate by radiofrequency communications. For example, module controller 1102 and gun controller 1112 can communicate utilizing short-wavelength ultra-high frequency (UHF) radio waves in the 2.4 GHz band (2.400-2.525 GHZ) (e.g., Bluetooth® communications). In another example, the module communications circuitry 1110 and gun communications circuitry 1120 can be configured for communications utilizing super high frequency (SHF) radio waves in the 5 GHz band. It is understood, however, that module controller 1102 and gun controller 1112 can be configured to communicate in any desired manner utilizing any suitable frequency in examples including wireless communications.

Module control circuitry 1106 and/or gun control circuitry 1116, in one example, is configured to implement functionality and/or process instructions. For example, module control circuitry 1106 can be capable of processing instructions stored in module memory 1108. Gun control circuitry 1116 can be capable of processing instructions stored in gun memory 1118. Examples of module control circuitry 1106 and/or gun control circuitry 1116 can include one or more of a processor, a microprocessor, a controller, a digital signal processor (DSP), an application specific integrated circuit (ASIC), a field-programmable gate array (FPGA), or other equivalent discrete or integrated logic circuitry. Module control circuitry 1106 can be entirely or partially mounted on one or more circuit boards. Gun control circuitry 1116 can be entirely or partially mounted on one or more circuit boards.

Module memory 1108 and gun memory 1118 can be configured to store information before, during, and/or after operation. Module memory 1108 and gun memory 1118, in some examples, are described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, module memory 1108 and/or gun memory 1118 is a temporary memory, meaning that a primary purpose of the memory is not long-term storage. Module memory 1108 and/or gun memory 1118, in some examples, is described as volatile memory, meaning that that memory does not maintain stored contents when power is turned off. Examples of volatile memories can include random access memories (RAM), dynamic random access memories (DRAM), static random access memories (SRAM), and other forms of volatile memories. In some examples, module memory 1108 is used to store program instructions for execution by module control circuitry 1106. In some examples, gun memory 1118 is used to store program instructions for execution by gun control circuitry 1116. Module memory 1108 and/or gun memory 1118, in one example, is used by software or applications to temporarily store information during program execution.

Module memory 1108 and/or gun memory 1118, in some examples, also includes one or more computer-readable storage media. Module memory 1108 and/or gun memory can be configured to store larger amounts of information than volatile memory. Module memory 1108 and/or gun memory 1118 can further be configured for long-term storage of information. In some examples, module memory 1108 and/or gun memory 1118 includes non-volatile storage elements. Examples of such non-volatile storage elements can include magnetic hard discs, optical discs, flash memories, or forms of electrically programmable memories (EPROM) or electrically erasable and programmable (EEPROM) memories.

During operation, the user actuates trigger 34 to initiate spraying. Trigger 34 generates a spray signal and transmits the spray signal to gun controller 1112. Gun controller 1112 can, in some examples, be configured to generate and transmit an initiation signal to module controller 1102. The initiation signal informs the module controller 1102 that the trigger 34 has been actuated to cause spraying by spray gun 14. For example, gun controller 1112 can transmit the initiation signal to module controller 1102 wirelessly by communication between gun communications circuitry 1120 and module communications circuitry 1110.

Gun controller 1112 is further configured to generate and provider an activation signal to solenoid 38, such as by providing electrical power to solenoid 38 from gun power source 1114, to cause the solenoid 38 to actuate the spray valve 36 from the closed state to the open state. The spray valve 36 shifting to the open state opens a flowpath through spray valve 36 for the spray fluid to flow to nozzle 40 to be atomized into a fluid spray.

Module controller 1102 is configured to power motor 22 based on reception of the initiation signal from gun controller 1112. Powering the motor 22 causes the motor 22 to drive pump 24 to pump the spray fluid to spray gun 14.

Gun controller 1112 and module controller 1102 can be configured to sequence activation of the motor 22 and solenoid 38. Sequencing activation of the motor 22 and the solenoid 38 provides high quality spraying while reducing any deadband. Sequencing activation of motor 22 and solenoid 38 can eliminate or reduce the undesirable pressure drop that can occur when spray valve 36 is actuated to an open state prior to pump 24 beginning to output pressurized spray fluid.

In some examples, module controller 1102 can be configured to send a confirmation signal back to gun controller 1112 indicating that the initiation signal was received. In some examples, the confirmation signal can be based on the module controller 1102 activating motor 22. Gun controller 1112 can be configured to activate solenoid 38 based on reception of the confirmation signal from module controller 1102. As such, fluid sprayer 1100 can be configured such that activation of motor 22 and activation of solenoid 38 are sequenced, as discussed above with regard to FIG. 16.

In some examples, gun controller 1112 is configured to activate solenoid 38 based on a delay period after sending the initiation signal. The delay period can be timed to allow activation of motor 22 such that pump 24 begins outputting pressurized spray fluid prior to solenoid 38 shifting the spray valve 36 to the open state. In some examples, the delay period can be adjusted based on characteristics of the fluid sprayer 1100, such as the length of the conduit 18, a desired spray pressure, etc. For example, a longer conduit 18 will require more time for the pump 24 to drive spray fluid to spray gun 14, such that a longer period may be required to increase pressure to a sufficient level to counteract any pressure drop. In such an example, the delay period can be greater for a longer length of conduit 18 and less for a shorter length of conduit 18.

The user can stop spraying by spray gun 14 by releasing trigger 34. Release of the trigger 34 can send a signal to gun controller 1112, or stop transmission of the spray signal to gun controller 1112, and gun controller 1112 can cause spray valve 36 to actuate to the closed state. For example, gun controller 1112 can stop or reduce power to solenoid 38 to allow a spring to return spray valve 36 to the closed state or can send power through another coil of solenoid 38 to cause solenoid 38 to actuate the spray valve 36 to the closed state.

In some examples, gun controller 1112 can generate and send a completion signal to the module controller 1102 to indicate that the trigger 34 has been released. The module controller 1102 can depower motor 22 based on reception of the completion signal.

In some examples, module controller 1102 can be configured to control operation of motor 22 regardless of whether module controller 1102 is communicatively connected to gun controller 1112. For example, module controller 1102 can be configured to control activation of motor 22 in a connected mode and in an independent mode. In the connected mode, module controller 1102 activates motor 22 based on the initiation signal received from gun controller 1112. In the independent mode, module controller 1102 activates motor 22 based on parameter information received from transducer 1012.

For example, gun controller 1112 and module controller 1102 may become communicatively disconnected, such as when gun controller 1112 moves out of range of module controller 1102 or the operator moves around an obstruction, such as a wall, which can block wireless communications signals. For example, some examples of conduit can be 50, 100, 150, 200, 250, 300, or more feet in length. If the module controller 1102 is communicatively disconnected from the gun controller 1112, then the gun controller 1112 is unable to provide the initiation signal to the module controller 1102. However, it is desirable that fluid sprayer 1100 remains operable in such situations.

In the independent mode, module controller 1102 is configured to activate motor 22 based on parameter information from transducer 1012. The user actuating the trigger 34 will cause gun controller 1112 to activate solenoid 38, thereby causing the spray valve 36 to actuate to the open state. The spray valve 36 actuating to the open state releases spray fluid from spray gun 14, causing a drop in fluid pressure in the fluid circuit between pump 24 and spray gun 14 and initiating flow through the fluid circuit at least due to the pressurized fluid remaining in the fluid circuit. Transducer 1012 will sense the pressure drop and module controller 1102 can activate the motor 22 based on the sensed pressure drop. The pressure drop sensed by transducer 1012 indicates that spray valve 36 is open and that spraying has been initiated at spray gun 14. The module controller 1102 activates motor 22 to cause pumping by pump 24 based on the pressure drop sensed by transducer 1012. In examples in which transducer 1012 is a flow meter, transducer 1012 will sense fluid flow within the fluid circuit based on the spray valve 36 shifting to the open state. The flow sensed by transducer 1012 indicates that spray valve is open and spraying has been initiated by spray gun 14. The module controller 1102 activates motor 22 to cause pumping by pump 24 based on the fluid flow sensed by transducer 1012.

Module controller 1102 can be configured to operate concurrently in both the connected mode and the independent mode. For example, module controller 1102 can monitor for the initiation signal from gun controller 1112 and, if such a signal is not received, default to the independent mode and activate motor 22 based on a sensed change in the fluid parameter (e.g., sensed fluid flow or sensed pressure drop).

In some examples, module controller 1102 can be configured to determine a connection status between module controller 1102 and gun controller 1112. If module controller 1102 determines that it is communicatively disconnected from gun controller 1112, then module controller 1102 can operate in the independent mode until connectivity is restored.

In some examples, gun controller 1112 can be configured to determine a connection status between module controller 1102 and gun controller 1112. If gun controller 1112 determines that it is communicatively disconnected from module controller 1102, then gun controller 1112 can operate to activate solenoid 38 even if no response is received from module controller 1102 indicating that the initiation signal was received. It is understood, however, that, as discussed above, gun controller 1112 can be configured to activate solenoid 38 based on actuation of trigger 34 even when communicatively connected to module controller 1102 such as in examples in which module controller 1102 is not configured to generate and send a confirmation signal.

In the independent mode, module controller 1102 can deactivate motor 22 based on parameter information generated by transducer 1012. In some examples, transducer 1012 can indicate a pressure rise in the spray fluid, such as a spike in the pressure of the spray fluid as opposed to a steady rise, indicative of spray valve 36 being actuated to the closed state. Module controller 1102 can depower motor 22 based on such a sensed pressure rise. In some examples, transducer 1012 can indicate a stopped flow of the spray fluid, indicative of spray valve 36 being actuated to the closed state. Module controller 1102 can depower motor 22 based on such a sensed stoppage of flow.

Spray gun 14 is suitable for use with pump modules other than pump module 12 described. For example, spray gun 14 can be retrofit to existing spray systems. In such an example the gun controller 1112 controls activation of the solenoid 38 based on trigger 34 actuation. The user actuating the trigger 34 causes the gun controller 1112 to activate the solenoid 38 to displace the spray valve 36 to an open state. The user releasing the trigger 34 causes the spray valve 36 to actuate to the closed state, either due to the solenoid 38 being deactivated such that a spring can displace the spray valve 36 to the closed state or due to the solenoid 38 driving the spray valve 36 back to the closed state. The motor 22 is activated to power the pump 24 based on a pressure drop in the conduit 18 due to the spray valve 36 being actuated to the open state to open the flowpath through nozzle 40 thereby releasing spray fluid through nozzle 40. Such a configuration can be referred to as a constant independent mode. In such a retrofit example, it is understood that gun controller 1112 may not include communications circuitry 1120 as the gun controller 1112 is not required to communicate with a controller of the pump module.

Figure 18A:
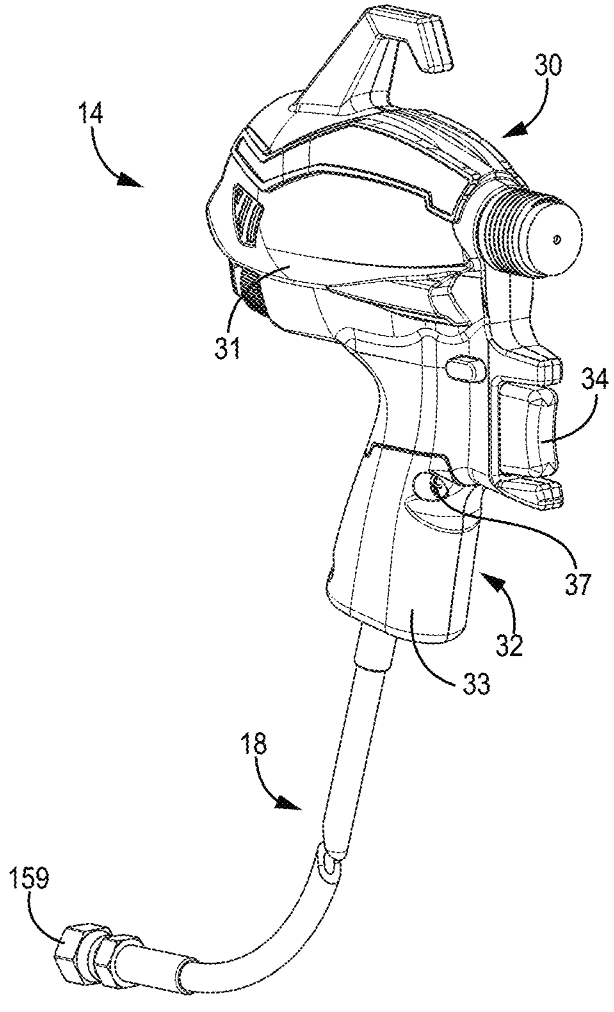
FIG. 18A is an isometric view of a spray gun with the tip assembly dismounted.
Figure 18C:
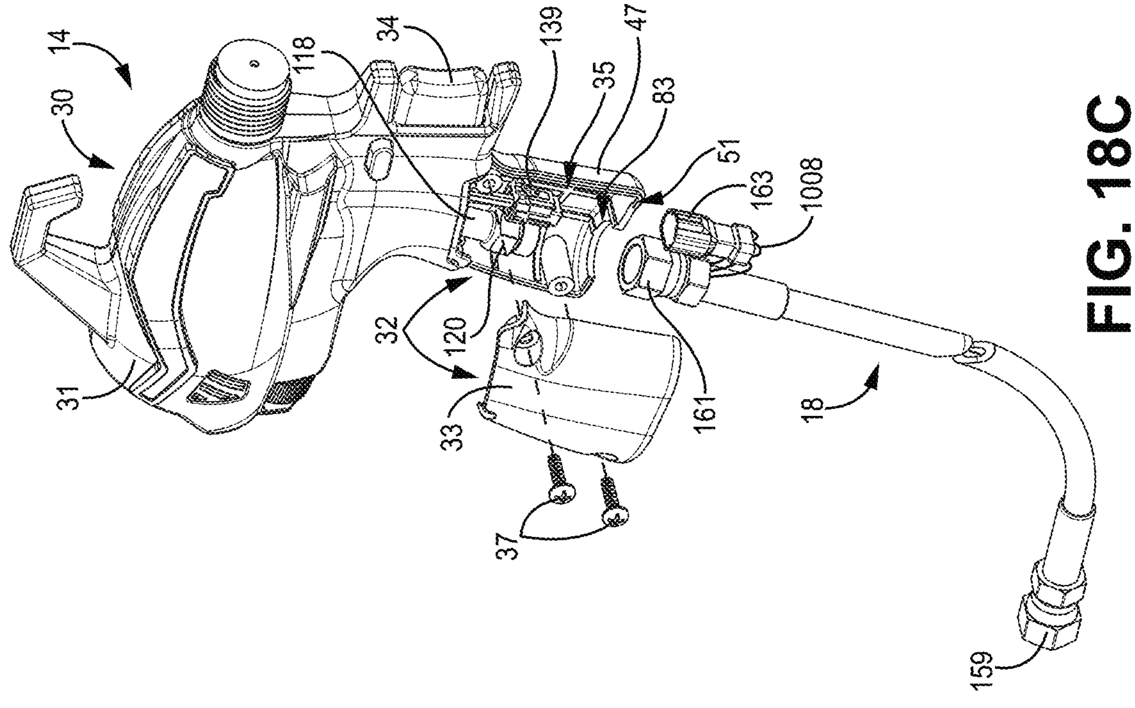
FIG. 18C is an isometric view of the spray gun showing the door removed from the gun handle and fluid and electrical connectors from the conduit disconnected from the spray gun.
Figure 18B:
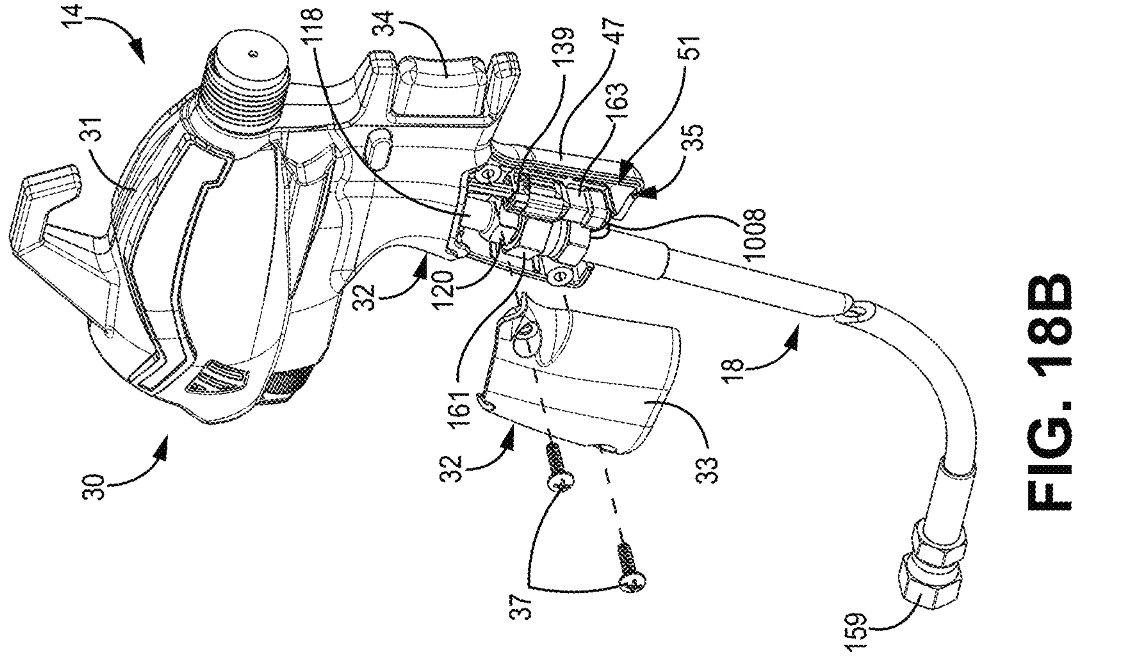
FIG. 18B is an isometric view of the spray gun showing a door removed from the gun handle.

FIG. 18A is an isometric view of spray gun 14 with tip assembly 58 dismounted. FIG. 18B is an isometric view of spray gun 14 showing door 33 removed from gun handle 32. FIG. 18C is an isometric view of spray gun 14 showing door 33 removed from gun handle 32 and fluid and electrical connectors from conduit 18 disconnected from spray gun 14. FIGS. 18A-18C will be discussed together.

As discussed above, spray gun 14 is fluidly connected to a fluid source, such as pump module 12 to receive spray fluid under pressure for atomization and spraying onto a surface. Spray gun 14 can further be electrically connected (e.g., to receive/send power, sensor signals, control signals, etc.) to the pump module 12. In the example shown, the electrical and fluid connections are formed in the interior of spray gun 14. Having such connections disposed within the spray gun 14 protects the connections from damage, such as due to undesired contact or impact.

In the example shown, gun handle 32 includes door 33. The door 33 is held to the gun handle 32 by fastener 37. Specifically, door 33 is mounted to handle body 47 of the gun handle 32. The handle body 47 is formed as a part of gun body 30 in the example shown. For example, the handle body 47 can be formed integrally with gun housing 31. Handle body 47 and gun housing 31 can form a monolithic component of gun body 30.

While door 33 is shown as fully removable from other portions of gun handle 32, it is understood that not all examples are so limited. For example, door 33 could be connected to other portions of handle 32 by a hinge such that door 33 remains connected to gun handle 33 even when unfastened to allow opening of door 33. In some examples, door 33 can be fastened to other portions of gun handle 32 by a tab and slot interface in addition to or as an alternative to fasteners 37.

Door 33 is disposed on a lateral side of gun handle 32 in the example shown. In the example shown, door 33 forms a lateral side of gun handle 32 with door 33 mounted to gun handle 32. It is understood, however, that door 33 can be disposed at any desired location on gun handle 32, or in some examples extend into other portions of gun body 30, such as gun housing 31 in examples in which fluid and/or electrical connections are formed within gun housing 31.

FIG. 18B shows removal of the door 33 from the gun handle 32. In the example shown, door 33 is removed following removal of the fasteners 37. When the door 33 is removed, a cavity 35 within the gun handle 32 is exposed. An opening 51 is exposed with door 33 in the open state and closed with door 33 in a closed state. Cavity 35 is open at a distal end of gun handle 32 and away from gun housing 31. Cavity 35 is open on a lateral side of gun handle 32 with door 33 in the open state through opening 51. The cavity 35 houses an internal fluid fitting 120 and an internal electrical connector 139. The internal fluid fitting 120 is connectable to a hose fitting 161 of the conduit 18 and the internal electrical connector 139 is connectable to a wire connector 163 of the plurality of wires 1008 of the conduit 18.

FIG. 18C shows removal of the hose fitting 161, the plurality of wires 1008, and the wire connector 163 from inside the gun handle 32. The hose fitting 161 and/or the wire connector 163 can be too large to fit through the passage 83 formed through the bottom of the gun handle 32, such as when the door 33 is mounted to gun handle 32. In the example shown, passage 83 is partially defined by integral parts of gun handle 32 and partially defined by door 33 with door 33 mounted to gun handle 32. Such a configuration prevents inadvertent movement of components out of gun handle 32 through passage 83. However, hose fitting 161 and wire connector 163 are configured to be able to move laterally out from gun handle 32 to separate from the gun handle 32 when the door 33 is dismounted. The rim of the passage 83 may pinch the conduit 18 to secure components within conduit 18 (e.g., wires 1008 and fluid hose 1006) relative to the gun handle 32 and the rest of the spray gun 14, but the clamping force is relieved with removal of the door 33.

The fluid fittings (e.g., between hose fitting 161 and fluid fitting 120) may be threaded and the electrical connections (e.g., between wire connector 163 and electrical connector 139) can be recess/receiver type with internal contacts. Removal of door 33 provides access to both threaded connections and recess/receiver type connections. The recess/receiver type connection forms a sliding interface. Such connections can be accessed to be formed or broken by removal of door 33. Door 33 encloses cavity 35 to protect the connections with door 33 in the closed state.

The door 33 can be removed to permit disconnection of the conduit 18, and the same or different conduit 18 can be reattached to the appropriate connectors and the door 33 replaced. This can allow swapping of the conduit 18 or swapping of spray gun 14.

The interfaces between conduit 18 and the fluid fitting 120 and between conduit and the electrical connector 139 are enclosed within spray gun 14. The interfaces are not exposed outside of spray gun 14 with door 33 mounted on gun handle 32 to enclose the chamber 35 formed within gun handle 32. Such a configuration protects the fluid interface, between fluid fitting 120 and hose fitting 161, and the electrical interface, between electrical connector 139 and wire connector 163, from undesired contact, which could cause a disconnect or leak. Door 33 is easily disconnectable from gun handle 32 by simply removing fasteners 37 and pulling door 33 off of gun handle 32. The fluid and electrical interfaces can then be accessed for servicing or for disconnecting or connecting. Spray gun 14 can thus easily and quickly be removed and replaced with a new spray gun 14 and/or conduit 18 can be easily and quickly removed and replaced with a new conduit 18.

Figure 19:
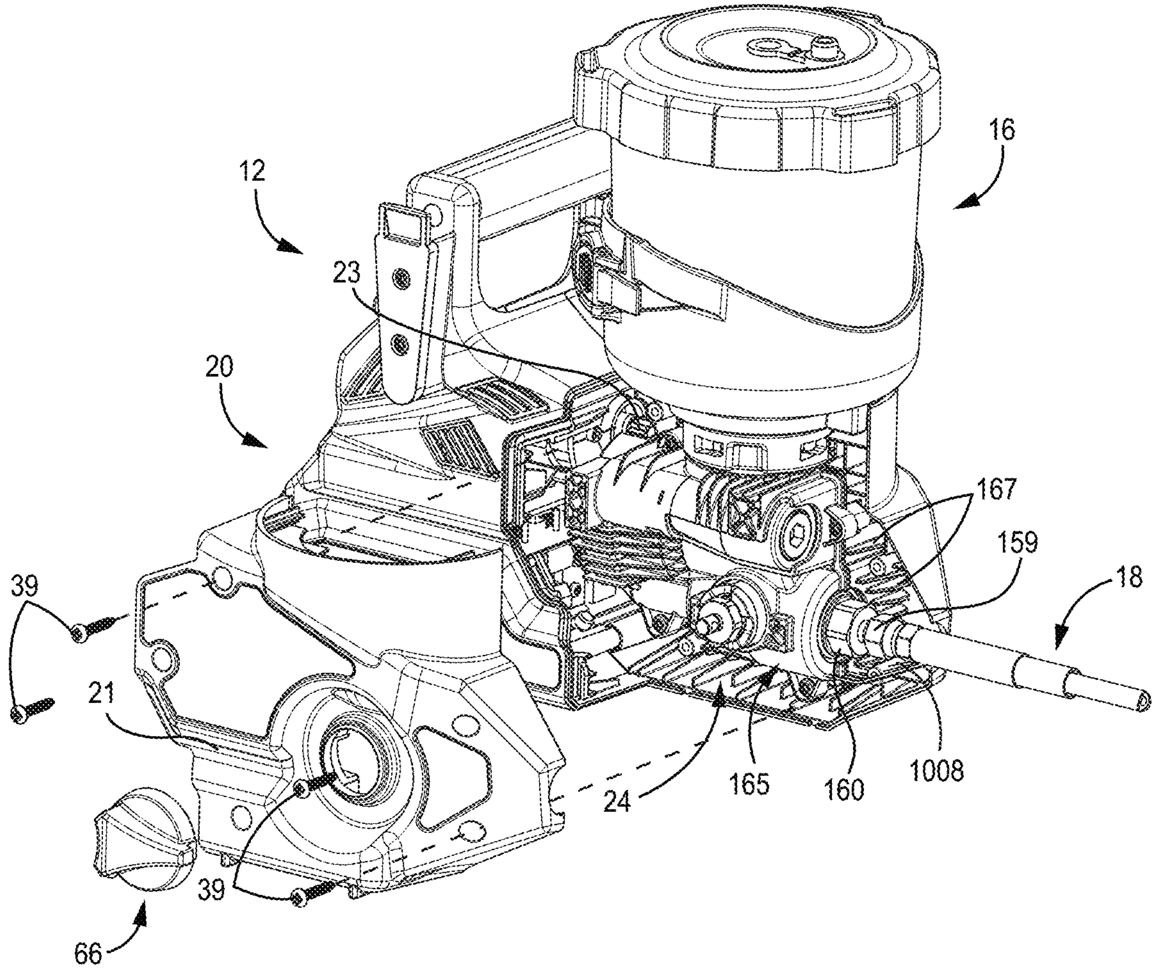
FIG. 19 is an isometric view of a pump module with a panel removed.

FIG. 19 is an isometric view of pump module 12 with a panel 21 removed. Panel 21 forms a portion of module housing 20. The panel 21 can be secured to the rest of the module housing 20 by fasteners 39, which can be similar to or the same as fasteners 37. Panel 21 forms a removable portion of module housing 20.

Removal of the panel 21 exposes a pump case 165. The pump case 165 houses the pump 24. Pump body 162 is at least partially disposed within pump case 165 and extends out of pump case 165. The pump case 165 can hold the pump 24. A gear 169 of the pump can be exposed through the pump case 165 to connect to a pinion 23 of motor 22.

As shown, the module fitting 160, which can also be referred to as a pump outlet fitting, is mounted on an end of the pump 24 that is left exposed by the pump case 165. The module fitting 160 connects with the conduit 18. This interface can be threaded. As shown, conduit 18 is made up of plurality of wires 1008 and includes conduit fitting 159, formed at an opposite end of conduit 18 from the hose fitting 161 that interfaces with gun fitting 120 of spray gun 14. The plurality of wires 1008 can connect with electrical components of the pump module 12 while the conduit fitting 159 can connect with the fluid hose of conduit 18 to route pumped spray fluid from pump 24 and into the fluid hose of conduit 18.

In the example shown, the pump case 165 is disposed within module housing 20 such that the pump case 165, and thus the pump 24, can be slid out from within the module housing 20 with removal of the panel 21. In this way, the pump 24 can be replaced by swapping in a new pump 24 to pump module 12. As shown, portions of reservoir 16 can be removed along with pump 24, such as by lateral sliding out of the opening exposed by removing panel 21. Removal of panel 21 opens the opening through module housing 20 that basin 48 projects through, allowing for lateral removal of reservoir 16 from pump module 12 along with pump 24.

Figure 20A:
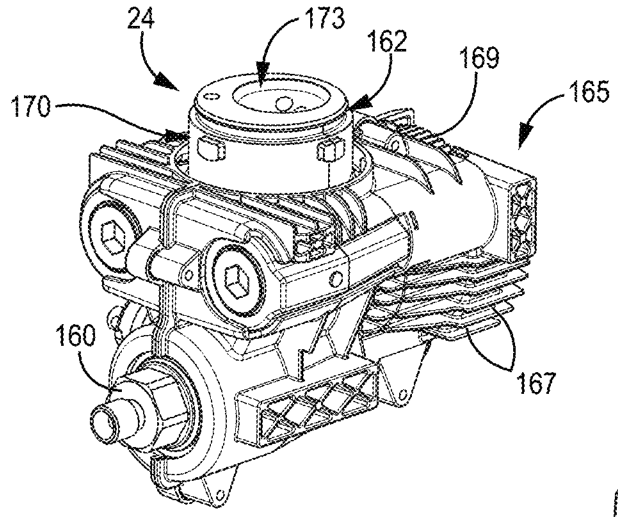
FIG. 20A shows a first isometric view of a pump case and pump dismounted from the pump module.
Figure 20B:
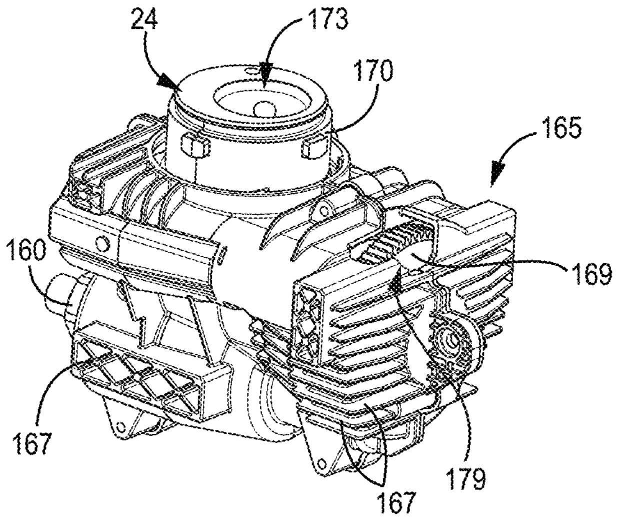
FIG. 20B shows a second isometric view of the pump case and pump dismounted from the pump module.
Figure 20C:
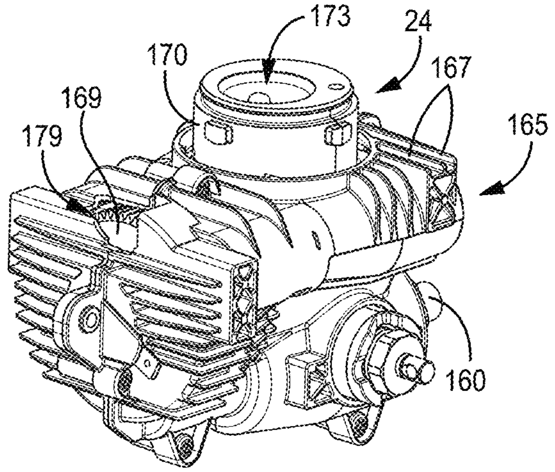
FIG. 20C shows a third isometric view of the pump case and pump dismounted from the pump module.
Figure 20D:
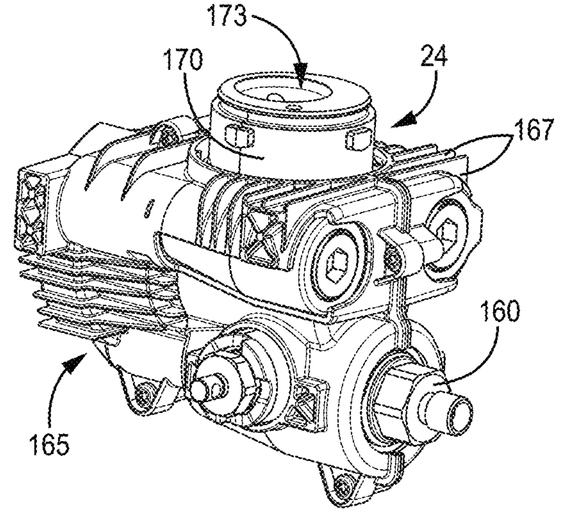
FIG. 20D shows a fourth isometric view of the pump case and pump dismounted from the pump module.

FIG. 20A shows a first isometric view of pump case 165 and pump 24 dismounted from pump module 12. FIG. 20B shows a second isometric view of pump case 165 and pump 24 dismounted from pump module 12. FIG. 20C shows a third isometric view of pump case 165 and pump 24 dismounted from pump module 12. FIG. 20D shows a fourth isometric view of pump case 165 and pump 24 dismounted from pump module 12. FIGS. 20A-20D will be discussed together. Various components of pump 24 are exposed through the pump case 165. In the example shown, module fitting 160 and the pump neck 170 are exposed through pump case 165. Pump neck 170 is exposed to facilitate interfacing with a reservoir, such as with basin 48 of reservoir 16. The pump inlet 173, through which spray fluid enters into pump 24, is formed at a distal end of pump neck 170 and is exposed outside of pump case 165. Module fitting 160 is exposed to facilitate interfacing with the conduit fitting 159 to form the fluid connection between pump 24 and conduit 18. The shaft of the priming valve that connects to valve knob 66 is also exposed through pump case 165 in the example shown.

It will be understood that the pump includes a drive 158 that includes a gear 169 that receives the rotational output from motor 22. The drive 158 is configured to converts the rotational motion output by the motor 22 into reciprocating motion of the fluid displacer 164 (e.g., piston or diaphragm, among other options) of the pump 24. The pump case 165 partially covers the drive 158 such that part of the gear 169 can be exposed as shown to connect with the pinion 23 to receive the input rotational motion from motor 22. Gear 169 is exposed through gear slot 179 formed through pump case 162. Only a portion of gear 169 is exposed through gear slot 179 at any given time during operation of pump module 12. A minority of the toothed edge of gear 169 is exposed through gear slot 179.

Pump case 165 encloses various components of pump 24 to protect those components. Pump case 165 can prevent fluid and contaminant (e.g., dust) intrusion into components of pump 24, such as at the interface between reciprocating components and seals at which locations the contaminants can cause undesirable wear. Pump case 165 includes case ribs 167 that interface with the interior of module housing 20 to support pump 24 at a desired position and orientation within module housing 20. The case ribs 167 can interface with ribs formed within module housing 20 to fix the position and orientation of pump case 165, and thus of pump 24, within module housing 20. Having case ribs 167 interface with ribs on module housing 20 provides for a lighter weight yet robust support configuration that utilizes less material than having a solid block interfacing with pump 24.

Figure 21:
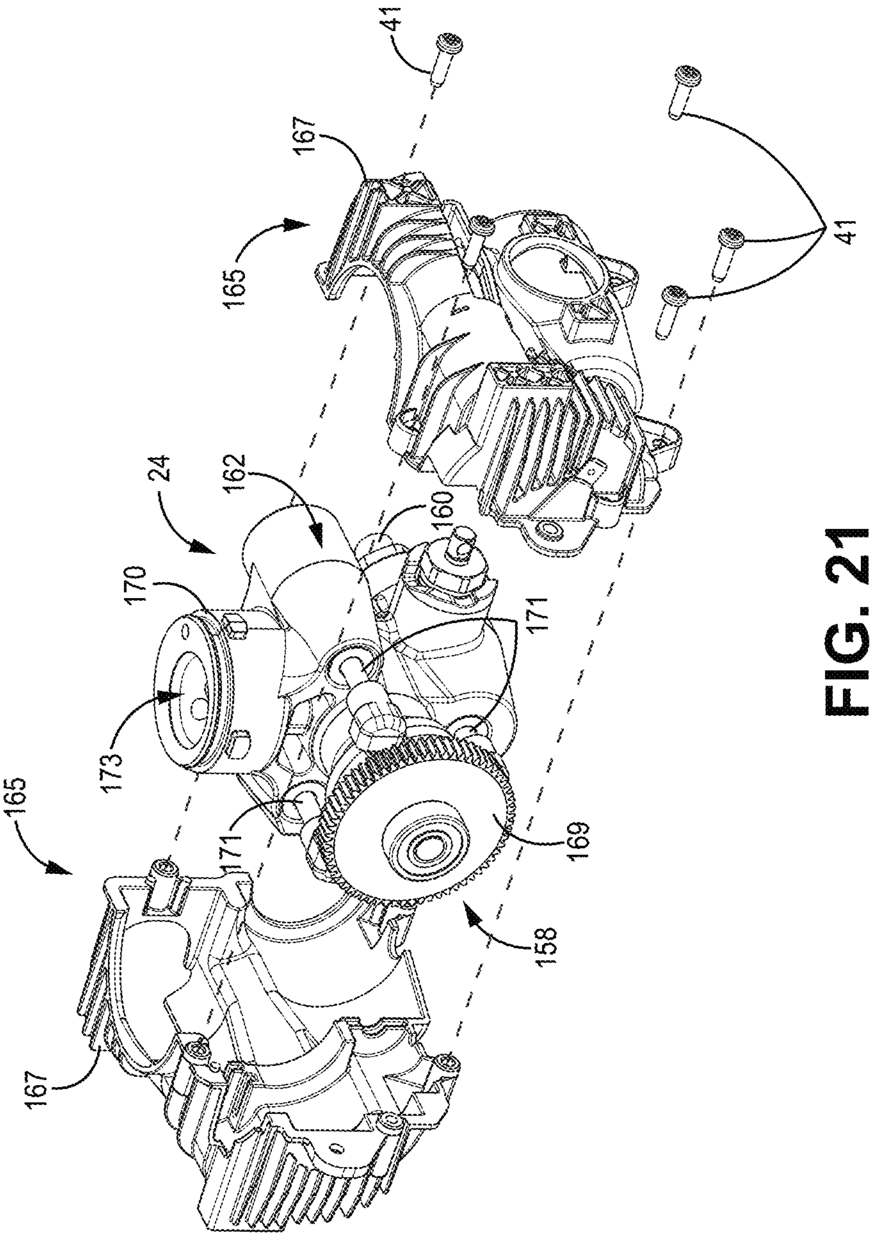
FIG. 21 is an isometric exploded view showing the pump case exploded away from the pump.

FIG. 21 is an isometric exploded view showing pump case 165 exploded away from pump 24. FIG. 21 shows that the pump case 165 can split apart, such as in the manner of a clamshell housing. Fasteners 41 can hold the clamshell together. Fasteners 41 can be formed similar to or identical to fasteners 37 and/or fasteners 39. Splitting apart the pump case 165 exposes the pump 24. Also now exposed are drive rods 171. The drive rods 171 are connected to or form part of the fluid displacers 164 of pump 24. The drive rods 171, which can also be referred to as piston rods in examples in which fluid displacers 164 are pistons, are reciprocated by the drive 158. Drive rods 171 extend out of pump body 162 to interface with drive 158. The unsupported length of drive rods 171 can be delicate and easy to damage or knock out of alignment if handled in an incorrect manner. In the example shown, the pump case 165 can enclose the unsupported portion of the drive rods 171, protecting the drive rods 171 from undesired contact and from contaminant intrusion. The pump case 165 can also cover a majority of the drive 165 which can prevent unintended rotation of the gear 169, such as due to user fiddling, which can damage the pump 24.

Figure 22A:
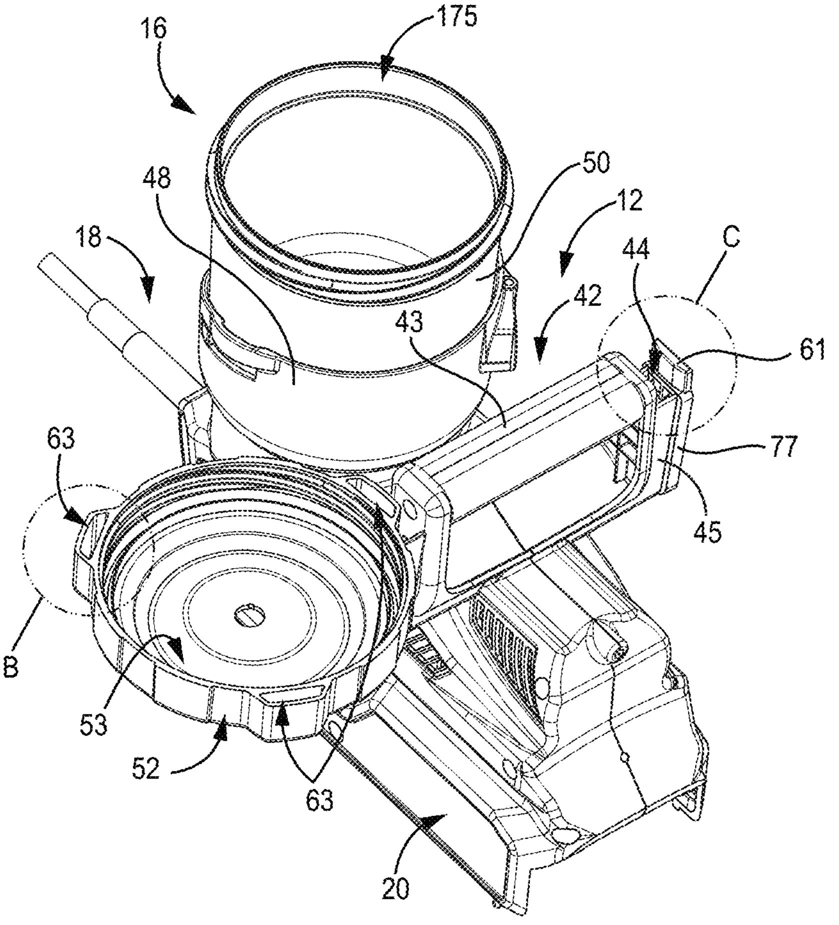
FIG. 22A is an isometric view of a pump module with a lid removed from a reservoir exposing the inlet opening of the reservoir.
Figure 22B:
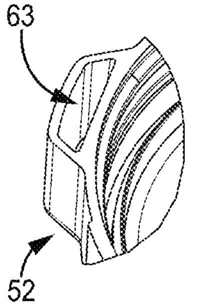
FIG. 22B is an enlarged view of detail B in FIG. 22A.
Figure 22C:
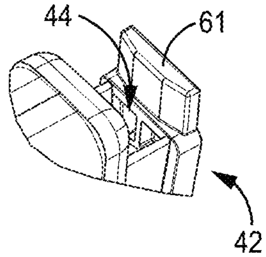
FIG. 22C is an enlarged view of detail C in FIG. 22A.
Figure 23A:
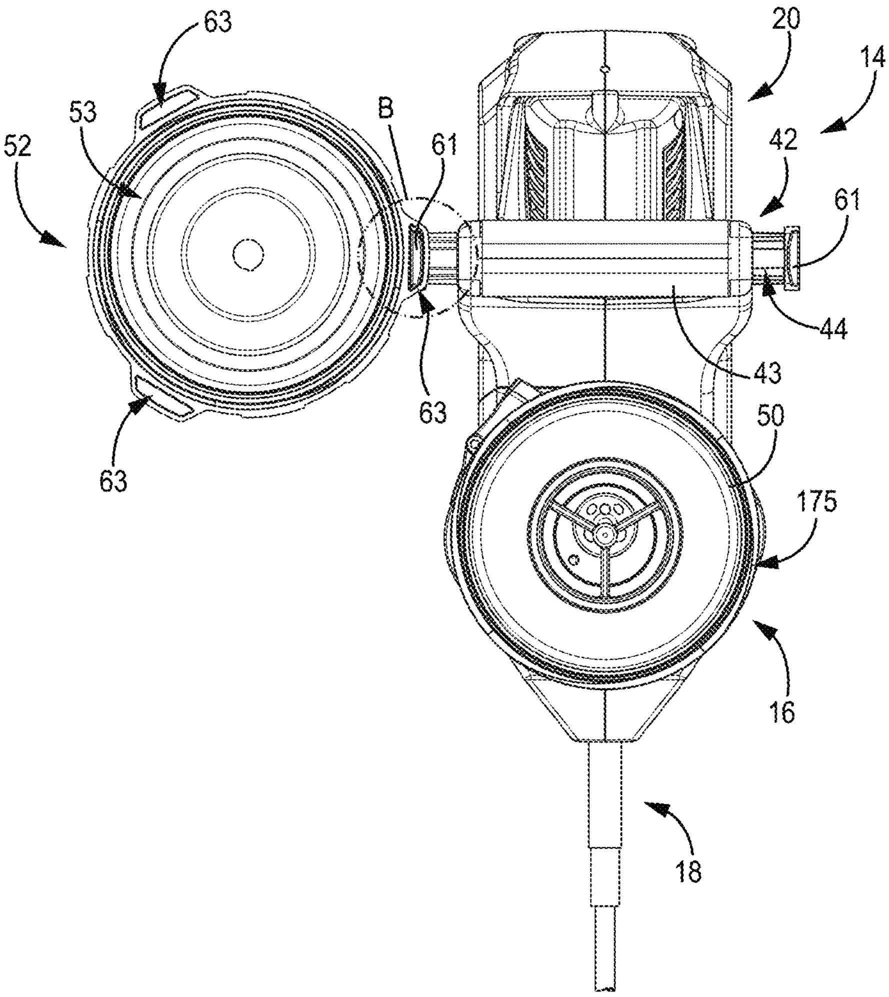
FIG. 23A is a top view of the pump module with the lid removed from the reservoir exposing the inlet opening of the reservoir.
Figure 23B:
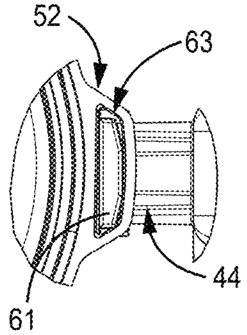
FIG. 23B is an enlarged view of detail B in FIG. 23A.

FIG. 22A is an isometric view of pump module 12 with the lid 52 removed from the reservoir 16 exposing the inlet opening 175. FIG. 22B is an enlarged view of detail B in FIG. 22A. FIG. 22C is an enlarged view of detail C in FIG. 22A. FIG. 23A is a top view of pump module 12 with the lid removed from the reservoir 16 exposing the inlet opening 175. FIG. 23B is an enlarged view of detail B in FIG. 23A. FIGS. 22A-23B will be discussed together. It may be common to remove the lid 52 as shown in FIG. 22A to expose inlet opening 175 and allow the pouring of more spray fluid into the reservoir 16. However, the user may have their hands full and have lack of a place to set the lid 52, which can generate mess and delay in the spray operation. In the example shown, the lid 52 and the pump module 12 have mating features which allow the lid 52 to be placed in supported on the pump module 12. In particular, the wet side 53 of the lid 52, which is typically facing down into the reservoir 16, is placed in the upright position when mounted on the pump module 12 instead of on the reservoir 16 to prevent dripping. Lid 52 can be fully supported by pump module 12 while the user adds additional spray fluid to the reservoir 16.

Mounting features between lid 52 and pump module 12 can take several forms. In the example shown, tabs 61 are provided on the pump module 12. The tabs interface with slots 63 of the lid 52. Alternatively, the positions of the tabs 61 and the slots 63 can be reversed. A pair of mounting features, in this case tabs 61, are placed on both lateral sides of the pump module 12 to allow mounting of the lid 52 regardless of what side of the user's body the pump module 12 is mounted on. It is noted that the tabs 61 are positioned on the module handle 42 of the pump module 12 in the example shown. In the example shown, the tabs 61 are disposed directly laterally outward of the mounts 44 on each lateral side of the module handle 42. As shown, the lid 52 includes three slots 63, however a single slot or slots can alternatively be provided. Likewise, a single tab 61 or multiple tabs can be provided.

In the example shown, the lid 52 can be removed from tube pot 50 and turned so that wet side 53 is oriented vertically upward. The lid 52 can then be shifted downward to cause the tab 61 to enter into a slot 63, as best shown in FIG. 23B. With the interface between lid 52 and pump module 12 formed, the lid 52 is fully supported by the pump module 12. The user then has both hands free to fill spray fluid into the interior of reservoir 16 through inlet openings 175.

The interface between lid 52 and pump module 12 is laterally outward from mount 44 such that the lid 52 can be mounted on pump module 12 and the spray gun 14 can simultaneously be mounted on pump module 12 by interfacing gun mount 60 with mount 44. Lid 52 being mounted on pump module 12 at the interface between tabs 61 and slots 63 leaves mount 44 exposed for mounting of spray gun 14 on pump module 12.

Figure 24A:
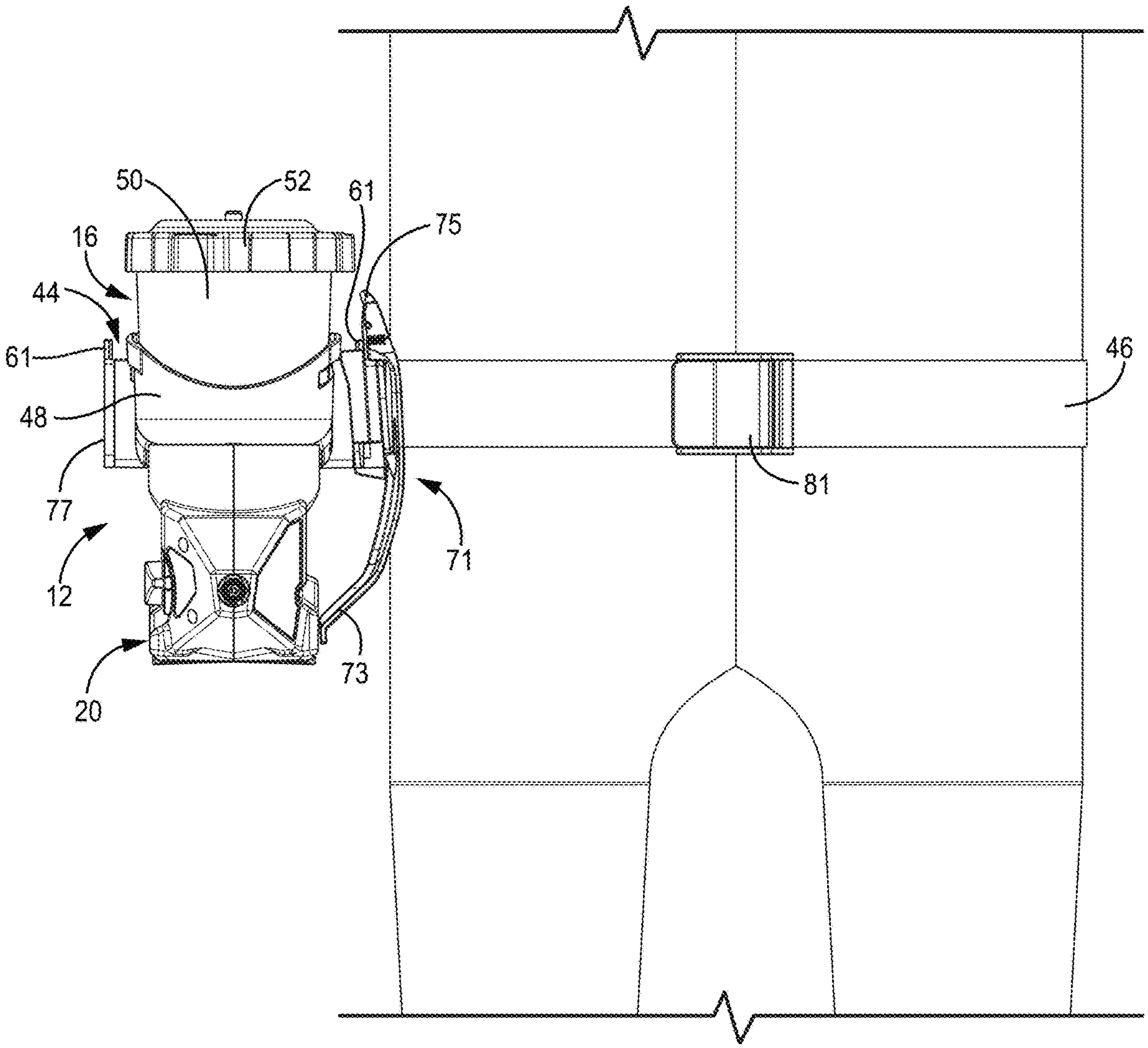
FIG. 24A shows the mounting of the pump module on a clip.
Figure 24B:
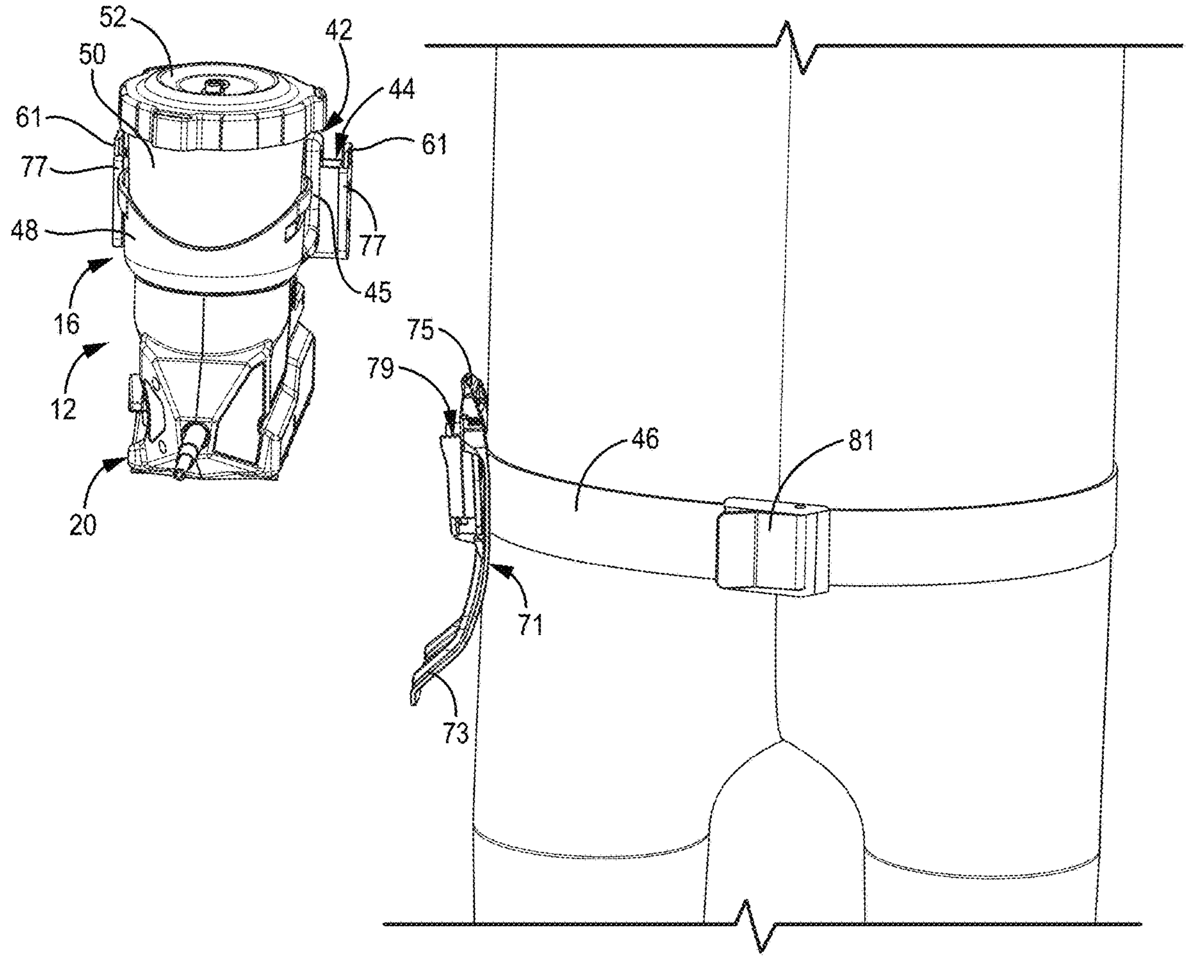
FIG. 24B shows the pump module having been removed from the clip.

FIG. 24A shows the mounting of the pump module 12 on a clip 71. FIG. 24B shows the pump module 12 having been removed from the clip 71. Clip 71 is attached to a strap 46. Buckle 81 can be used to release the strap 46. While the strap 46 is shown as being worn as a belt around a waist of the user, the strap 46 can be worn in other ways.

The clip 71 includes a kick out 73. The kick out 73 is located below a latch 75. The latch 75 locks on to the pump module 12 via mating features, such as slot and tongue engagement. In the example shown, the latch 75 can be spring loaded such that a spring causes engagement between the latch 75 and pump module 12 while the user can actuate the latch 75 to overcome the spring and allow dismounted of the pump module 12. While the latch 75 secures the pump module 12 to the strap 246, the kick out 73 pushes on a lower side of the pump module 12 to keep the reservoir 16 upright to prevent spillage of the spray fluid, particularly when the lid 52 is removed. As shown, the kick out 73 is curved, however other shapes are possible. Part of the kick out 73 braces against the body of the user, but in this embodiment a lower part of the kick out 73 extends away from the body to engage the lower part of the pump module 12.

Module support 77 is formed on pump module 12. In the example shown, module support 77 is formed on a lateral side of the module handle 42, though it is understood that not all examples are so limited. In the example shown, module support 77 is formed on each lateral side of the pump module 12, facilitating mounting of the pump module 12 on either side of the user. In the example shown, module support 77 is formed as a tab configured to slide into and out of the slot of the clip support 79. The clip support 79 is a portion of clip 71 configured to interface with the pump module 12, specifically with the module support 77, to hold the pump module 12 on the clip 71. In the example shown, clip support 79 is formed as a slot configured to receive the tab of the module support 77.

Release of latch 75 allows relative sliding of the module support 77 relative to the clip support 79. With latch engaged, latch 75 prevents pump module 12 from being slid off of clip 71. As shown, the interface between module support 77 and clip support 79 can include a tongue (module support 77 in the example shown) and slot (clip support 79 in the example shown), and can also be reversed to that shown. The user can mount pump module 12 by shifting pump module 12 vertically downward, thereby engaging the module support 77 with the clip support 79 and until the latch 75 snaps to engage with a top portion of module support 77, preventing vertical shifting of pump module 12 relative to clip 71. The kick out 73 prevents tilting of pump module 12 and aligns pump module 12 vertically to prevent spilling of spray fluid and to encourage feeding of spray fluid into the pump 24. The user can dismount pump module 12 by actuating latch 75, such as by depressing a lever of latch 75, and then pulling pump module 12 vertically relative to clip 71, thereby removing the module support 77 from the clip support 79.

Clip 71 and strap 46 can fully support the pump module 12 on the user during operation such that the user is not required to hold or otherwise use their hand to support pump module 12 during spray operations. Such a configuration makes for more efficient spray operations and less fatigue for the user. With pump module 12 supported on the user, the user can utilize a shorter length of conduit 18 as the pump module 12 moves with the user. Utilizing a shorter length of conduit 18 reduces pressure drop across the length of conduit 18, providing a more reliable spray pattern and output. The pump module 12 being carried on the user without occupying the hands of the user allows the user to spray with spray gun 14, refill reservoir 16, and otherwise operate the fluid sprayer 10 without having to directly manipulate pump module 12.

Figure 25A:
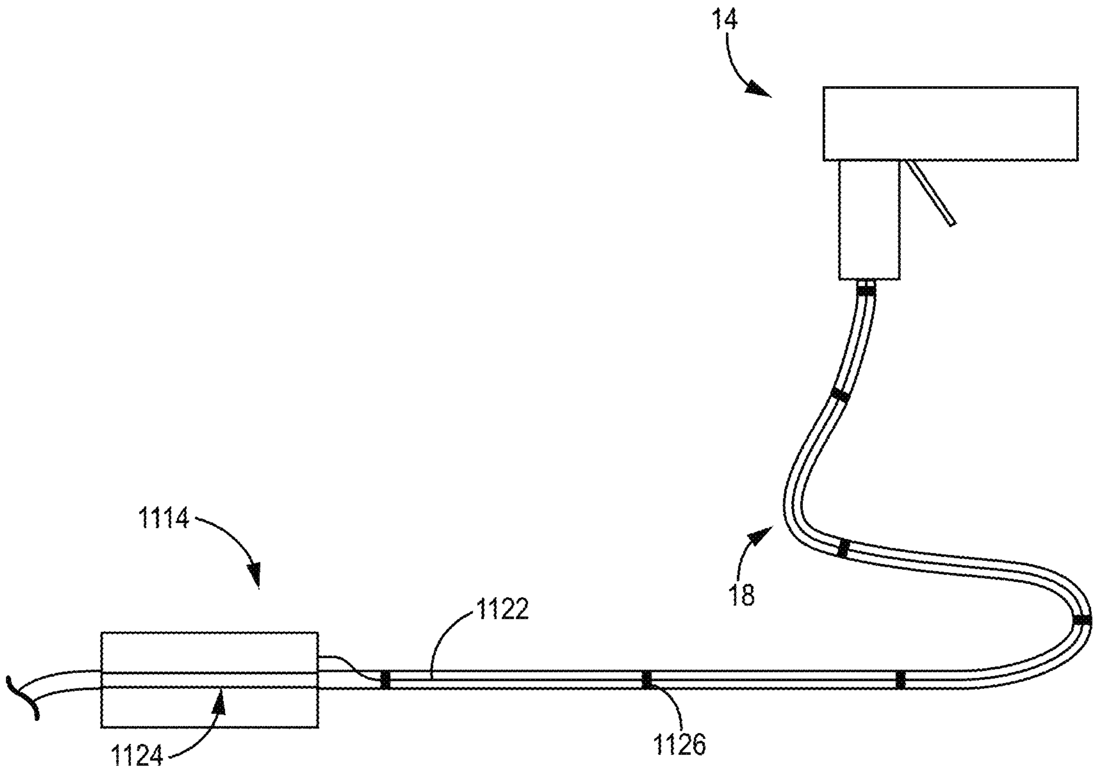
FIG. 25A is a block diagram showing a power assembly for a spray gun.
Figure 25B:
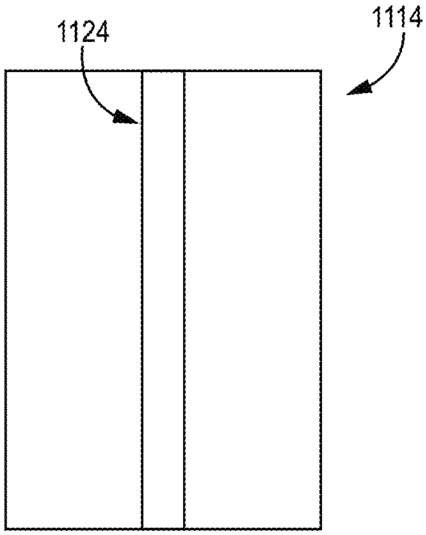
FIG. 25B is an axial end view of a power source for a spray gun.
Figure 25C:
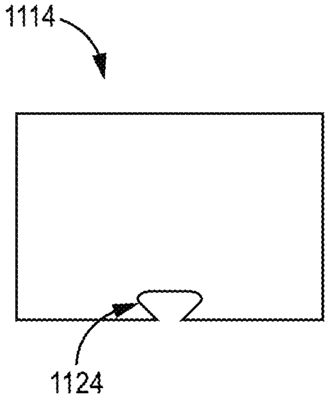
FIG. 25C is a side view of a power source for a spray gun.

FIG. 25A is a block diagram showing a power assembly including a gun power source 1114 for a spray gun 14. FIG. 25B is an axial end view of a gun power source 1114. FIG. 25C is a side view of a gun power source 1114. FIGS. 25A-25C will be discussed together. Gun power source 1114 is electrically connected to spray gun 14 to provide power to electrical components of spray gun 14, such as solenoid 38.

Conduit 18 is connected to spray gun 14 to supply the spray fluid to spray gun 14. Power source 1114 is mounted on conduit 18 such that power source 1114 can be carried by conduit 18. In the example shown, power source 1114 is clamped to conduit 18. Conduit 18 is disposed in groove 1124 that extends into the exterior of housing of power source 1114. Power source 1114 can include a housing and a rechargeable battery disposed within the housing. Power source 1114 forms a battery module of spray gun 14.

Groove 1124 is disposed in the exterior of the housing of power source 1114 such that conduit 18 is recessed relative to the exterior surface. The conduit 18 being recessed prevents power source 1114 from pressing the conduit 18 into the ground surface during operation, which could wear on conduit 18. Conduit 18 can be pulled out of groove 1124 to dismount power source 1114 from conduit 18.

Groove 1124 extends in an elongate direction of power source 1114. The groove 1124 is formed as an exterior channel on the housing of power source 1114. Conduit 18 can be considered to be inserted into a long side of the power source 1114.

Power source 1114 can be weighted to have a desired side be oriented vertically downward as the power source 1114 drags on the ground surface. Power source 1114 can be weighted such that groove 1124 is formed in a side configured to not be oriented vertically downward, to space the conduit 18 from the ground interface. The groove 1124 is not formed in the ground interface side of power source 1114.

Electrical cord 1122 extends from power source 1114 to spray gun 14. Electrical cord 1122 can be external to the conduit 18 between power source 1114 and spray gun 14. Electrical cord 1122 spaces spray gun 14 from power source 1114 such that the power source 1114 can drag along the ground and does not need to be supported in the air by the user. Dragging the power source 1114 allows the ground surface to support the weight of power source 1114, decreasing exertion by the user. Clamping the power source 1114 to the conduit 18 causes power source 1114 and conduit 18 to move together. Electrical cord 1122 can be connected to conduit 18 by straps 1126 to prevent loose cords.

In some examples, the length of electrical cord 1122 can be adjusted based on user preferences. For example, power source 1114 can include a spool and electrical cord 1122 can be respooled to decrease length or unspooled to increase length. The user can pull electrical cord 1122 to the desired length and mount power source 1114 on the conduit 18. For example, the user may desire a longer length when the user stands on a ladder to reach higher locations during paint spraying. Lengthening the electrical cord 1122 allows the power source 1114 to reach the ground rather than being supported in the air by the user. The user may desire a shorter length when painting indoors to prevent the power source 1114 from being caught in a doorway as the user moves through the space.

The power source 1114 can be a dedicated gun power source separate from the power source of the pump module that drives the pressurized spray fluid to the spray gun 14. The power source 1114 powers electrical components of spray gun 14. The power source 1114 does not provide electric power to the electric motor that powers pumping by the pump.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims. Any single feature, or any combination of features from one embodiment show herein, may be utilized in a different embodiment independent from the other features shown in the embodiment herein. Accordingly, the scope of the invention(s) and any claims thereto are not limited to the particular to the embodiments and/or combinations of the features shown herein, but rather can include any combination of one, two, or more features shown herein.

The invention claimed is:

1. A spray system comprising:

a handheld fluid spray gun comprising:

a gun body having a gun handle;

a trigger supported by the gun body;

a nozzle configured to generate an atomized spray of spray fluid; and a spray valve actuatable between an open state, in which the spray fluid can flow to the nozzle, and a closed state, in which the spray fluid is prevented from flowing to the nozzle;

a solenoid connected to the spray valve and configured to actuate the spray valve from the closed state to the open state, the solenoid comprising a plunger and a stator that includes a coil, the coil configured to electromagnetically move the plunger; and a controller operatively connected to the solenoid to control activation of the solenoid, the controller configured to provide a first power level to the solenoid to cause the solenoid to actuate the spray valve from the closed state to the open state and configured to provide a second power level different from the first power level to the solenoid to cause the solenoid to hold the spray valve in the open state, wherein the first power level is greater than the second power level.

2. The spray system of claim 1, wherein the first power level is a first voltage level and the second power level is a second voltage level.

3. The spray system of claim 1, wherein the first power level is a first current level and the second power level is a second current level.

4. The spray system of claim 1, wherein the trigger includes a switch, the switch configured to provide a signal to the controller to cause the controller to provide power to the solenoid based on the switch sensing actuation of the trigger.

5. The spray system of claim 1, wherein the trigger is not mechanically connected to the spray valve such that the trigger does not directly mechanically actuate the spray valve to the open state.

6. The spray system of claim 1, wherein an electromagnetic force acting on the plunger is greater with the spray valve in the closed state than with the spray valve in the open state.

7. The spray system of claim 1, further comprising a spring configured to urge the spray valve towards the closed state.

8. The spray system of claim 1, wherein an axial gap is formed between the plunger and the stator, the axial gap setting a distance that the spray valve can shift between the closed state and the open state, the axial gap open with the spray valve in the closed state and the axial gap closed with the spray valve in the open state.

9. The spray system of claim 1, wherein the plunger is closer to the spray valve than the coil is to the spray valve.

10. The spray system of claim 1, further comprising a solenoid housing and a valve housing, the coil and the plunger located inside of the solenoid housing, the spray valve located inside of the valve housing, the valve housing defining a wet chamber for spray fluid, wherein the valve housing is located forward of the solenoid housing and the solenoid housing is directly connected to the valve housing.

11. The spray system of claim 10, wherein the solenoid housing is directly connected to the valve housing by a threaded interface.

12. The spray system of claim 1, further comprising a hose that extends from outside of the gun body to inside of the handle, the hose in fluid communication with the spray valve.

13. The spray system of claim 12, wherein the hose is part of a conduit, the conduit further comprising a plurality of wires which extend along the hose from outside of the gun body to inside of the handle.

14. The spray system of claim 12, wherein at least one wire of the plurality of wires connects the coil and the controller.

15. The spray system of claim 14, wherein at least one other wire of the plurality of wires connects the trigger and the controller.

16. The spray system of claim 1, wherein the plunger is disposed at least partially within the coil.

17. The spray system of claim 1, further comprising a battery configured to provide the power to the solenoid.

18. The spray system of claim 1, wherein the spray valve includes a needle connected to the plunger and configured to shift along an axis to place the spray valve in the open state and the closed state, the needle holding a ball configured to engage a seat with the spray valve in the closed state, the ball disengaged the seat with the spray valve in the open state.

19. The spray system of claim 1, wherein the nozzle is disposed in a spray tip insertable into a bore of the fluid handheld spray gun, the spray tip rotatable in the bore to reverse direction of fluid flow through the spray tip to remove clogs.

20. A method of spraying a spray fluid with a spray system including a handheld spray gun and a controller, the handheld spray gun comprising a gun body having a gun handle, the handheld spray gun further including a trigger supported by the gun body, the handheld spray gun further including a nozzle configured to generate an atomized spray of spray fluid, the handheld spray gun further including a spray valve actuatable between an open state, in which the spray fluid can flow to the nozzle, and a closed state, in which the spray fluid is prevented from flowing to the nozzle, and the handheld spray gun further including a solenoid disposed at least partially within the gun body and connected to the spray valve, the solenoid and configured to actuate the spray valve from the closed state to the open state, the solenoid comprising a plunger and a stator that includes a coil, the coil configured to electromagnetically move the plunger, the method comprising:

generating a signal with the trigger based on actuation of the trigger;

energizing the coil, by the controller, based on the trigger having generated the signal, the controlling energizing the coil with a first power level to cause the coil to electromagnetically move the plunger rearward to open the spray valve;

energizing the coil, by the controller, with a second power level once the spray valve is in the open state to cause the coil to hold the plunger and hold the spray valve in the open state, wherein the first power level is greater than the second power level;

de-energizing the coil based on the trigger having ceased generation of the signal; and closing the spray valve.

* * * * *